US009891820B2

(12) United States Patent
Luo

(10) Patent No.: US 9,891,820 B2
(45) Date of Patent: *Feb. 13, 2018

(54) METHOD FOR CONTROLLING A VIRTUAL KEYBOARD FROM A TOUCHPAD OF A COMPUTERIZED DEVICE

(71) Applicant: Handscape Inc., Mountain View, CA (US)

(72) Inventor: Tong Luo, Fremont, CA (US)

(73) Assignee: Handscape Inc., Fremont, CA (US)

( * ) Notice: Subject to any disclaimer, the term of this patent is extended or adjusted under 35 U.S.C. 154(b) by 310 days.

This patent is subject to a terminal disclaimer.

(21) Appl. No.: 14/341,326

(22) Filed: Jul. 25, 2014

(65) Prior Publication Data

US 2014/0337786 A1   Nov. 13, 2014

Related U.S. Application Data

(63) Continuation-in-part of application No. 14/289,260, filed on May 28, 2014, now Pat. No. 9,542,032,
(Continued)

(51) Int. Cl.
*G06F 3/048* (2013.01)
*G06F 3/0488* (2013.01)
(Continued)

(52) U.S. Cl.
CPC .......... *G06F 3/04886* (2013.01); *G06F 3/017* (2013.01); *G06F 3/041* (2013.01);
(Continued)

(58) Field of Classification Search
CPC ... H04L 29/06; H04L 29/08072; G06Q 10/00; G06T 11/20; G08C 21/00; G06F 3/044;
(Continued)

(56) References Cited

U.S. PATENT DOCUMENTS 5,530,234 A   6/1996   Loh et al.
6,239,790 B1  5/2001   Martinelli et al.
(Continued)

OTHER PUBLICATIONS

Filed specification for U.S. Appl. No. 09/346,777, as incorporated by reference in its entirety into now U.S. Pat. No. 6,909,424.*
(Continued)

*Primary Examiner* — Shourjo Dasgupta
(74) *Attorney, Agent, or Firm* — Stephen E. Zweig

(57) ABSTRACT

A method for controlling a virtual keyboard on a display screen of a computerized system includes obtaining data from a touchpad. The data is associated with the location and movement of a finger and/or hand of a user when the user operates the computerized system using the touchpad. The method includes communicating the data from the touchpad to the computerized device, the touchpad being located in a location that is different from the location of the display screen. The method further includes analyzing the data in accordance with a model of a human hand, and assigning the data to at least one of a plurality of fingers of the model. The method also includes generating a virtual keyboard on the display screen and repositioning the virtual keyboard according to either a verbal command from the user or a user input from the touchpad.

21 Claims, 38 Drawing Sheets

Related U.S. Application Data which is a continuation-in-part of application No. 14/284,068, filed on May 21, 2014, which is a continuation-in-part of application No. 14/282,331, filed on May 20, 2014, now Pat. No. 9,639,195, which is a continuation-in-part of application No. 14/268,926, filed on May 2, 2014, now Pat. No. 9,529,523, which is a continuation-in-part of application No. 14/260,195, filed on Apr. 23, 2014, now Pat. No. 9,430,147, which is a continuation-in-part of application No. 13/770,791, filed on Feb. 19, 2013, now Pat. No. 9,311,724, which is a continuation-in-part of application No. 13/223,836, filed on Sep. 1, 2011, now Pat. No. 9,310,905, which is a continuation-in-part of application No. 12/773,075, filed on May 4, 2010, now Pat. No. 8,384,683.

(60) Provisional application No. 61/858,223, filed on Jul. 25, 2013, provisional application No. 61/828,683, filed on May 30, 2013, provisional application No. 61/825,621, filed on May 21, 2013, provisional application No. 61/819,615, filed on May 5, 2013, provisional application No. 61/815,058, filed on Apr. 23, 2013, provisional application No. 61/327,102, filed on Apr. 23, 2010.

(51) Int. Cl.
  *G06F 3/041* (2006.01)
  *G06F 3/01* (2006.01)
  *G06F 3/042* (2006.01)
  *H04L 29/08* (2006.01)

(52) U.S. Cl.
  CPC .......... *G06F 3/0416* (2013.01); *G06F 3/0425* (2013.01); *G06F 2203/04104* (2013.01); *H04L 29/08072* (2013.01)

(58) Field of Classification Search
  CPC .... G06F 3/04883; G06F 3/0481; G06F 3/041; G06F 3/0488; G06F 9/4443
  USPC ................ 715/773; 345/173–174, 441, 649, 345/359–360
  See application file for complete search history.

(56) References Cited

U.S. PATENT DOCUMENTS

| | | |
|---|---|---|
| 6,297,752 B1 | 10/2001 | Ni |
| 6,512,511 B2 | 1/2003 | Willner et al. |
| 6,628,511 B2 | 9/2003 | Engstrom |
| 6,909,424 B2 | 6/2005 | Liebenow et al. |
| 7,142,195 B2 | 11/2006 | Northway et al. |
| 7,667,692 B2 | 2/2010 | Marcus et al. |
| 7,705,799 B2 | 4/2010 | Niwa |
| 7,724,157 B1 | 5/2010 | Gray |
| 7,864,164 B2 | 1/2011 | Cunningham et al. |
| 7,881,055 B2 | 2/2011 | Brandenberg et al. |
| 8,046,039 B2 | 10/2011 | Lee et al. |
| 8,279,589 B2 | 10/2012 | Kim |
| 8,289,702 B2 | 10/2012 | Karwan |
| 8,384,683 B2 | 2/2013 | Luo |
| 8,390,573 B2 | 3/2013 | Trout |
| 8,565,829 B2 | 10/2013 | Kim et al. |
| 2003/0048205 A1 | 3/2003 | He |
| 2004/0032398 A1 | 2/2004 | Ariel et al. |
| 2004/0046744 A1 | 3/2004 | Rafii et al. |
| 2004/0097256 A1 | 5/2004 | Kujawski |
| 2004/0138569 A1* | 7/2004 | Grunwald ................ A61B 8/00 600/459 |
| 2006/0007178 A1 | 1/2006 | Davis |
| 2006/0114233 A1 | 6/2006 | Radivojevic et al. |
| 2007/0040813 A1* | 2/2007 | Kushler ................ G06F 3/0237 345/173 |
| 2007/0247800 A1 | 10/2007 | Smith et al. |
| 2007/0262965 A1 | 11/2007 | Hirai et al. |
| 2007/0268261 A1 | 11/2007 | Lipson |
| 2008/0084397 A1 | 4/2008 | On et al. |
| 2008/0211766 A1 | 9/2008 | Westerman et al. |
| 2008/0285857 A1 | 11/2008 | Sharan et al. |
| 2009/0009951 A1 | 1/2009 | Sbaita |
| 2009/0135142 A1 | 5/2009 | Fu et al. |
| 2009/0167682 A1 | 7/2009 | Yamashita et al. |
| 2009/0167706 A1* | 7/2009 | Tan ..................... G06F 3/04883 345/173 |
| 2009/0195372 A1 | 8/2009 | Aichi et al. |
| 2009/0322499 A1 | 12/2009 | Pryor |
| 2010/0097321 A1* | 4/2010 | Son ..................... G06F 3/04886 345/169 |
| 2010/0153313 A1* | 6/2010 | Baldwin ............... G06F 1/1626 706/11 |
| 2010/0177035 A1 | 7/2010 | Schowengerdt et al. |
| 2010/0182399 A1 | 7/2010 | Choi et al. |
| 2010/0214267 A1 | 8/2010 | Radivojevic et al. |
| 2010/0238119 A1* | 9/2010 | Dubrovsky ........... G06F 1/1626 345/169 |
| 2010/0315266 A1 | 12/2010 | Gunawardana et al. |
| 2011/0018695 A1 | 1/2011 | Bells et al. |
| 2011/0029185 A1 | 2/2011 | Aoki et al. |
| 2011/0306387 A1 | 12/2011 | Moon |
| 2012/0007822 A1 | 1/2012 | Luo |
| 2012/0235949 A1* | 9/2012 | Ligtenberg ............ G06F 1/1616 345/174 |
| 2012/0306759 A1* | 12/2012 | Luo ....................... G06F 3/0233 345/168 |
| 2013/0007653 A1 | 1/2013 | Stolyarov et al. |
| 2013/0149964 A1 | 6/2013 | Kreiner et al. |
| 2013/0155070 A1 | 6/2013 | Luo |
| 2013/0201155 A1 | 8/2013 | Wu et al. |
| 2013/0278552 A1 | 10/2013 | Kamin-Lyndgaard |
| 2014/0240267 A1 | 8/2014 | Luo |

OTHER PUBLICATIONS

International Search Report for patent application No. PCT/US2014/056625 (dated Dec. 30, 2014) 14 pages.
Non-Final Office Action for U.S. Appl. No. 13/770,791 dated Mar. 13, 2015, 20 pages.
Non-Final Office Action for U.S. Appl. No. 13/223,836 dated Mar. 5, 2015, 13 pages.
Final Office Action for U.S. Appl. No. 13/223,836 dated Nov. 26, 2014, 14 pages.
International Application No. PCT/US2014/48273, International Search Report dated Nov. 25, 2014, 13 pages.
European PatentApplication No. EP11772858.4, Extended Search Report dated Nov. 12, 2014, 7 pages.
China Intellectual Property Office office action for application CN201110113001 dated Sep. 5, 2014.
International Application No. PCT/US2011/036654, International Search Report and Written Opinion dated Sep. 1, 2011, 9 pages.
European PatentApplication No. EP14155627.4,Extended Search Report dated Aug. 21, 2014, 7 pages.
International Application No. PCT/US2014/036679, International Search Report dated Sep. 25, 2014, 19 pages.
International Application No. PCT/US2014/038779, International Search Report dated Oct. 7, 2014, 14 pages.
Jania, "Cypress CapSense Successive Approximation Algorithm," Cypress White Paper CSA RJO, pp. 1-6 (2007).
Onno et al., "A Natural Human Hand Model," The Visual Computer 24(1): 31-44 (2008).
Westerman, "Hand Tracking, Finger Identification, and Chordic Manipulation on a Multi-Touch Surface," dissertation submitted to the Faculty of the University of Delaware for a Ph.D. in electrical engineering, pp. xxix-xxx (1999).
Non-Final Office Action for U.S. Appl. No. 12/773,075 dated Mar. 2, 2012.

(56) References Cited

OTHER PUBLICATIONS

Final Office Action for U.S. Appl. No. 12/773,075 dated Jul. 19, 2012.
Interview Summary for U.S. Appl. No. 12/773,075 dated Aug. 29, 2012.
Non-Final Office Action for U.S. Appl. No. 12/773,075 dated Sep. 24, 2012.
Interview Summary for U.S. Appl. No. 12/773,075 dated Oct. 19, 2012.
Non-Final Office Action for U.S. Appl. No. 13/223,836 dated Jan. 10, 2013.
Notice of Allowance for U.S. Appl. No. 12/773,075 dated Jan. 18, 2013.
Final Office Action for U.S. Appl. No. 13/223,836 dated Jun. 6, 2013.
Interview Summary for U.S. Appl. No. 13/223,836 dated Jun. 27, 2013.
Advisory Action for U.S. Appl. No. 13/223,836 dated Jul. 29, 2013.
Non-Final Office Action for U.S. Appl. No. 13/223,836 dated Aug. 9, 2013.
Final Office Action for U.S. Appl. No. 13/223,836 dated Dec. 19, 2013.
Office Action for CN Application No. 201110113001.3 dated Jan. 6, 2014.
Interview Summary for U.S. Appl. No. 13/223,836 dated Mar. 20, 2014.
Advisory Action for U.S. Appl. No. 13/223,836 dated Mar. 28, 2014.
Final Office Action for U.S. Appl. No. 13/223,836 dated May 20, 2014.

* cited by examiner

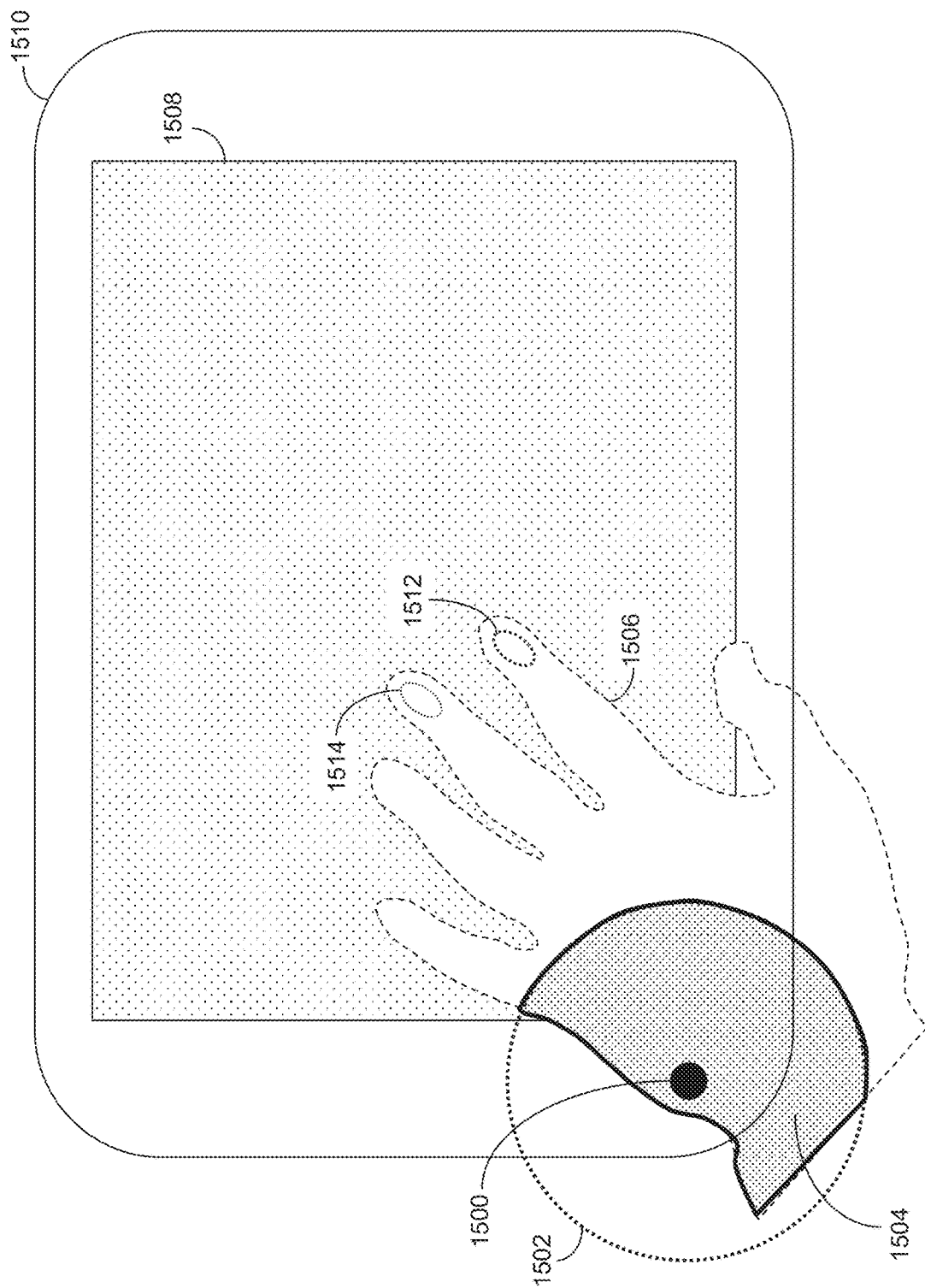

METHOD FOR CONTROLLING A VIRTUAL KEYBOARD FROM A TOUCHPAD OF A COMPUTERIZED DEVICE

CROSS-REFERENCES TO RELATED APPLICATIONS

This application claims priority to U.S. Provisional Patent Application No. 61/858,223, "METHOD FOR USER INPUT FROM ALTERNATIVE TOUCHPADS OF A HANDHELD COMPUTERIZED DEVICE", inventor Tong Luo, filed Jul. 25, 2013; this application is also a continuation-in-part of U.S. patent application Ser. No. 14/289,260, "METHOD FOR USER INPUT FROM ALTERNATIVE TOUCHPADS OF A HANDHELD COMPUTERIZED DEVICE", inventor Tong Luo, filed May 28, 2014, which claims priority, under 35 USC §119(e), from U.S. Provisional Patent Application No. 61/828,683, entitled "METHOD FOR USER INPUT FROM ALTERNATIVE TOUCHPADS OF A HANDHELD COMPUTERIZED DEVICE," filed on May 30, 2013; this application is also a continuation-in-part of U.S. patent application Ser. No. 14/284,068, entitled "METHOD USING A FINGER ABOVE A TOUCHPAD DURING A TIME WINDOW FOR CONTROLLING A COMPUTERIZED SYSTEM," filed on May 21, 2014, which claims priority, under 35 USC §119(e), from U.S. Provisional Patent Application No. 61/825,621, entitled "METHOD FOR USER INPUT FROM ALTERNATIVE TOUCHPADS OF A HANDHELD COMPUTERIZED DEVICE," filed on May 21, 2013; this application is also a continuation-in-part of U.S. patent application Ser. No. 14/282,331, entitled "METHOD USING FINGER FORCE UPON A TOUCHPAD FOR CONTROLLING A COMPUTERIZED SYSTEM," filed on May 20, 2014, which is a continuation-in-part of U.S. patent application Ser. No. 14/268,926, entitled "METHOD USING A FINGER ABOVE A TOUCHPAD FOR CONTROLLING A COMPUTERIZED SYSTEM," filed on May 2, 2014, which claims priority, under 35 USC §119(e), from U.S. Provisional Patent Application No. 61/819,615, entitled "METHOD FOR USER INPUT FROM ALTERNATIVE TOUCHPADS OF A HANDHELD COMPUTERIZED DEVICE," filed on May 5, 2013; this application is also a continuation-in-part of U.S. patent application Ser. No. 14/260,195, entitled "METHOD FOR USER INPUT FROM ALTERNATIVE TOUCHPADS OF A HANDHELD COMPUTERIZED SYSTEM," filed on Apr. 23, 2014, which claims priority, under 35 USC §119(e), from U.S. Provisional Patent Application No. 61/815,058, entitled "METHOD FOR USER INPUT FROM ALTERNATIVE TOUCHPADS OF A HANDHELD COMPUTERIZED DEVICE," filed on Apr. 23, 2013; this application is also a continuation-in-part of U.S. patent application Ser. No. 13/770,791, entitled "METHOD FOR USER INPUT FROM ALTERNATIVE TOUCHPADS OF A HANDHELD COMPUTERIZED DEVICE," filed on Feb. 19, 2013; this application is also a continuation-in-part of U.S. Pat. No. 8,384,683 B2, entitled "METHOD FOR USER INPUT FROM THE BACK PANEL OF A HANDHELD COMPUTERIZED DEVICE", filed on May 4, 2010, which claims priority, under 35 USC §119(e), from U.S. Provisional Patent Application No. 61/327,102, entitled "METHOD, GRAPHICAL USER INTERFACE, AND APPARATUS FOR USER INPUT FROM THE BACK PANEL OF A HANDHELD ELECTRONIC DEVICE," filed on Apr. 23, 2010; the contents of all of all of the above references applications are incorporated herein by reference in their entirety. U.S. patent application Ser. No. 13/770,791 referenced above is also a continuation-in-part of U.S. patent application Ser. No. 13/223,836, entitled "DETACHABLE BACK MOUNTED TOUCHPAD FOR A HANDHELD COMPUTERIZED DEVICE", filed on Sep. 1, 2011, which is a continuation-in-part of U.S. Pat. No. 8,384,683 B2, entitled "METHOD FOR USER INPUT FROM THE BACK PANEL OF A HANDHELD COMPUTERIZED DEVICE", filed May 4, 2010, the contents of all of which are incorporated herein by reference in their entirety.

BACKGROUND OF THE INVENTION

The present disclosure generally relates to a computerized device including a touchpad installed on the back panel or other portion of the body other than the display screen. More particularly, the present disclosure relates to a method and graphical user interface that enables the user to see the user's finger position and motion from the back or other portion of the device, superimposed on a keyboard layout on the display screen. This makes it easier for a user to input keystrokes and mouse actions from a touchpad that is installed on the back panel or other portion of a handhold device. In an embodiment, the user can also control and manipulate a virtual keyboard shown in the display screen. Although embodiments of the invention are described with reference to a handheld computerized device by way of an example, it is understood that the invention is not limited by the type of computerized device or system.

Handheld computerized devices, i.e., devices including microprocessors and sophisticated displays) such as cell phones, personal digital assistants (PDA), game devices, tabletPCs, such as iPad, wearable computerized devices, and the like, are playing a more and more important role in everyday life, and are becoming more and more indispensible. With the advance of technology, and improvements in the handheld computerized devices' processing power, both function, and memory space is increasing at an amazing pace. Meanwhile the size of the handheld computerized devices continues to get smaller and smaller making the touchpad and display on the device smaller and more challenging to use.

To meet the challenge of a smaller device display and touchpad, the designers of handheld computerized devices typically use two approaches. One approach is to make the keyboard keys smaller and smaller, miniaturizing the keys. Additionally the keyboard keys may be given multiple functions—i.e. overloaded, and more complex function keyboard keys may be introduced as well.

The other approach is to use touch screen keyboards, or so called "soft keys", on the front panel. Here a user may use a stylus pen or finger to select the soft keys through a graphical user interface. However due to the optical illusions introduced by the display screen, and the fact that the user's fingers often are on top of the various display screen soft keys, hence blocking the keys from direct viewing, the soft keys should not be too small. Another problem is that when the soft keys are too small, often a single finger press will activate multiple keys. As a result, the designer may have to divide the keys into different groups and hierarchies, and just display a small number of keys at a time on the screen.

Both current approaches have some drawbacks: the user input area may occupy a significant portion of the front panel, and the user input process, although requiring a large amount of user attention to operate, still is very error prone.

Often a user may use one hand to hold the handheld computerized device, and use the other hand to input data, thus, occupying both hands. A user will often have to go through a long sequence of key strokes, and switch back and forth among different user interface screens, in order to complete a fairly simple input. As a result, there is a significant learning curve for a user to learn the overloaded keys, function keys, key grouping, and key hierarchies in order to operate the handheld computerized devices efficiently.

Previous designs including sensors on the back of the device and representations of the user's fingers on the front of the device, however, this work failed to adequately describe a procedure by which the indicia of the user's fingers or hands are displayed on the display panel.

Systems have been described in which image sensors would obtain an image of the user's fingers while operating the device, and use this image data to better determine which real or virtual keys the user's fingers were striking. Such methods rely, however, on image sensors that are positioned in such a way as to be capable of viewing the tips of the user's fingers. This type of image sensor placement is often difficult to implement on many types of handheld user computerized devices. Another drawback of the previous image sensor approach is that it is difficult to implement in low light situations. This approach may also be difficult to implement in situations where there is limited smooth and flat desk or table space.

BRIEF SUMMARY OF THE INVENTION

According to one embodiment of the present invention, a method for controlling a virtual keyboard on a display screen of a computerized system is presented. The method includes obtaining data from a touchpad. The data is associated with the location and movement of a finger and/or hand of a user when the user operates the computerized system using the touchpad. The data is not being associated with an image of the finger of the user from an image sensor. The method includes communicating the data from the touchpad to the computerized device, the touchpad being located in a location that is different from the location of the display screen. The method further includes analyzing the data in accordance with a model of a human hand, and assigning the data to at least one of a plurality of fingers of the model. The method also includes generating a virtual keyboard on the display screen and repositioning the virtual keyboard according to either a verbal command from the user or a user input from the touchpad.

In an embodiment of the above method, the method includes computing a graphical representation of at least one finger of the user in accordance with the model of the human hand, and displaying the graphical representation on the display screen.

In one embodiment, generating a virtual keyboard on the display screen includes tracking position and orientation of the user's hand, taking a time average of the position and orientation of the user's hand over a first time period, and generating a virtual keyboard on the display screen at a position and orientation based on the time average of the position and orientation of the user's hand.

In one embodiment, the first time period is between several seconds to several minutes. For example, the first time period can be between 0.1 seconds to two minutes.

In one embodiment, the method further includes, prior to repositioning the virtual keyboard, receiving a command from the user to enable the system for repositioning the virtual keyboard.

In one embodiment, repositioning the virtual keyboard comprises receiving a multi-touch command from the touchpad.

In one embodiment, said touchpad is located on a side of the computerized device that is behind the side of the computerized device that holds the display screen.

In one embodiment, said touchpad is located on a same side of the computerized device as the display screen, but at a different location from that of the display screen.

In one embodiment, said touchpad is configured to detect the proximity of the user's fingers above the surface of the touch pad.

In one embodiment, he virtual keyboard is a graphical display of a keyboard including one or more data entry location, or a hyperlink. In one embodiment, the virtual keyboard is a graphical display of at least part of a QWERTY keyboard. In one embodiment, the virtual keyboard is a graphical display of number entry keyboard.

In one embodiment, repositioning the virtual keyboard includes a verbal command including an angle of rotation and/or a distance of movement.

In one embodiment, the method further includes, before repositioning the virtual keyboard, receiving a command from the user to enable the system for keyboard repositioning.

In one embodiment, said command from the user comprises one or more of key press, voice command, virtual key selection, or touch pad input.

In one embodiment, repositioning the virtual keyboard includes one or more of rotating the virtual keyboard, stretching and shrinking the virtual keyboard, and changing key spacing.

According to another embodiment of the present invention, a method for controlling a virtual keyboard on a display screen of a computerized system is presented. The method includes obtaining data from a touchpad. The data is associated with the location and movement of a finger and/or hand of a user when the user operates the computerized system using the touchpad. The data is not being associated with an image of the finger of the user from an image sensor. The method includes communicating the data from the touchpad to the computerized device, the touchpad being located in a location that is different from the location of the display screen. The method also includes analyzing the data in accordance with a model of a human hand, and assigning the data to at least one of a plurality of fingers of the model, computing a graphical representation of at least one finger of the user in accordance with the model of the human hand, and displaying the graphical representation of at least one finger of the user on the display screen. The method further includes tracking position and orientation of the user's hand, and taking a time average of the position and orientation of the user's hand over a first time period. The method also includes generating a virtual keyboard on the display screen at a position and orientation according to the time average of the position and orientation of the user's hand. The method further includes receiving a command from the user to enable the system for repositioning the virtual keyboard, and repositioning the virtual keyboard according to either a verbal command from the user or a user input from the touchpad.

In an embodiment, the first time period is between several seconds to several minutes. For example, the first time period can be between 0.1 seconds to two minutes.

In an embodiment, repositioning the virtual keyboard comprises receiving a multi-touch command from the touchpad.

In an embodiment, said command from the user comprises one or more of key press, voice command, virtual key selection, or touch pad input.

A better understanding of the nature and advantages of the embodiments of the present invention may be gained with reference to the following detailed description and the accompanying drawings.

BRIEF DESCRIPTION OF THE DRAWINGS

FIG. 15 depicts how an exemplary device camera may be used to obtain a partial image of the user's hand while using the device's touchpad, and this information also used to update and refine the biomechanical and/or anatomical model of the user's hand, in accordance with one embodiment of the present invention.

DETAILED DESCRIPTION OF THE INVENTION

Figure 1:
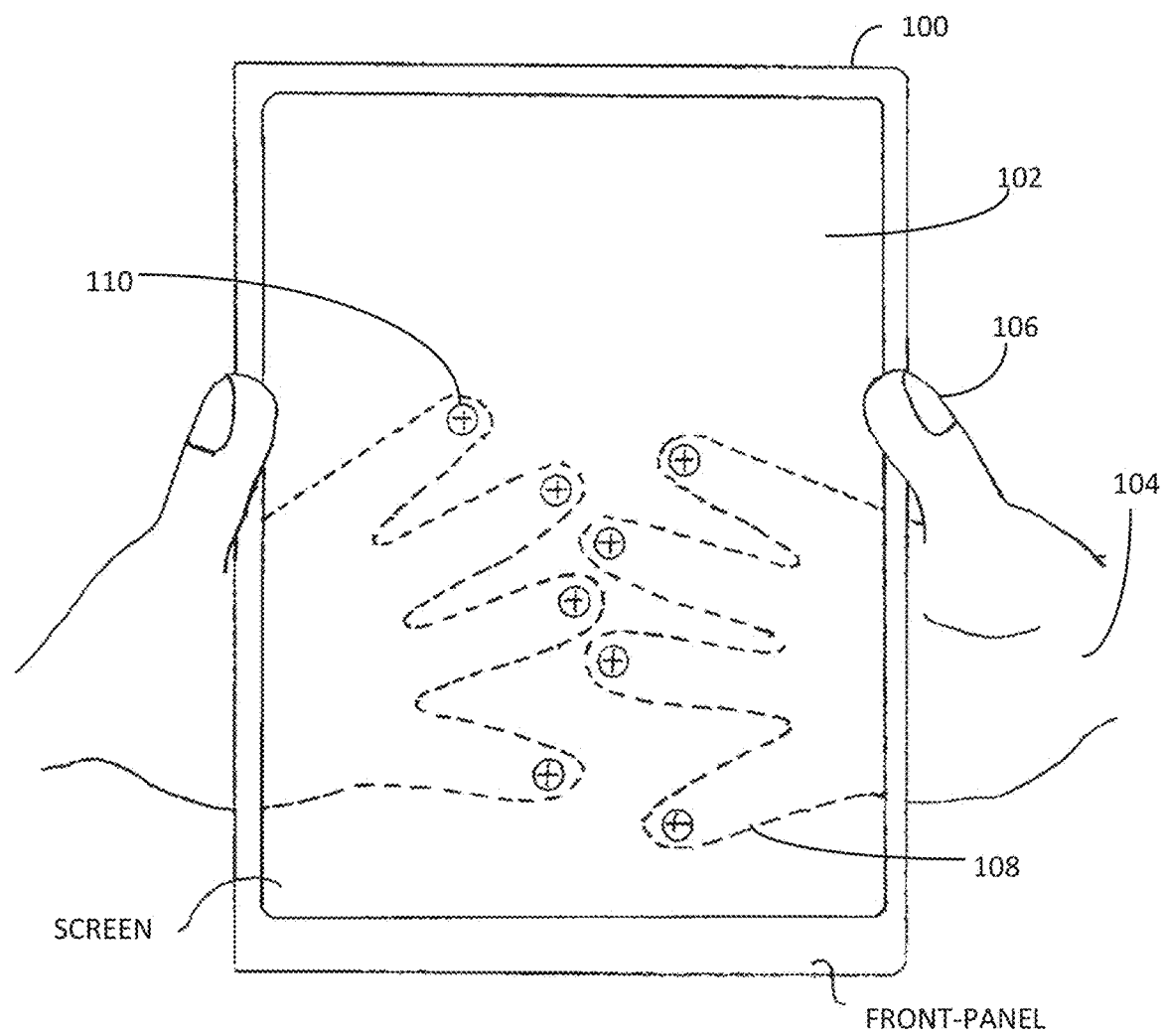
FIG. 1 depicts a simplified exemplary front panel view of the handheld computerized device displaying the position and motion of the user's fingers holding the back panel, in accordance with one embodiment of the present invention.

The embodiments of the present invention relate to a handheld computerized device including a bit mapped display screen on the front panel, and a touchpad installed on the back panel, side panel, or other area other than that of the display screen. More particularly, the embodiments of the present invention relate to a method and graphical user interface that enable the user to see the user's finger position and motion from behind the device or other portion of the device superimposed upon a virtual keyboard layout on the front panel.

It is therefore desirable to have a more efficient and user-friendly way to do user input for handheld computerized devices. The embodiments of the present invention present an effective solution for these above problems. The embodiments of the present invention free the original keyboard space on the front panel for applications by utilizing the previously mostly unused back panel space for user input. The embodiments of the present invention are able handle both keyboard input and mouse input. The embodiments of the present invention present a stunning graphic user interface on the front panel screen where a user may see the real-time position and motion of his/her fingers holding the back panel, on top of the display of keyboard layout, which is also referred to as a virtual keyboard. The embodiments of the present invention are more precise than current touch screen keyboards by removing the display layer that presently exists between the fingers and touch pad. The embodiments of the present invention also move the user's fingers away from the front panel, so that the user's fingers will not block the view of the soft key or area that the finger is presently operating on. For smaller handheld devices, such as cell phone, iPhone™ or iPad™, the hand that holds the device may now also do input, hence freeing the other hand for other activities.

Thus an object of the embodiments of the present invention are to provide a method for a more efficient and user-friendly user input for a handheld computerized device.

Another object of the embodiments of the present invention are to free up the space currently occupied by the keyboard on the front panel of small electronic devices, and utilize the mostly unused space on the back panel of the handheld devices for user input purposes.

Another object of the embodiments of the present invention are to present a visually compelling user-interface design that enables the real time position and motion of the fingers that hold the device, which normally would be hidden from view by the device itself, to be displayed on the front panel as "virtual fingers" together with an optional display of a virtual keyboard layout. The user's finger positions and keyboard layout may be displayed either as background image, or as a transparent layer on top of some of all of the applications currently running on the handheld device. These semi-transparent representations of the user's finger positions and virtual keyboard allow the user to easily enter data while, at the same time, continuing to allow the user unimpeded access to the various applications running on the handheld device. Thus, for example, applications originally written for a computer device that had a physical keyboard may be easily run, without code modification, on a tablet computer device that lacks a physical keyboard. Thus, these virtual semi-transparent keyboards and methods that also give information of finger motion of the user may be highly useful.

Another object of the embodiments of the present invention are to enable the hand that is holding the device to also do user input operations, hence freeing the other hand for other inputs or other purposes.

According to one embodiment, a device and method include a display screen on the front panel, which may be a bit-mapped display screen, a touchpad embedded on the back panel capable of sensing the user's finger positions and motion, and a graphical user interface. This graphical user interface will normally include both software and optional graphics acceleration hardware to enable complex graphics to be rapidly displayed on the display screen. The device also has an optional virtual keyboard processor that displays the keyboard layout, as well as computes and displays the user's finger positions on a real-time basis. The user's finger position and motion on the touchpad of the back panel may thus be computed and displayed on the front display screen as a layer, which may be a semi-transparent layer, on top of all of the other applications. The virtual keyboard processor may also interpret the finger motions, i.e. strokes, and invoke corresponding operations based on the known location of the finger position on the keyboard.

Unlike previous approaches, the user's fingers do not need to be constrained to fit onto particular regions of the touchpad, but rather may be disposed in any arbitrary location. Unlike some previous approaches, although embodiments of the invention may be aided to some extent by real-time video that may provide video information pertaining to at least some portion of the user's hand, visualization of the user's fingers, in particular the tips of the user's fingers is not necessary. This makes it feasible to use handheld device video cameras designed for general photographic purposes to be used to help in visualizing the user's hand, without requiring that much of the user's hand in fact be photographed. There is no requirement at all that the user's fingertips be photographed while operating the device.

FIG. 1 depicts a simplified exemplary front panel view of a handheld computerized device (100) displaying the position and motion of the user's fingers (108) holding the back panel, in accordance with one embodiment of the present invention. The user is holding the handheld electronic device (100), similar to an Apple iPad™ or equivalent pad device. The front panel of the device is occupied by a large graphics display screen (102), which may be a bit-mapped graphics display screen. In some embodiments, the whole front panel screen or front panel may be occupied by this graphics display screen (102). The user is holding the handheld computerized device (100) using his or her hands (104), where a portion of the user's thumb (106) is in front of the device over a portion of the front panel, and the user's fingers (108) are behind the device. Although device (100) is not transparent, nonetheless the graphics display screen (102) is shown representing a graphical representation of the user's fingers (108) as well as regions where the user's fingers are apparently touching an obscured from view or "invisible" surface at touchpad touch points (110) at the back panel of the device. Each of the touchpad touch points (110) may correspond to a real time finger print image of the tip of the user's finger.

Figure 2:
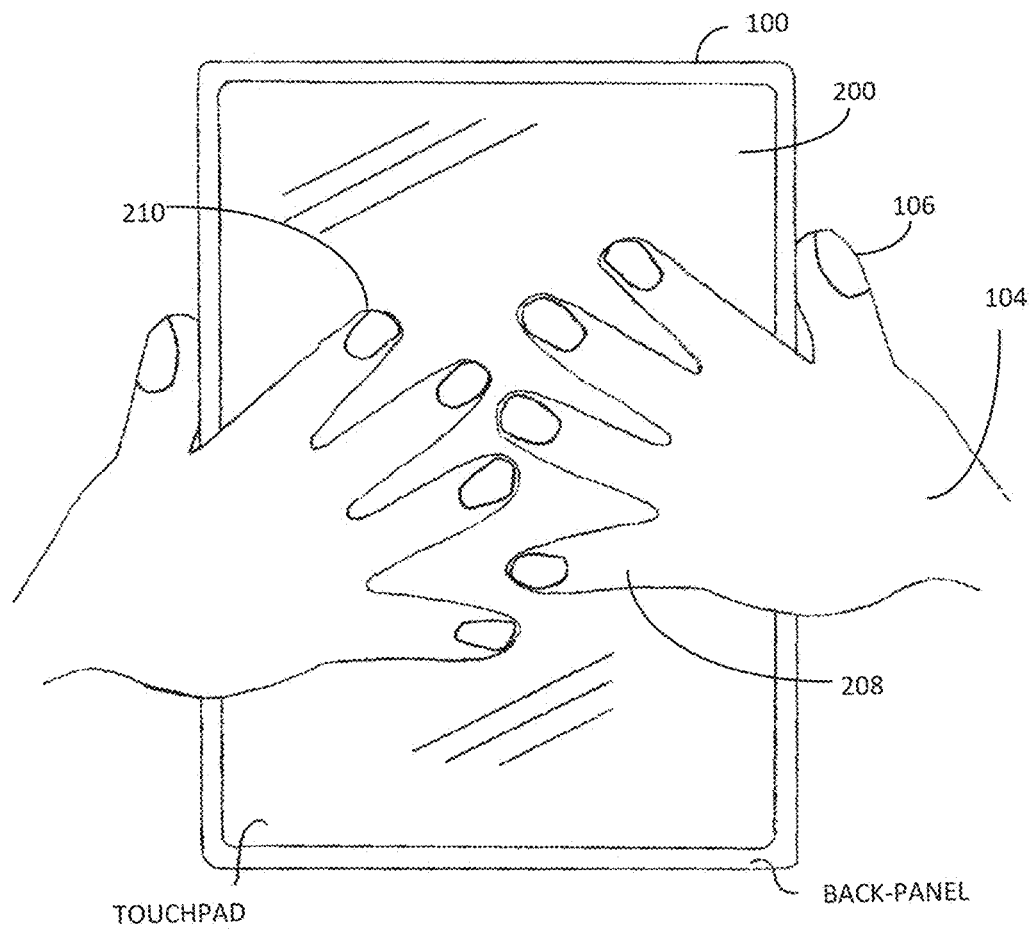
FIG. 2 depicts a simplified exemplary back panel view of the handheld computerized device depicted in FIG. 1, in accordance with one embodiment of the present invention.

FIG. 2 depicts a simplified exemplary back panel view of the handheld computerized device (100) depicted in FIG. 1, in accordance with one embodiment of the present invention. In contrast to the front panel of device (100), previously depicted in FIG. 1, which included a large graphics display screen, the back panel of the handheld computerized device as depicted in FIG. 2 does not include a large graphics display screen, but instead includes a large touchpad (200). As may be seen, the user's fingers (208) may now be seen positioned above the touchpad with the tips of the user's fingers (210) touching the touchpad. It is understood that the expression "above the touchpad" refers to the relative position of the fingers with respect to the touchpad when the touchpad is facing upward.

Note that in some embodiments, this back touchpad may be provided as a retrofit or add-on to a handheld computerized device that otherwise lacks such a back touchpad. Such methods and systems, such as "clip on" back touchpads, are described at more length in parent application Ser. No. 13/223,836, the contents of which are incorporated herein by reference in its entirety.

Figure 3:
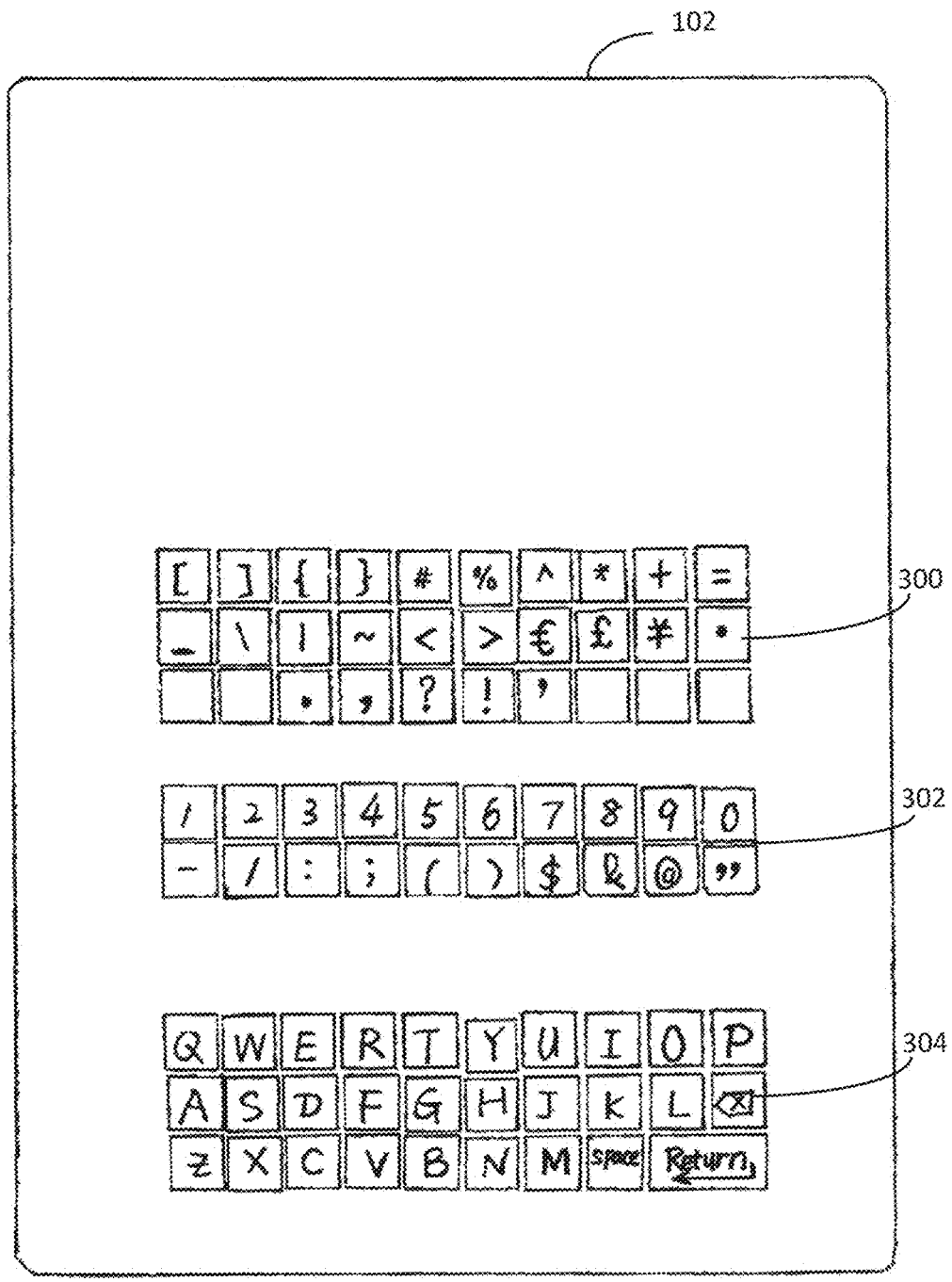
FIG. 3 depicts a simplified exemplary front panel view of the handheld computerized device depicted in FIG. 1 displaying a multitude of groups of keys, in accordance with one embodiment of the present invention.

FIG. 3 depicts a simplified exemplary front panel view of the handheld computerized device depicted in FIG. 1 displaying a multitude of groups of keys (300, 302, 304), in accordance with one embodiment of the present invention. FIG. 3 depicts one possible optional multitude of groups of keys, i.e. a "virtual keyboard," being displayed on graphics display screen (102) of device (100). In this example, the "virtual keyboard" includes a symbol keypad (300), a numeric keypad (302), and a QUERTY keypad (304). Note that in many embodiments, the keys may be drawn in outline or semi-transparent form so as not to obscure any other graphical applications running on graphics display screen (102).

The scheme depicted in FIG. 3 allows the user to optionally use a touchpad keypad on the back of the device to input keystrokes and mouse actions, and these inputs will be reflected on the display screen on the front of the handheld computerized device as "virtual fingers" or equivalent. As previously discussed, this virtual keyboard layout displayed on graphics display screen (102) at the front panel may be a standard or modified QUERTY keyboard or keypad, a numeric keyboard or keypad, i.e. number entry keyboard, or alternatively some less standard keyboard or keypad such as a musical keyboard, a Qwerty, Azerty, Dvorak, Colemak, Neo, Turkish, Arabic, Armenian, Greek, Hebrew, Russian, Moldovan, Ukranian, Bulgarian, Devanagari, That, Khmer, Tibetan, Chinese, Hangul (Korean), Japanese, or other type of keyboard. Often, this keypad will be a semi-transparent keypad in order to allow the user to continue to view various application programs that are running on display screen (102) below the virtual keyboard.

Figure 4:
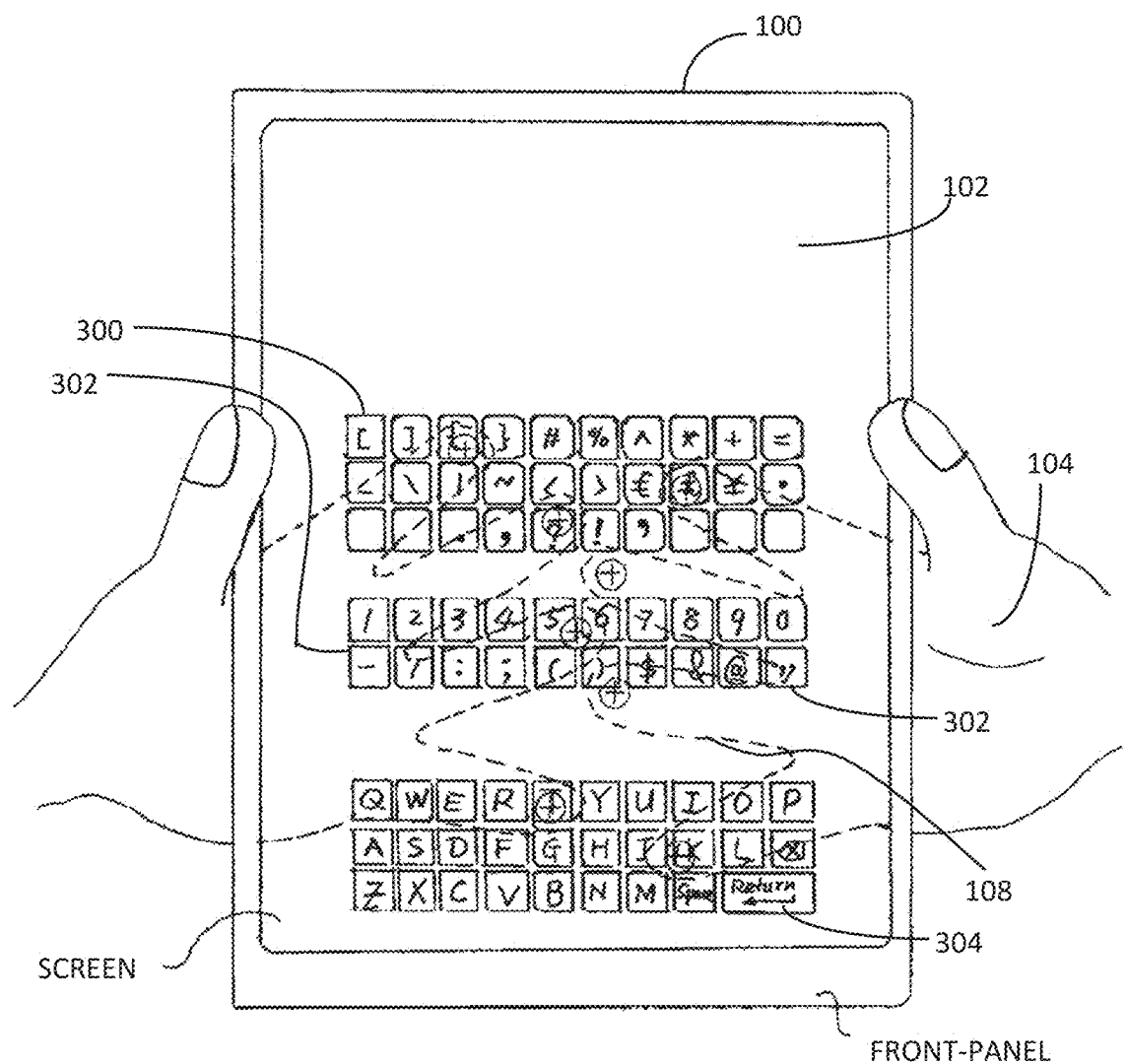
FIG. 4 depicts a simplified exemplary front panel view of the handheld computerized device depicted in FIG. 1 displaying the position and motion of the fingers holding the back panel and the multitude of groups of keys depicted in FIG. 3 in the same time, in accordance with one embodiment of the present invention.

FIG. 4 depicts a simplified exemplary front panel view of the handheld computerized device (100) depicted in FIG. 1 displaying the position and motion of the user's fingers (108) holding the back panel and the multitude of groups of keys (300, 302, 304) depicted in FIG. 3 in the same time, in accordance with one embodiment of the present invention. FIG. 4 depicts an example of how a user, typing on a touchpad mounted on the back of the electronic device, may see a graphical representation of his or her fingers (108) displayed on graphics screen (102) of device (100), as well as a display of virtual keyboard layout (300, 302, 304). The user's ability to enter input data to the handheld computerized device (100) is thus enhanced because the user may visually judge the distances between his or her fingers (108) and the keypad keys of interest (300, 302, 304) and move his or her fingers appropriately so as to hit the desired key. The user may also click on hyperlinks, such as link1, link2, and the like, or other clickable objects or command icons.

Because the user's operating fingers are moved away from the display screen, the fingers will not block the view of the display screen's soft keys, soft buttons, links or other areas. These areas on the display screen may now be seen more precisely, which in turn allows for more precise operation of the device.

The virtual display of the user's fingers may be a valuable feature for some of the newer tablet computers, such as the Microsoft Surface™ series, Windows 8, and the like, which may alternate operating modes between a first tablet operating mode designed for traditional touch input, and a second desktop operating mode, derived from legacy desktop operating systems, that is optimized for more precise mouse input. By enabling such tighter control, it becomes more feasible for a user to operate such "Surface" like devices in legacy desktop mode without the need to use a mouse or other hand operated pointing instrument.

Because a front keyboard, i.e. mechanically actuated keys, is no longer necessary, the embodiments of the present invention free up the space on the device that might otherwise have been used for original mechanical keyboard space on the front panel, and create room for additional larger displays and applications. The embodiments of the present invention make use of the presently mostly unused back panel space, thus, enabling the front display to show substantially larger virtual keys, or virtual keys including more space between them that are easier for the user to use.

The embodiments of the present invention may create compelling visual effects, as well as useful visual effects, because the user may see his or her fingers (108), which are holding the back panel and thus normally blocked from view, being virtually displayed on the front panel along with a virtual, i.e. computer generated, keyboard layout display (300, 302, 304). Because both the user's finger position, finger touch area, each depicted as a circle surrounding a cross, finger motion and the virtual keyboard are visible from the front panel, the user finger inputs on the touch panel located on the back panel of the device are both intuitive and easy to use. There will be no learning curve, and no need for special training. The user input methods of the embodiments of the present invention are more precise than traditional touch screen keyboards because these methods remove the obscuring layer between the finger and touchpad, and the operating fingers will not block the view of the display screen. For small handheld devices such as cell phones and iPhones, the current embodiments of the present invention enable the hand that holds the device to perform text input and other commands, hence freeing the other hand for other activities.

Note that although often a virtual keyboard will be presented, alternative data entry points of interest, such as hyperlinks on an internet browser, and the like, may also be used according to these methods as well.

In one embodiment, the layout of a multitude of groups of virtual keyboard keys (300, 302, 304), including numbers, letters, and symbols may be displayed on an area separated from concurrently running other software applications that are being displayed simultaneously on the screen of the front panel (much like the traditional separately displayed area often used for soft keys near the bottom of the display screen). The virtual keyboard keys (300, 302, 304) may be advantageously displayed in different size or in locations that are not the same locations that are determined by the other software applications and/or programs because the virtual keyboard keys (300, 302, 304) may be displayed translucently so as to display both the virtual keyboard keys (300, 302, 304) and the underlying concurrently running application or program display content.

Devices and systems utilizing the virtual fingers and optional virtual keyboard embodiments of the present invention advantageously need not have mechanically actuated and/or permanently dedicated physical QWERTY keypads or QWERTY keyboards, or any other type of mechanically actuated and/or permanently dedicated physical keypad or keyboard such as one dedicated to number entry. Eliminating mechanically actuated and/or permanently dedicated keypads or keyboards improves device ergonomics, allow for larger graphics display screens, and also reduces device costs.

Figure 5:
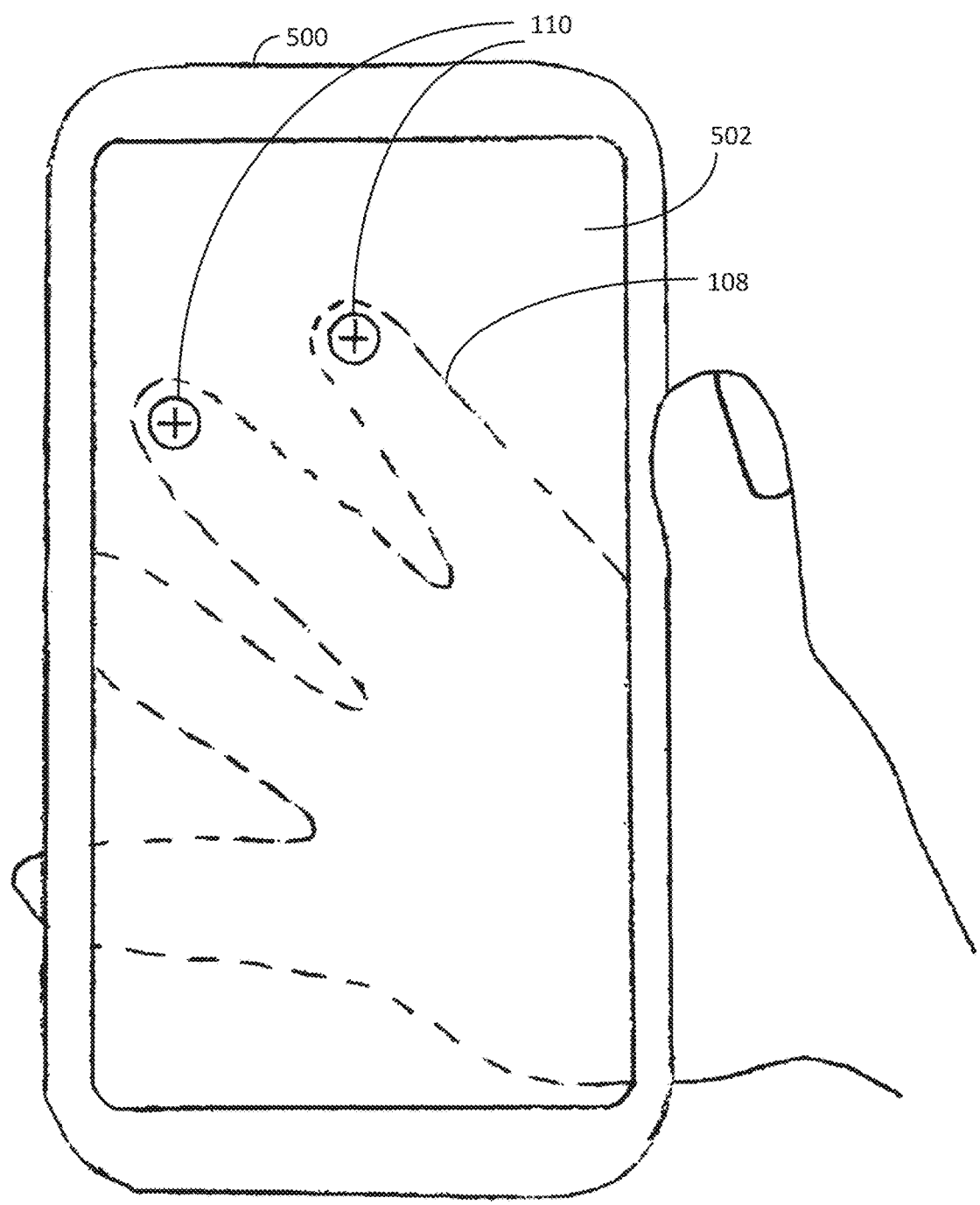
FIG. 5 depicts a simplified exemplary front panel view of a smaller handheld computerized device displaying the position and motion of at least one finger in contact with the touchpad of the back panel, in accordance with one embodiment of the present invention.

FIG. 5 depicts a simplified exemplary front panel view of a smaller handheld computerized device (500) displaying the position and motion of at least one finger in contact with the touchpad of the back panel, in accordance with one embodiment of the present invention. Smaller handheld computerized device (500) may include a cellular phone sized device (e.g. an Apple iPhone™ sized device) including a smaller graphics display screen (502) virtually displaying the position and motion of a multitude of fingers (108) in contact with the touchpad touch points (110) at the back panel of smaller handheld computerized device (500).

Figure 6A:
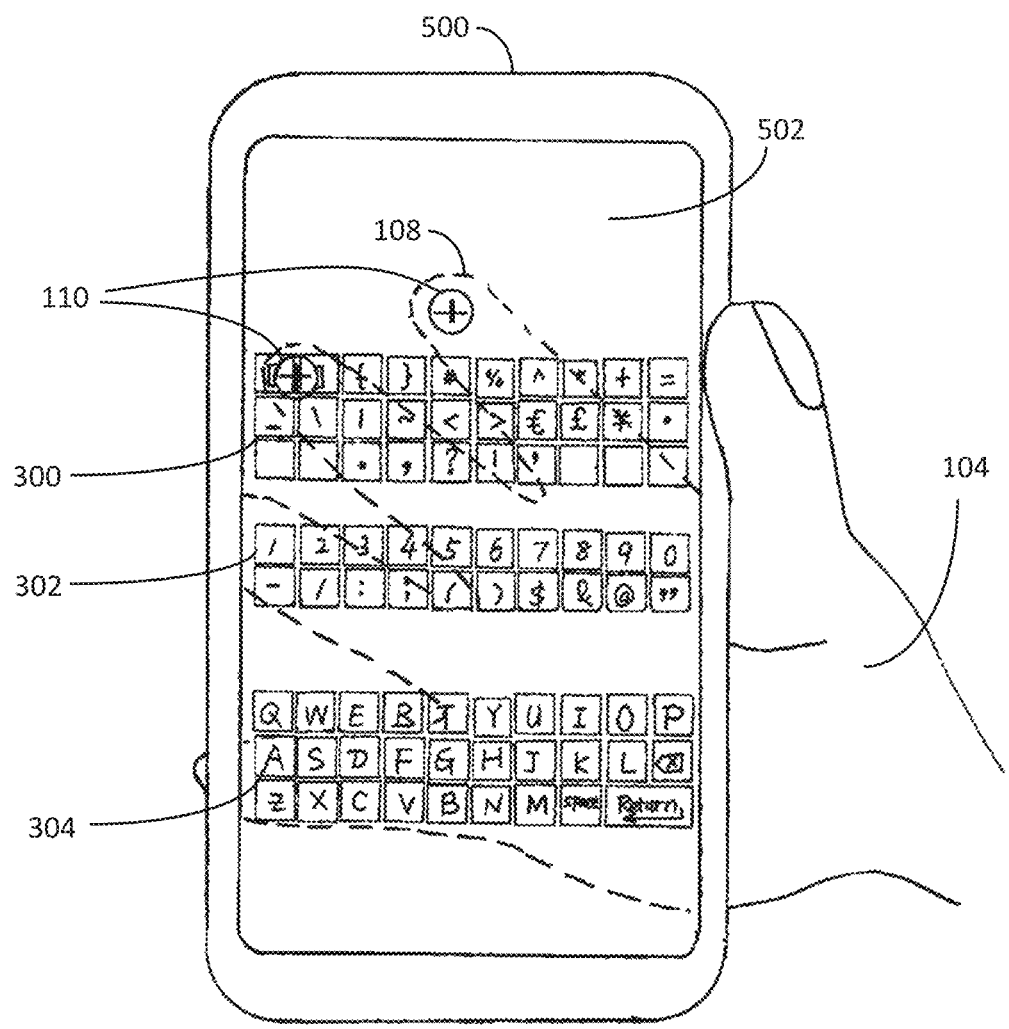
FIG. 6A depicts a simplified exemplary front panel view of the smaller handheld computerized device depicted in FIG. 5 displaying the position and motion of at least one user's finger in contact with the touchpad of the back panel at the touchpad touch points and a multitude of groups of virtual keyboard keys similarly depicted in FIG. 3 in the same time, in accordance with one embodiment of the present invention.

FIG. 6A depicts a simplified exemplary front panel view of the smaller handheld computerized device (500) depicted in FIG. 5 displaying the position and motion of at least one user's finger (108) in contact with the touchpad of the back panel at touchpad touch points (110), and a multitude of groups of virtual keyboard keys (300, 302, 304) similarly depicted in FIG. 3 in the same time, in accordance with one embodiment of the present invention. FIG. 6 may include similar features as FIG. 4 with the exception of using smaller handheld computerized device (500) being held in just one user hand (104), the other hand of the user being free to do other tasks.

Adjusting the Virtual Keyboard

Because the virtual keyboard (or keypad) is software generated, it need not always be presented in the same position. However, in embodiments of the invention, at least temporary persistence of the various keys of the virtual keyboard is desirable, so that the user always knows the relative location of the key that they are going to strike, and so that the system can accurately compute the relative distance between the user's various fingers (as predicted by the anatomical and biomechanical model of the user's hand) and the various keys.

In some embodiments, it may be useful to allow the user to adjust the position, orientation, and spacing between the virtual keys of the virtual keyboard either prior to beginning a typing session, or even during a typing session. Here, for example, a user may indicate to the system by keypress, voice command, virtual key selection, other touchpad input, etc. that virtual keyboard repositioning is desired. The system may then use various options to reposition the virtual keyboard.

In some embodiments, the virtual keyboard will be essentially allowed to float on the screen, and the user can then rotate the virtual keyboard, stretch and shrink it, change key spacing, etc., by multi-touch type commands either on a front display panel touchpad, a back panel touchpad, or other touchpad device.

In other embodiments, the user may control the position, orientation, and spacing between the virtual keys of the virtual keyboard by verbal commands such as "rotate right 30 degrees", or "go up one inch", and so on.

In some embodiments, the position and orientation of the virtual keyboard can be set to track the position and orientation of the user's hand(s). In embodiments of the invention, design tradeoffs are taken into consideration. If the position and orientation of the virtual keyboard tracks the position and orientation of the user hand(s) too closely, then the ability of the software to determine which virtual key the biomechanical and anatomical model of the user's hand is striking may be reduced. Thus, in some embodiments, it may be useful to set the virtual keyboard generation software to track a time averaged position and orientation of the user's hand (usually over periods of at least several seconds, or even minutes).

In other embodiments, the virtual keyboard generation software can be set to initialize the position and orientation of the virtual keyboard based on the position and orientation of the user's hand during a specified time. This can be as simple as having the user place his or her (hands) on the back touchpad and giving an "initialize keyboard orientation and position" command, either verbally, by pressing a real or virtual key, or by other activation system. Once so initialized, the virtual keyboard can then maintain its position and orientation until the user then decides to reset it.

Figure 6B:
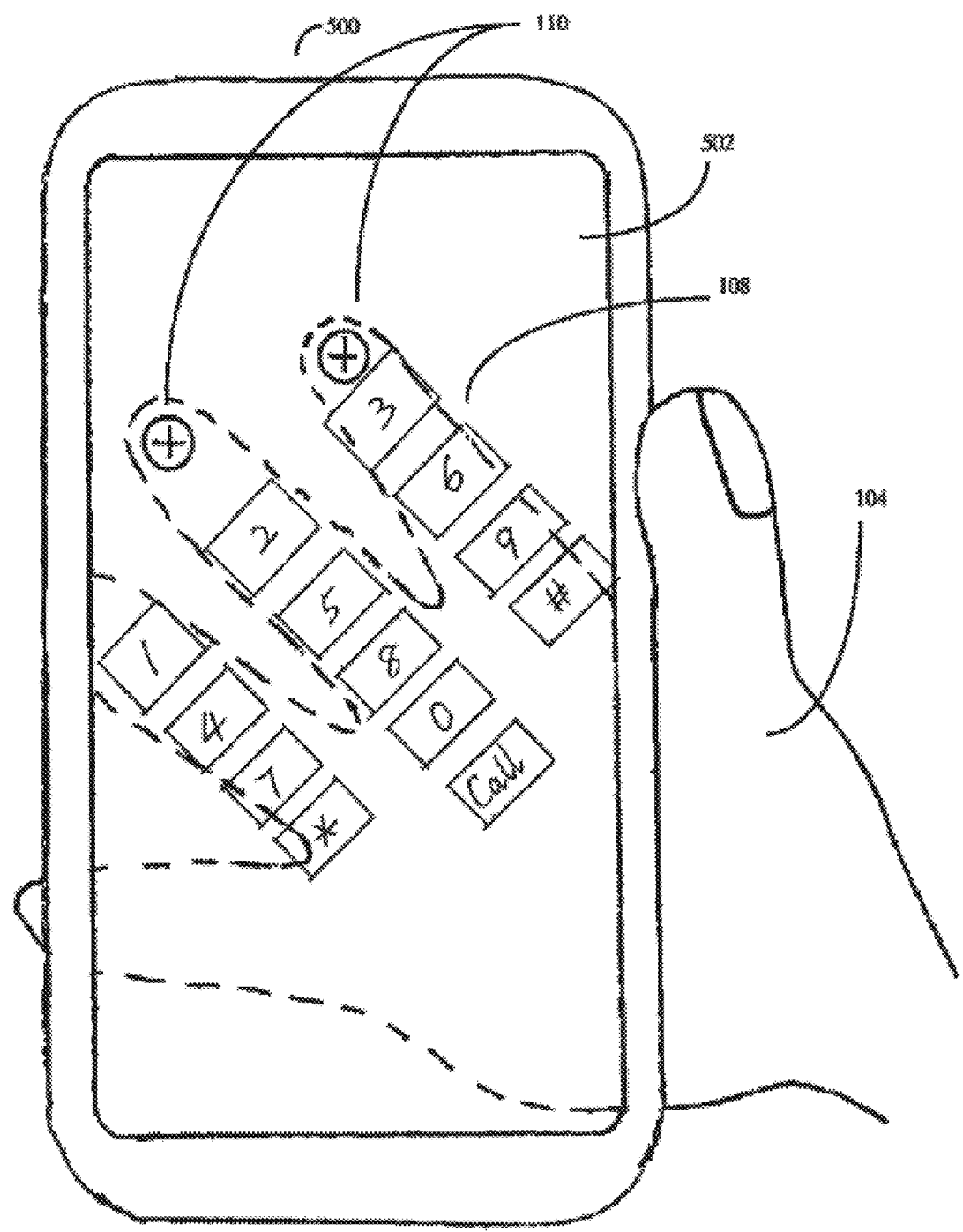
FIG. 6B depicts a simplified exemplary front panel view of a smaller handheld computerized device displaying the position and motion of one finger in contact with the touchpad of the back panel, in accordance with one embodiment of the present invention. The position of a small virtual keyboard, composed of a plurality of groups of keys, is also shown. Here this virtual keyboard was previously software aligned to correspond to the direction of the user's fingers and hand.

FIG. 6B depicts a simplified exemplary front panel view of a smaller handheld computerized device displaying the position and motion of one finger in contact with the touchpad of the back panel, in accordance with one embodiment of the present invention. The position of a small virtual keyboard, composed of a plurality of groups of keys, is also shown. Here this virtual keyboard was previously software aligned to correspond to the direction of the user's fingers and hand.

Figure 6C:
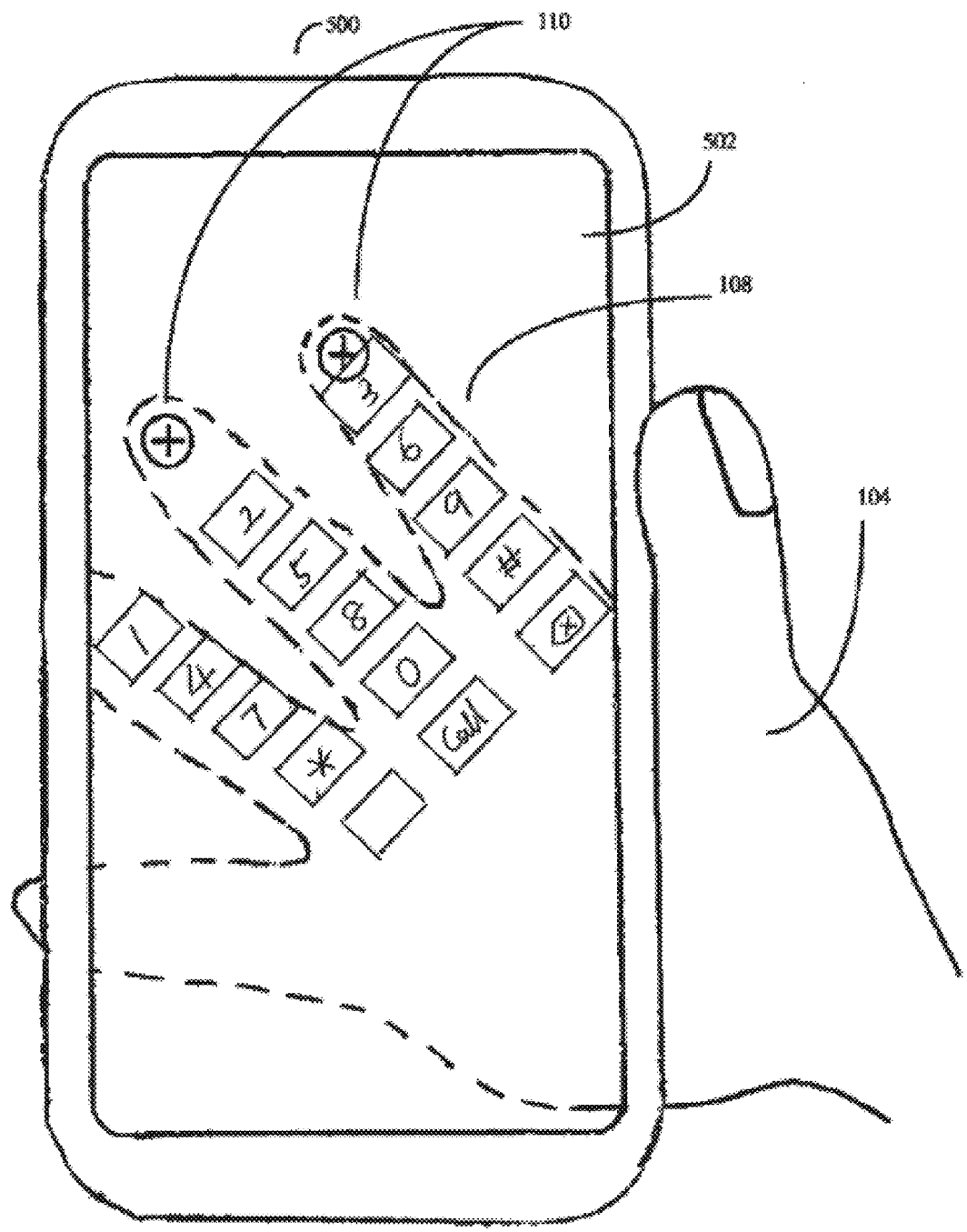
FIG. 6C depicts a simplified exemplary front panel view of a smaller handheld computerized device displaying the position and motion of one finger in contact with the touchpad of the back panel, in accordance with one embodiment of the present invention. The position of a small virtual keyboard, composed of a plurality of groups of keys, is also shown. Here the keys were previously software aligned to correspond to the direction of the user's fingers and hand, and the spacing between the keys has also been user adjusted by software.

FIG. 6C depicts a simplified exemplary front panel view of a smaller handheld computerized device displaying the position and motion of one finger in contact with the touchpad of the back panel, in accordance with one embodiment of the present invention. The position of a small virtual keyboard, composed of a plurality of groups of keys, is also shown. Here the keys were previously software aligned to correspond to the direction of the user's fingers and hand, and the spacing between the keys has also been user adjusted by software.

Figure 6D:
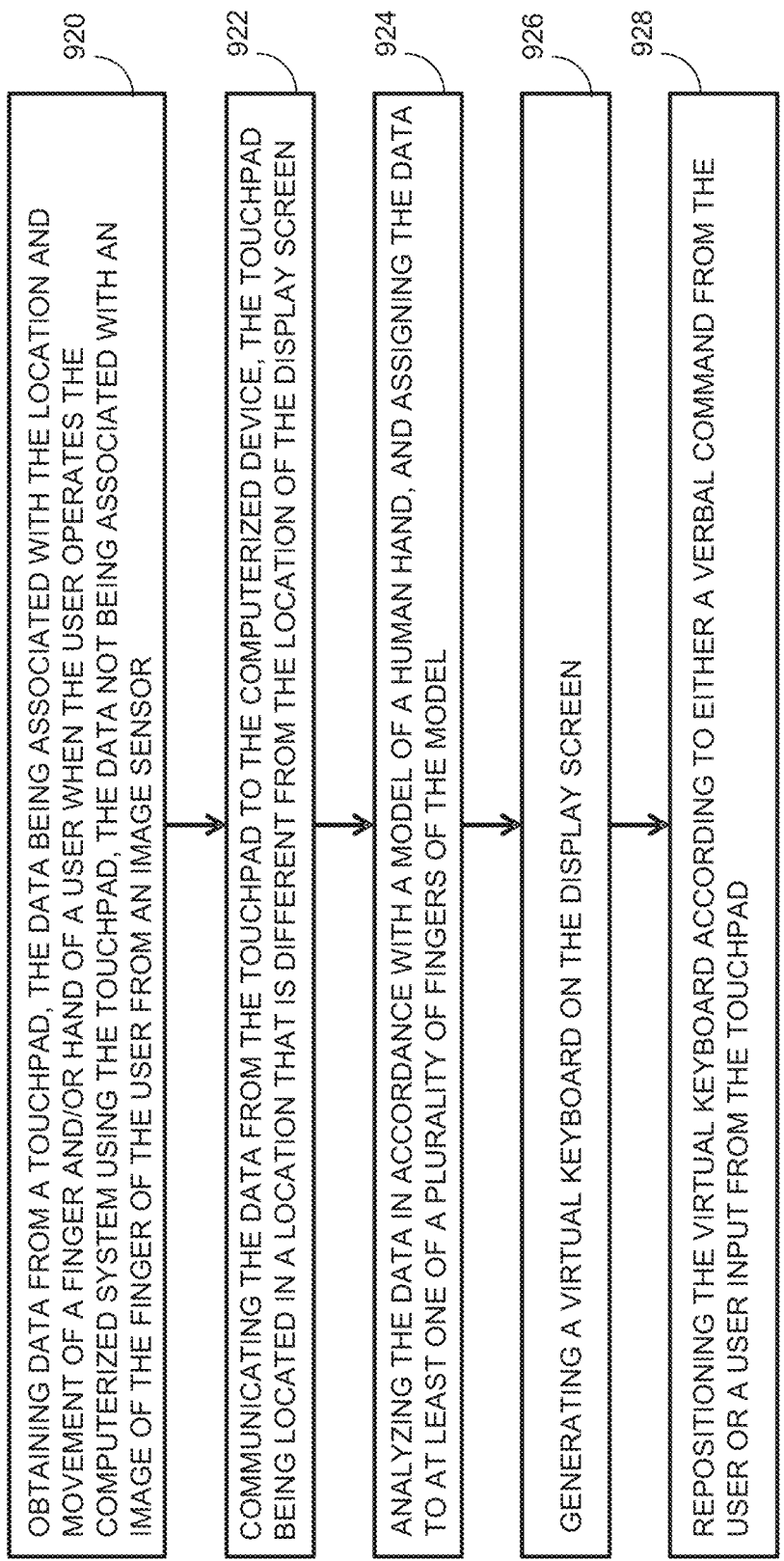
FIG. 6D depicts a simplified exemplary flowchart how biomechanical models of hand and finger movement may be used to display a virtual image of at least a portion of a hand of a user on a display screen of the computerized system of FIG. 8, in accordance with one embodiment of the present invention.
Figure 8:
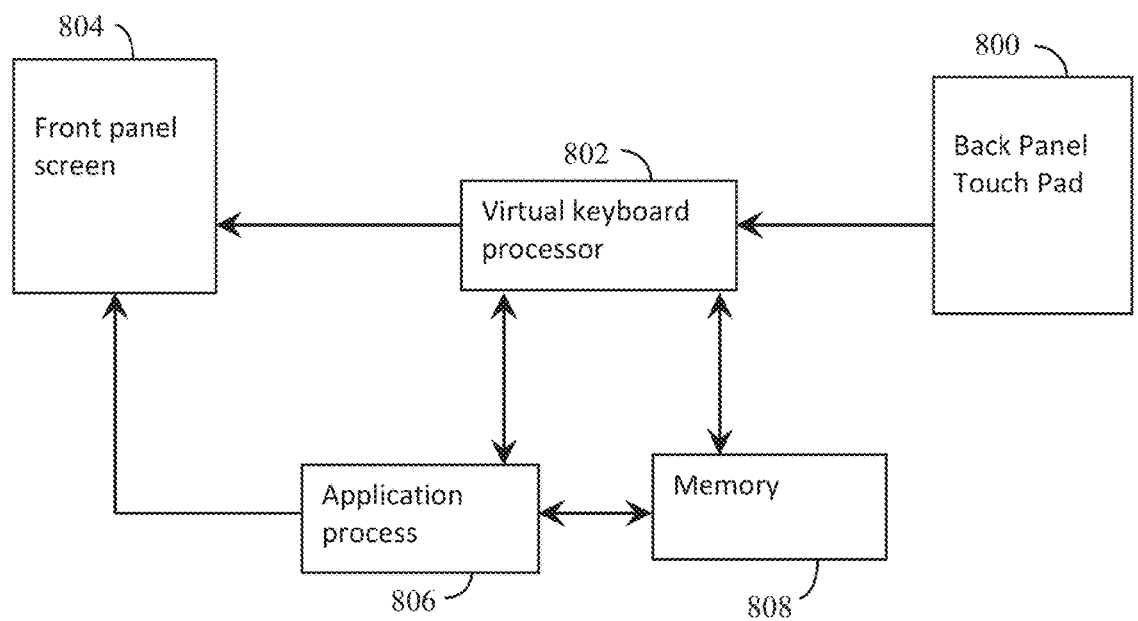
FIG. 8 depicts a simplified exemplary block diagram of a computerized system capable of executing various embodiments of the invention, in accordance with one embodiment of the present invention.

FIG. 6D depicts a simplified exemplary flowchart how biomechanical models of hand and finger movement may be used to control a virtual keyboard on a display screen of the computerized system of FIG. 8, in accordance with one embodiment of the present invention. FIG. 6D depicts the method includes obtaining data from a touchpad, the data being associated with the location and movement of a finger and/or hand of a user when the user operates the computerized system using the touchpad, the data not being associated with an image of the finger of the user from an image sensor (620). The method further includes communicating the data from the touchpad to the computerized device, the touchpad being located in a location that is different from the location of the display screen (622). The method further includes analyzing the data in accordance with a model of a human hand, and assigning the data to at least one of a plurality of fingers of the mode (624), computing a graphical representation of at least one finger of the user in accordance with the model (926), generating a virtual keyboard on the display screen (628), and repositioning the virtual keyboard according to either a verbal command from the user or a user input from the touchpad (630).

Figure 7:
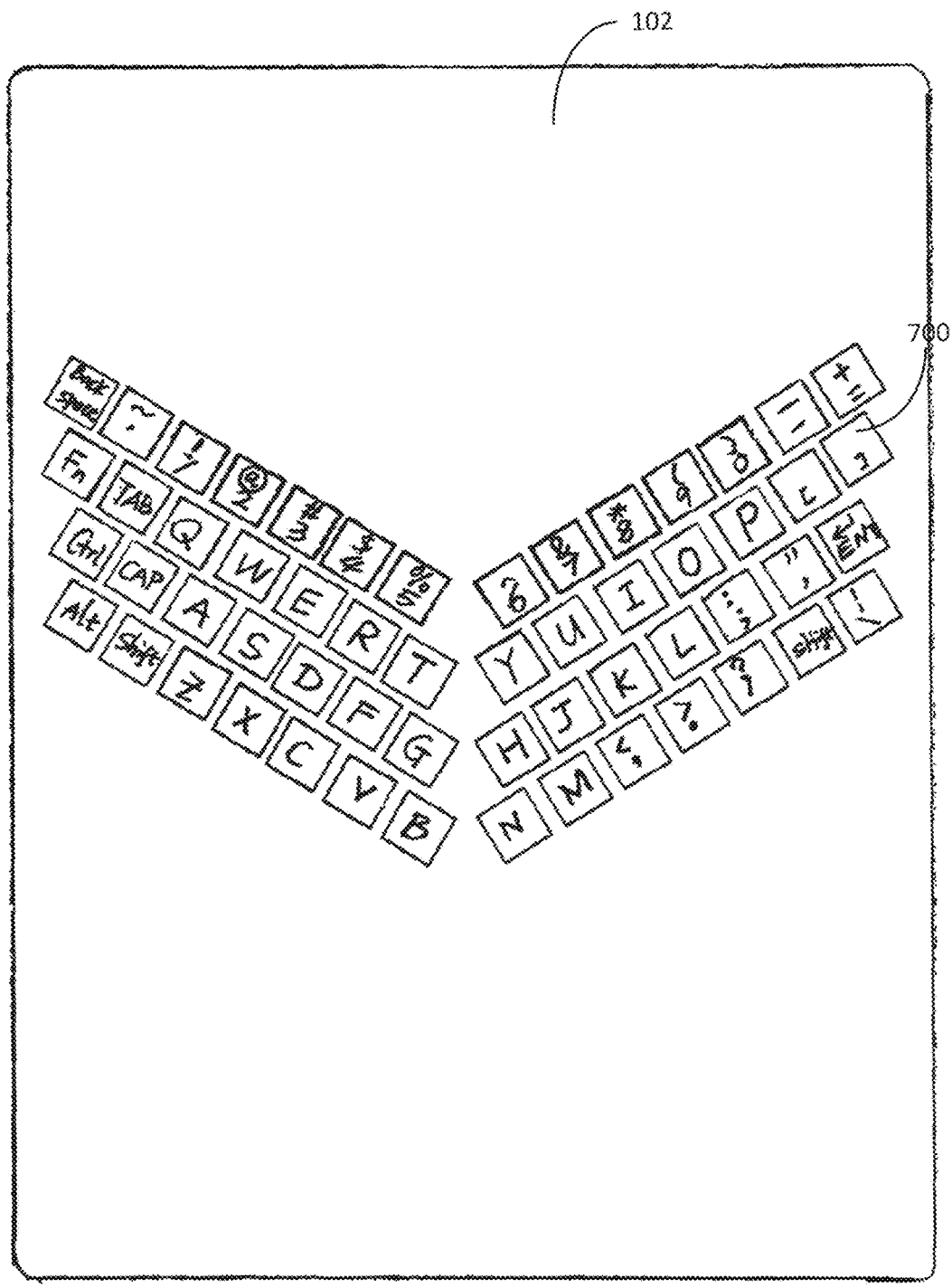
FIG. 7 depicts a simplified exemplary front panel view of the handheld computerized device displaying another embodiment of the layout of virtual keys as the standard virtual keyboard, in accordance with one embodiment of the present invention.

FIG. 7 depicts a simplified exemplary front panel view of handheld computerized device (100) depicted in FIG. 1 displaying another embodiment of the layout of virtual keys (700) as the standard virtual keyboard, in accordance with one embodiment of the present invention. FIG. 7 depicts another embodiment of the layout of virtual keys (700) may include a modified QWERTY keyboard or keypad that includes splitting the keyboard in half and displaying each half of the keyboard at an angle adapted for better ergonomic typing than the keyboards depicted previously.

In one embodiment, a computer-implemented method includes a handheld computerized device, including a screen on the front of the device capable of displaying a graphical user interface, and a touch sensitive back panel or side panel or other area other than the display screen, and a user interface, such as a two dimensional touch sensor. For simplicity, this touch sensitive panel, which need not necessarily be flat, and need not necessarily be mounted on the back side of the device, hereinafter also referred to as a "touchpad," "touch sensor," or "touch sensitive back panel", but this use is not intended to be limiting.

The touch sensor will determine the motion of the fingers in real time, and the computerized system's or device's software and processor(s) will use the touch sensor data to compute the real time position and motion of the user's fingers that are touching the touch sensor on the back panel. These "virtual fingers" will then be displayed on the device's graphical user interface on top of a static background where optionally a multitude of groups of keys, including numbers, letters, and symbols (e.g. a virtual keyboard) or hyperlinks may be displayed. By watching the motion of the user's virtual fingers on the virtual keyboard, the user may easily operate the device, and optionally determine precisely where to strike a finger in order to hit an intended virtual key.

In one embodiment, the back panel user interface (UI) may be outlined in a distinctive yet non-obstructive color and displayed as a transparent layer over the current applications; hence all the details of current application and back panel UI are shown to the user at the same time.

In one embodiment, the real time position and motion of the fingers holding the back panel may be displayed on the screen of the front panel.

In one embodiment, the layout of a multitude of groups of keys, including numbers, letters, and symbols may be displayed on the screen of front panel as background of real time position and motion of the fingers holding the back panel.

In one embodiment, the real time position and motion of the fingers holding the back panel may be displayed on the static background of a multitude of groups of keys, including numbers, letters, and symbols, enabling the user to precisely strike a finger on an intended key.

In one embodiment, the display of the virtual hand may be creative and artistic. For example, the display may instead show a skeleton, an animal claw, a furry hand, a tattooed hand, and the like to achieve more compelling or amusing effects.

In one embodiment, a computer-implemented method, including a handheld computerized device includes a touchpad installed on the back panel. The touchpad is able to sense the touch point positions, movement, and stroke motion data of a multitude of fingers. The data information of the finger motion of one or a multitude of fingers, including the motion type, e.g., touch, movement, and stroke patterns, and the like, and motion position, is passed to a virtual keyboard processor, such as a computer processor. The virtual keyboard processor may analyze the finger motion, compare the finger positions with the registered position of the keys, hereinafter referred to as virtual keys, as well as the hyperlinks and other touch buttons of the application program, e.g., generically the "user entry area", and then will decide which item in the user entry area was stroked or actuated. The virtual keyboard processor may then invoke the corresponding operation. The virtual keyboard processor may also update the real time image of the fingers, or finger pads or touch points, or indeed the user hand(s) on the front screen after each finger motion.

In one embodiment, the touchpad may be installed on the back panel of the handheld computerized device, and may be able to sense the touch, movement, and stroke motion of a multitude of user fingers.

In one embodiment, the information pertaining to the finger motion of a multitude of user fingers, including the motion type, e.g., touch, movement, and stroke action, and the like, as well as motion position, may be passed to a virtual keyboard processor.

In one embodiment, the virtual keyboard processor may analyze the finger motion, compare finger position with the registered position of the keys, determine which key was stroked, and invoke the corresponding operation, In one embodiment, virtual keyboard processor may update the real time position and motion of the fingers holding the back panel.

One embodiment of the present invention includes a graphical user interface (GUI) for a handheld computerized device. The interface may include a display of a multitude of groups of keys, including numbers, letters, and symbols. The keys may be displayed on a graphical user interface on the front panel display screen, and indeed this display area may occupy the whole screen. Thereby, the content of the graphic user interface is not blocked by applications, and is shown together with the applications.

One embodiment of the present invention includes a graphical user interface for a handheld computerized device. This interface includes a display of the real time position and motion of the fingers holding the back panel. Here the display is on the front panel screen, and in fact may occupy the whole screen. Due to the advantages of this approach, the content of the user's finger position and motion is not blocked by applications, or by the display of groups of keys, including numbers, letters, and symbols.

One embodiment of the present invention includes a method of assisting user data entry into a handheld computerized device. This handheld computerized device includes at least one touchpad in one embodiment being located on a side of the handheld computerized device that is behind the side of the device that holds the graphics display screen, at least one graphics display screen, at least one processor, memory, and software. Often, however, the handheld computerized device will lack a mechanically actuated and/or permanently dedicated physical QWERTY keypad or keyboard, and may also lack a mechanically actuated and/or permanently dedicated physical numeric keypad or keyboard as well. The method will usually include displaying at least one data entry location on the at least one graphics display screen of the device. Often this at least one data entry location will be a graphical display of a keyboard or keypad that may be included of a multitude of data entry locations. Here, the system will use the touchpad to obtain data on the location and movement of the user's fingers and/or hand. The system may analyze the data on the location and movement of the user's fingers and/or hand according to a biomechanical and/or anatomical model of a human hand, and will assign data on the location and movement of the user's fingers and/or hand to specific fingers on this biomechanical and/or anatomical model of a human hand (usually the user's hand). The system may then use this biomechanical and/or anatomical model of the human hand to compute a graphical representation of at least the user's fingers, and frequently both the user fingers and the user hand(s). The system will then display the graphical representation of at least the user's fingers (and again frequently both the user's finger and hand), on the device's graphics display screen. Thus the distance between the graphical representation of the user's virtual fingers on the graphics display screen, and the virtual data entry location (such as the virtual keyboard) will give information that will help the user properly position his or her real fingers and/or hand on the touchpad, which in turn will facilitate data entry.

FIG. 8 depicts a simplified exemplary block diagram of a computerized system 800S capable of executing various embodiments of the invention, in accordance with one embodiment of the present invention. Computerized system 800S includes software and hardware that may be used to implement one embodiment of the invention such as a front panel screen (804), a back panel touch pad 800, a virtual keyboard processor (802), an application process (806), and a device memory (808). Finger position and motion data are first collected from back panel touch pad (800), and then passed to virtual keyboard processor (802). The virtual keyboard processor (which will often be implemented by a combination of software and hardware such as a microprocessor, graphics processor, touchpad controller, and memory) displays the virtual finger position and motion together with the keyboard layout on front panel screen (804). The virtual keyboard processor also analyzes the finger position and motion information data, compares the data with the registered position of the keys (or hyperlinks) and invokes proper operation in application process (806). The keyboard position information may be programmed in a virtual keyboard process, or alternatively may be saved in system memory (808). The key-press or hyper-link information that the user intends to relay to the applications may be passed to the virtual keyboard controller either through memory, or alternatively through inter-process communications.

Other touchpad and screen locations.

In one embodiment, the display screen may be located at some distance from the touchpad. Indeed, the display screen and the touch pad may not even be physically connected at all. Rather the touchpad may transmit data pertaining to the user's hand position to a processor, which in turn may then generate the virtual image of the user's hand and display the virtual hand on the display screen, and neither touchpad, processor, or display screen need to be physically connected (although they may be). For example, data pertaining to the user's hand and finger position relative to the touchpad may be transmitted by a wired, wireless, or optical (e.g. infrared) method to the processor. The processor in turn may transmit the virtual image of the user's fingers and hand to the display screen by a wired, wireless, or optical (e.g. infrared) technique. As a result, the user's real hand will be moving close to a touchpad at a different place other than the current display screen. The display screen may thus be in nearly any location, such as on a regular monitor, TV screen, projector screen, or on a virtual heads-up eyeglass display worn by the user (e.g. a device similar to Google Glass).

Touch pads including non-flat surfaces.

Although touch pads are often flat and roughly rectangular devices, there is no constraint that the touch pads using embodiments of the present invention be either flat or rectangular. Indeed in some embodiments, there is advantage to employing touch pads that include variably shaped and curved surfaces. Such curved and/or variably shaped touch pads could be then placed on various non-traditional locations, such as on the surface of a ball or cylinder, on the surface of various common devices such as glasses frame stems for virtual heads-up displays such as windshields, eyeglasses, and the like, other wearable computerized devices such as smart watch bands, steering wheels—either for a vehicle or a game interface, joysticks, and the like, and/or, dashboards, instrument panels, and the like.

Touchpad technology.

In principle, many different types of touchpad technology may be used for this device, including capacitive sensing, conductance sensing, resistive sensing, surface acoustic wave sensing, surface capacitance sensing, projected capacitance sensing, strain gauges, optical imaging, dispersive signal technology, acoustic pulse recognition, pressure sensing and bidirectional screen sensing. However, in a preferred embodiment, touchpad sensing technology that is capable of sensing multiple finger positions at the same time may be used. Such an ability to sense multiple finger positions or gestures at the same time hereinafter also referred to as "multitouch" or "multi-touch" sensing technology. Touchpads are thus distinguished from previous mechanical keyboards or keypads because touchpads are not mechanically actuated, that is, since the surface of a touchpad is substantially rigid and responds to touch instead of a mechanical deflection, the touchpad gives the user substantially no indication that the immediate surface of the touchpad moves where touched, except perhaps for the entire rigid touchpad moving as a result, even with pressure sensitive touchpad technology. Touchpads are further distinguished from previous mechanical keyboards or keypads because the shape and/or location of input keys or buttons on a touchpad are not fixed because the keys and/or buttons are instead displayed on an electronically controlled screen with the flexibility of software control and not limited by fixed mechanical elements located on the device.

One example of a multi-touch touchpad embodying the present invention may use a touch sensing device commercially available from Cypress Semiconductor Corporation, San Jose, Calif. and commonly known as the Cypress TrueTouch™ family of products. This family of touchpad products works by projective capacitive technology, and is suited for multi-touch applications. The technology functions by detecting the presence or proximity of a finger to capacitive sensors. Because this touchpad system senses finger proximity, rather than finger pressure, it is well suited to multi-touch applications because, depending upon the tuning of the capacitance detection circuit, various degrees of finger pressure, from light to intense, may be analyzed. Although often used on touch screens, the projective capacitive technology method may function with a broad range of substrates.

Virtual finger and hand position software (virtual keyboard processor)

As others have noted, one problem with attempting to create "virtual fingers" is that at best, usually just certain regions of the hand, such as the fingertips and perhaps the palms, may usually be detected by conventional multi-touch sensors. To overcome this issue bootstrapping from hand-position estimates has been suggested, which overcomes the invisibility of structures that link fingertips to palms. Suitable algorithms could be obtained by using context-dependent segmentation of the various proximity image constructs, and by parameterizing the pixel groups corresponding to each distinguishable surface contact. It was found that by path-tracking links across successive images, those groups which correspond to the same hand part could be determined, and it was possible to reliably detect when individual fingers touched down and lifted from the multi-touch pad surface. It has been proposed that a number of different combinatorial optimization algorithms that used biomechanical constraints and anatomical features to associate each contact's path with a particular fingertip, thumb, or palm of either hand. Such algorithms further operated by assigning contacts to a ring of hand part attractor points, using a squared-distance cost metric, to effectively sort the contact identities with respect to the ring of hand part attractor points.

A skeletal linked model of the human hand based software that creates a biology-based (biomechanical and/or anatomical) model of joint motion and associated set of constraints has been proposed. The skeletal linked model approach also is based on a software model of the skin that may stretch and bulge in order to accommodate this internal skeleton. The software models a natural joint axis for four different types of joints in the human hand, as well as takes into account the relative lengths of the underlying hand bone structure, and also accounts for the space occupied by the hand's muscles and skin.

Figure 25:
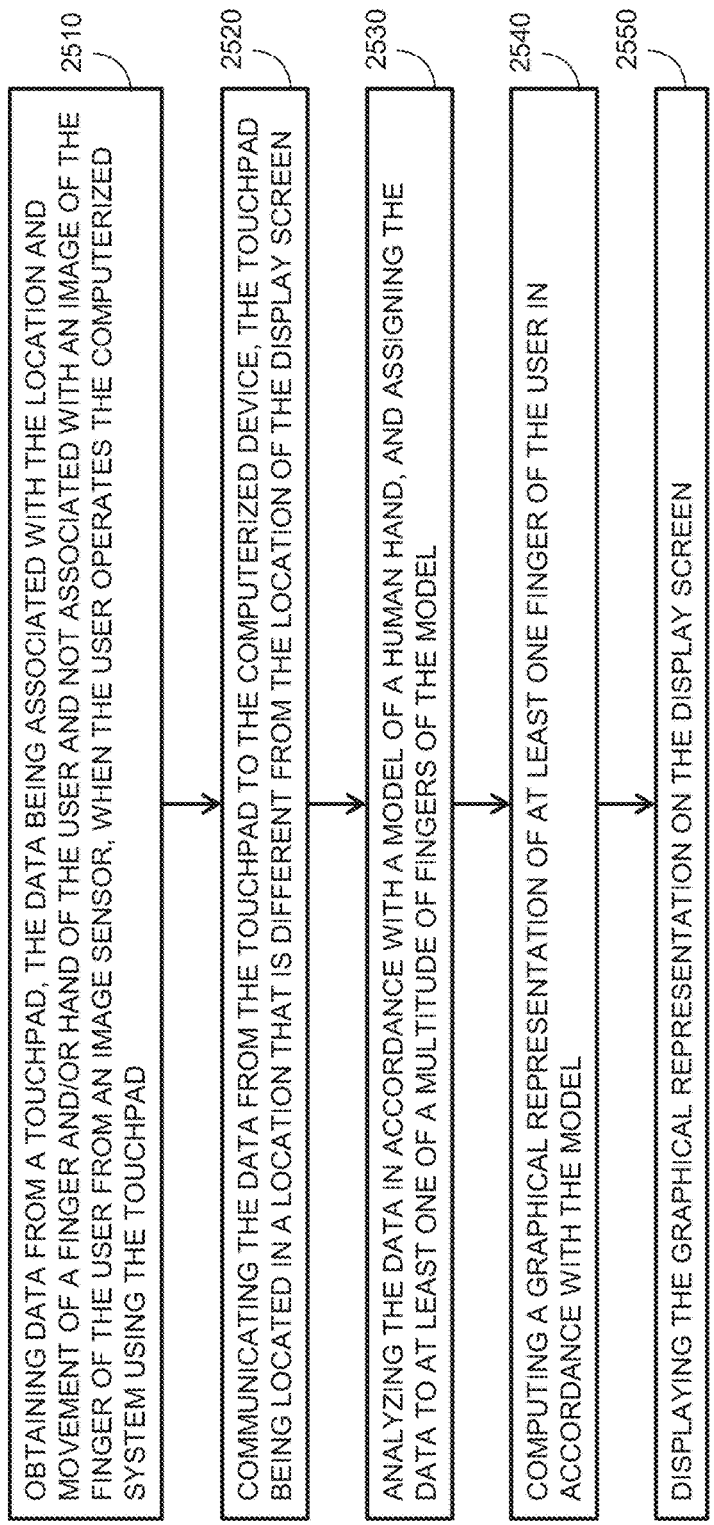
FIG. 25 depicts a simplified exemplary flowchart how biomechanical models of hand and finger movement may be used to display a virtual image of at least a portion of a hand of a user on a display screen of the computerized system of FIG. 8, in accordance with one embodiment of the present invention.

FIG. 25 depicts a simplified exemplary flowchart how biomechanical models of hand and finger movement may be used to display a virtual image of at least a portion of a hand of a user on a display screen of the computerized system of FIG. 8, in accordance with one embodiment of the present invention. FIG. 25 depicts the flowchart includes obtaining data from a touchpad, the data being associated with the location and movement of a finger and/or hand of the user and not associated with an image of the finger of the user from an image sensor, when the user operates the computerized system using the touchpad (2510). The flowchart further includes communicating the data from the touchpad to the computerized device, the touchpad being located in a location that is different from the location of the display screen (2520). The flowchart further includes analyzing the data in accordance with a model of a human hand, and assigning the data to at least one of a multitude of fingers of the model (2530), computing a graphical representation of at least one finger of the user in accordance with the model (2540), and displaying the graphical representation on the display screen (2550).

Figure 9:
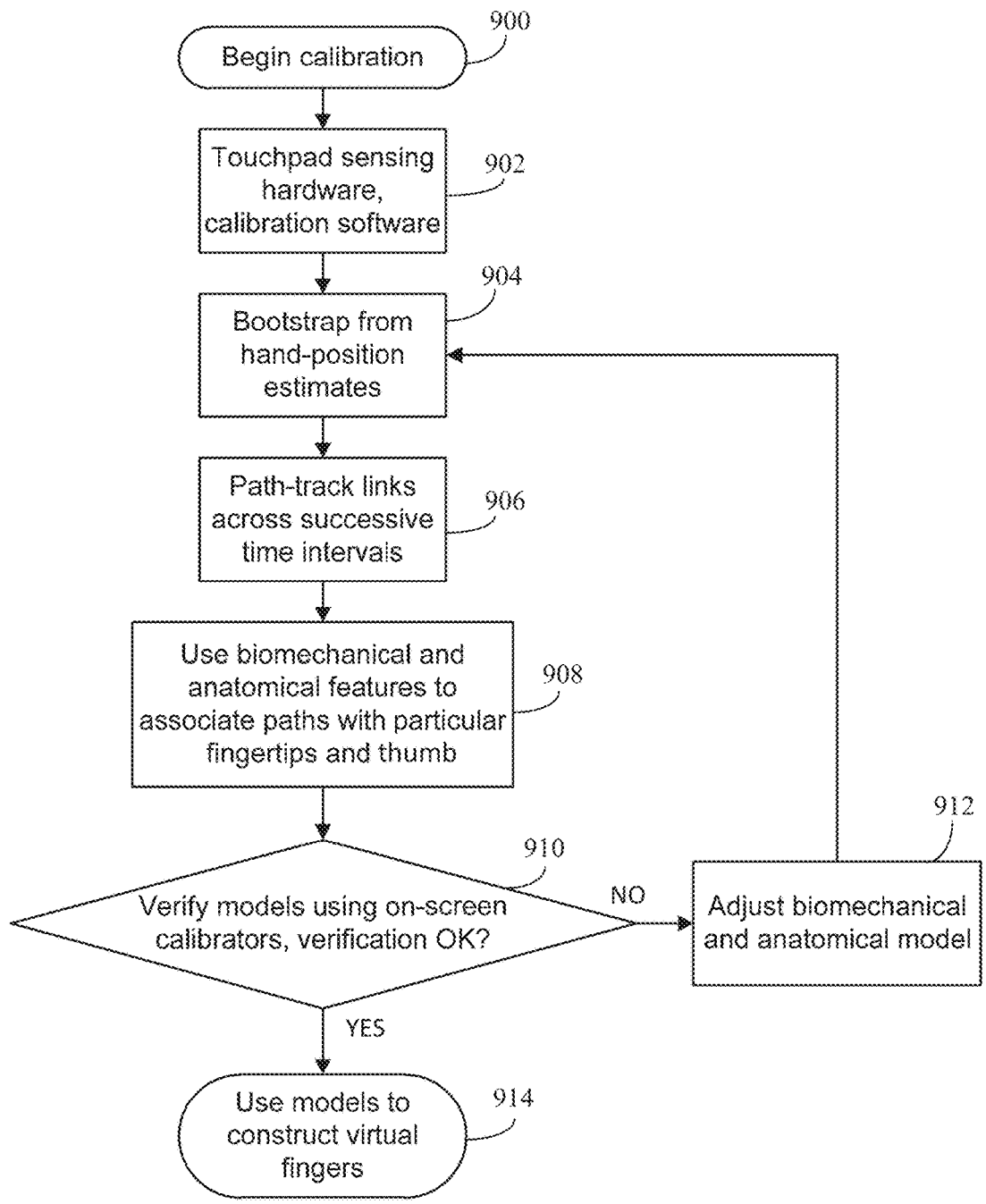
FIG. 9 depicts a simplified exemplary flowchart how biomechanical models of hand and finger movement may be calibrated and adapted to help turn the raw touchpad data into an accurate model of the user's hand and finger positions, in accordance with one embodiment of the present invention.

FIG. 9 depicts a simplified exemplary flowchart how biomechanical models of hand and finger movement may be calibrated and adapted to help turn the raw touchpad data into an accurate model of the user's hand and finger positions, in accordance with one embodiment of the present invention. The system may work with adequate accuracy using standardized models of hand and finger relationships. For example, the system may perform adequately by an initial calibration step where the system invites the user to place his or her hand on the display screen, the system displays various sized hands, and the user is invited to enter in which standardized hand size best fits his or her own hands. The system may then use this data for its various calculations. Even more simply, the system may default to an average hand size for initial use, allowing some degree of functionality to be achieved with no preliminary calibration.

In one embodiment, it will be useful to better calibrate the system by employing one or more active calibration steps. These steps may refine the initial hand model under actual use conditions, and make appropriate adjustment to the various portions of the hand model as will best fit data that has been obtained under actual use conditions. An example of this active calibration process is shown in FIG. 9. Here the system may invite the user to do an active calibration step, or alternatively the user will voluntarily start an active calibration step, in step (900). In one embodiment, the model includes calibration information in accordance with pressing a portion of the user's hand on the touchpad in a specified manner. To facilitate this calibration step, the system may optionally display one or more targets on the screen, which may be keyboard targets, or alternatively may be specially designed calibration targets specifically designed for the active calibration step. Optional photographic calibration steps are described for FIG. 14.

In one embodiment referring to FIG. 9, to reduce complexity, the system may optionally request that the user calibrate one hand at a time, and indeed may request that the user operate the fingers on his or her hand in a manner different from normal typing so as to gather additional data. For example, a user may be requested to first extend a specific finger to a maximum length and press, then to a minimum length and press, then to the extreme left and press, then to the extreme right and press and so on, potentially through all fingers and the thumb on a one at a time basis. It should be apparent that such a data set may then naturally be translated into a reasonably detailed model of that particular user's hand and its capabilities to maintain a number of different configurations. During the calibration process, the system will accumulate touch data by invoking touchpad sensing hardware and calibration software (902). The system will also make predictions as to the location of the user's hand and fingers by bootstrapping from various hand position estimates (904). Often the system will track the positions of the hand and fingers across successive time intervals to do the predicting, and compute probable finger paths (906). The system will often use its internal model of the user's hand biomechanical features and anatomical features to do the computing, and to help associate the various projected paths with the user's fingertips and thumb position, which at least during the active calibration process will be known (908). Here a path is understood to be the line or linkage between at least one finger root and the associated fingertip or touchpad touch point for the associated finger. The system will then refine its models of the user's hand biomechanical and/or anatomical features by comparing the predicted results with real data, and determine if its user hand model is working with sufficient accuracy in step (910). If it is, then this user hand model will then be adopted and used for subsequent user virtual keyboard data entry purposes (914). If the user hand model is not working with sufficient accuracy, then the system will attempt to adjust the hand model by varying one or more hand-model parameters (912), and often will then continue the calibration process until acceptable performance is obtained.

Thus the calibration software enables the biomechanical and/or anatomical model of the human hand to be calibrated more accurately, so as to match the biomechanical and/or anatomical characteristics of a particular user's fingers and/or hand.

In one embodiment, the realism of the simulated virtual fingers on the screen may optionally be facilitated by the use of predictive typing models. The predictive typing model approach will be particularly useful when the user is typing text on a virtual keyboard, because the system may scan the previous text that has been entered, and utilize a dictionary and other means, such as the statistical distribution of letters in the particular language, to make educated guesses as to what letter is going to be typed next. This educated guess may then be used to supplement the touchpad data as to last fingertip position and movement to tend to direct the appearance of the simulated finger towards the logical next key. Because this system will occasionally tend to guess wrong, however, the user may find it useful to adjust this predictive typing "hint" to various settings depending upon the user and the situation. Thus, a user who is an experienced touch typist and who tends to type both fairly quickly and fairly accurately will tend to find the predictive typing hints useful, because the predictive approach will tend to work well for this type of user. On the other hand, a user who is more of a slow and uncertain "hunt and peck" typist may find the predictive approach to be less useful, and may wish to either reduce the strength of the hint or potentially even turn the predictive typing "hint" off altogether.

Figure 10:
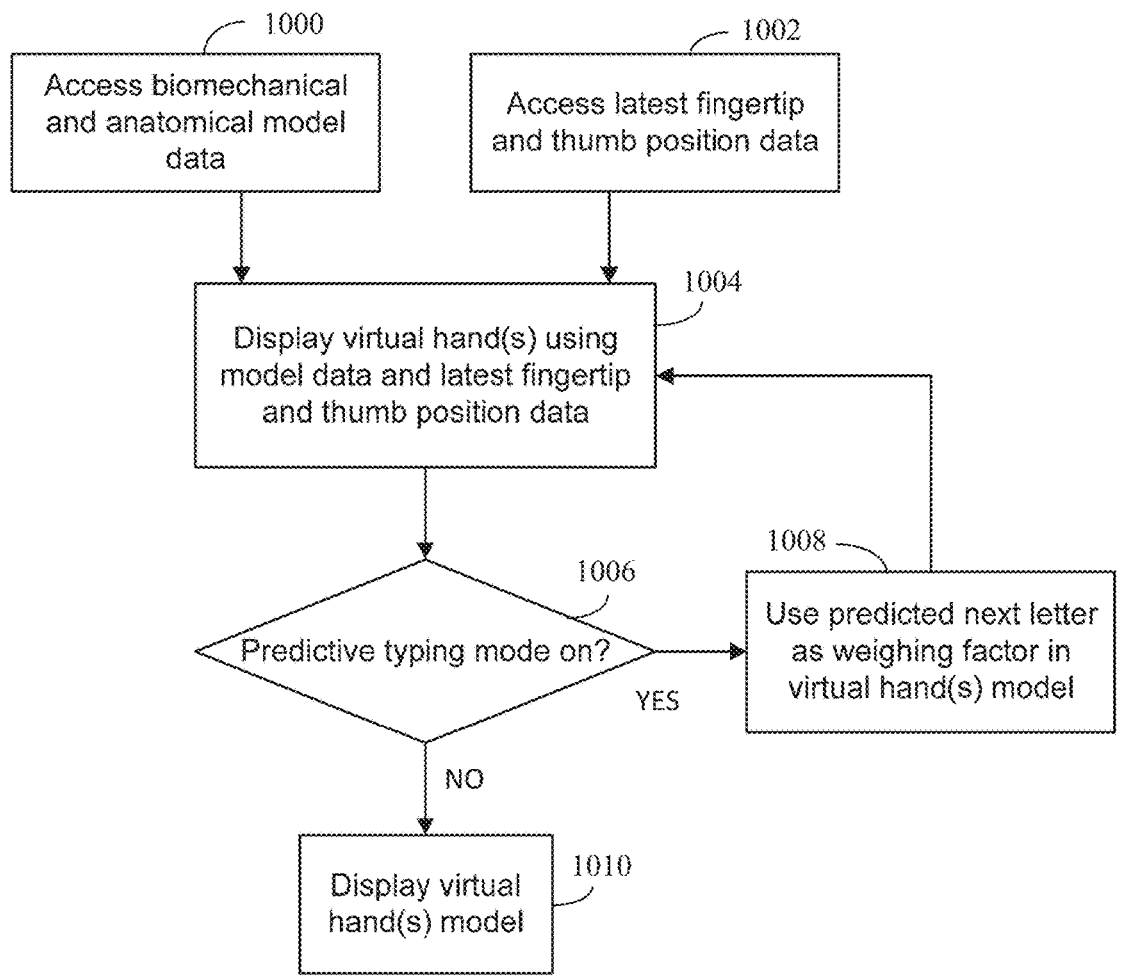
FIG. 10 depicts a simplified exemplary flowchart how predictive typing methods may be used to improve the accuracy of the appearance of the virtual hand and fingers while typing, in accordance with one embodiment of the present invention.

FIG. 10 depicts a simplified exemplary flowchart how predictive typing methods may be used to improve the accuracy of the appearance of the virtual hand and fingers while typing, in accordance with one embodiment of the present invention. In a predictive typing system, the software will first access both the biomechanical and/or anatomical model data for the user's hands (1000), and the latest fingertip and thumb position data from the touchpad sensors (1002). The system will then use this information to display the user's virtual hands and fingers on the device's display screen (1004). If a predictive typing mode is on (1006), then the system will attempt to deduce (based upon typing speed, as well as the user's consistency in typing speed, and context) what is the most probable letter or letters that the user is likely to type next. The system will also attempt to predict the most probable finger or fingers that the user will use to type this most probable letter (1008). For example, if the user is typing quickly and consistently, and the context of the word or sentence indicates that a vowel such as "e" is likely, then the system may use this factor in its analysis of the somewhat noisy finger position data from the touch sensor to increase the probability that the user's left index finger (often used to type "e" on a keyboard, and which in-fact may not be registering on the touch pad because the user has lifted the left index finger to move to strike the "e" key), is moving towards the "e" key. When used properly, such predictive typing algorithms may help increase the illusion that the user is looking through the display and onto his or her hands below the display even though the display/computerized device is not actually transparent. Conversely, if the predictive typing mode is turned "off" or set to reduced intensity (1010), then the system will not take the probable next letter into account in its display of the user's hand and fingers and instead just displays using the virtual hand(s) model.

In one embodiment, the efficiency of the predictive typing may be further enhanced by incorporating the user's history of finger use for each particular key. For example, one user may have a strong tendency to use the right index finger to type the keys "H" and "J", and as another example the same user may have a tendency to user his or her left pinky finger to type the letter's "A" and "Z". Here the system may observe the individual user's typing patterns over time, either as part of an initial calibration step, or later (and in one embodiment even continually) while monitoring the user's typing patterns, and use the user's individualized finger-to-letter correlation habits as part of the predictive typing algorithm.

Thus the predictive typing software enables the computerized device to compute the graphical representation of at least the user's fingers, and often the user's fingers and hands, with better precision by additionally using keystroke predictions, in addition to the data on the location and movement of the user's fingers and/or hand obtained using the touchpad.

In one embodiment, in order to improve the realism of the virtual fingers, additional "finger hover" algorithms may also be used. As used in this specification, "finger hover" means highlighting or otherwise graphically altering the appearance of a virtual key on a virtual keyboard whenever the system believes that the user's finger is either hovering above that virtual key, or about to strike that virtual key. For this type of algorithm, use of touchpads that may sense relative finger proximity to the touchpad surface, such as projective capacitive technology touchpads, may be particularly useful.

The sensors and algorithms that detect relative finger-height above a surface may be tuned to various degrees of sensitivity, and indeed this sensitivity level represents an important engineering tradeoff. If the touchpad is tuned to too high a sensitivity, then it will tend to generate spurious (false) signals, and also lack precision as to precisely where on the touchpad a finger is about to land. If the touch pad is tuned to a lower sensitivity, then the touchpad will tend to detect fingertips that are exerting a considerable amount of pressure on the touchpad surface.

Although many prior art touchpads tend to use a continual or fixed level of touchpad sensitivity at all times, in one embodiment for the "finger hover" option described in this specification, use of a dynamic or variable level of touchpad sensitivity may be advantageous. For example, to detect finger hovering above a key, a touchpad might first operate at a normal level of sensitivity until it detects that a fingertip within strategic striking distance of a particular key has left the surface of the touchpad. At this point, in order to detect "finger hover" above the key, the touchpad circuitry might temporarily reset its sensitivity to a higher level, designed to more precisely detect when the user's finger is hovering above the key. If the higher level of touchpad sensitivity detects the fingertip proximity, the key may be highlighted. If the higher level of touchpad sensitivity does not detect the hovering fingertip, then the key will not be highlighted. After a short period of time, about on the order a tenth of a second, the touchpad may then be reset to the normal level of sensitivity to more precisely determine if the finger has then actually touched the touchpad, or not.

Figure 11:
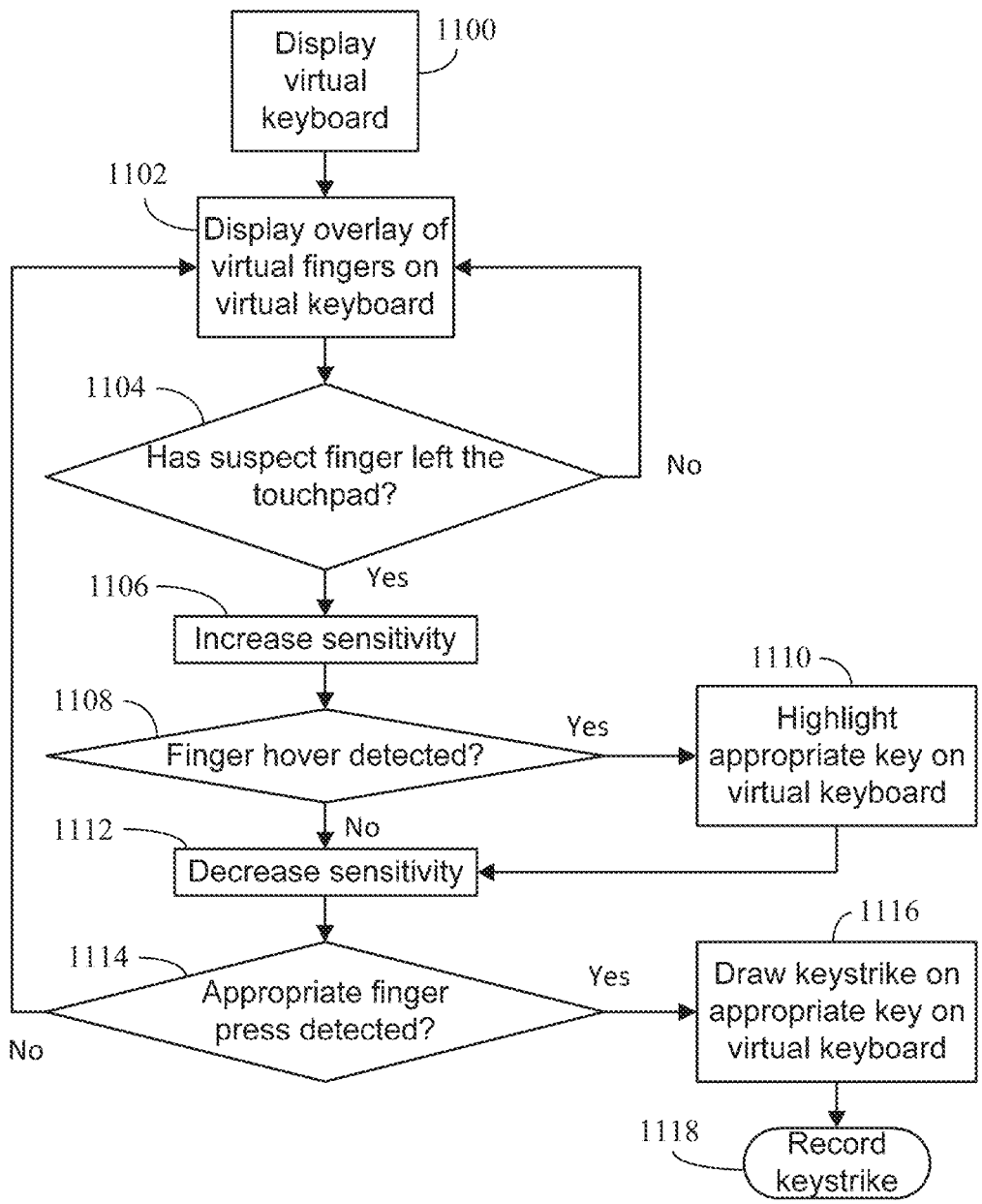
FIG. 11 depicts a simplified exemplary flowchart how dynamic changes in touchpad sensitivity may, for finger proximity touchpads, assist in highlighting the virtual keys about to be struck by a user while typing on the virtual keyboard, in accordance with one embodiment of the present invention.

FIG. 11 depicts a simplified exemplary flowchart how dynamic changes in touchpad sensitivity may, for finger proximity touchpads, assist in highlighting the virtual keys about to be struck by a user while typing on the virtual keyboard, in accordance with one embodiment of the present invention. In other words, FIG. 11 depicts an example of an algorithm to detect and indicate "finger hover". Here the system displays the virtual keyboard (1100), as well as an overlay of the user's virtual fingers on or near this virtual keyboard (1102). When the system detects that a finger, suspected of being a finger about to press a key due to the finger's proximity to the key and or predictive typing considerations, leaves the touchpad (most likely because the user has raised the finger above the touchpad in preparation for striking the virtual key), (1104) the system will momentarily turn the touchpad finger proximity detector to a higher level of sensitivity (1106), and the software will look to see if finger hover over the suspected key or keys may be detected (1108). If the system does not detect that a finger is suspect of leaving the touchpad, the system returns to step 1102. If a finger hover signal may be detected over the suspected key, then this key will be highlighted to help guide the user (1110). After a period of time that will not normally exceed about a tenth of a second or if no finger hover is detected, the system will once again lower the sensitivity of the finger proximity detector down to the normal level (1112), in order to precisely detect if the finger is about to strike the key (1114). If the touchpad, now operating at normal sensitivity, now detects that the virtual key has been struck by the user, the system will appropriately indicate the keystroke on the virtual key board by further graphical changes to the key (1116) and optionally may issue an audible key-press or key-click sound as well to give further feedback to the user. Then the system may record the key strike (1118). If the appropriate finger press was not detected at (1114), then the system repeats the flow at step (1102).

More generally, the finger hover algorithm approach allows at least one data entry location (key) to be highlighted on the device's graphics display screen whenever the computerized device determines that at least one finger on the user's hand has left the touchpad, and the position and motion history of the finger is consistent with an ability of that finger to strike a position on the touchpad that is consistent with the location of the data entry location (key) on the graphics display screen.

Graphical representation of the user's human hand(s) and fingers.

Once the computerized device has obtained data from the touchpad, as well as any additional predictive typing data, hover detection method data, calibration data, and the like, and has updated its internal biomechanical and/or anatomical model of the user's hand or hands (including the fingers) to reflect this new data, then the system may utilize this biomechanical and/or anatomical model of the user's hand or hands to compute a graphical representation of at least the user's fingers, and often the user's hand and figures, suitable for display on the device's graphics display screen.

A life-like graphical representation of the user's hand and fingers is not necessary. Often, a more shadow-gram like or cartoon-like two-dimensional model (or representation) of the user's hand and fingers will be all that will be necessary. Often these two-dimensional representations of the user's hand and fingers need not include much, if any internal detail. Rather, these representations, may for example, look much like a translucent gray or other colored shadow projection of the user's hands and fingers on a surface. Here, the sharpness and the contrast and the detail of the user's hands and fingers may have reduced sharpness, and have enough distinguishing contrast from other areas of the display screen, so as to enable the user to accurately place his or her hands and fingers on the appropriate virtual buttons or virtual keyboard that is being shown in the graphical display. More fanciful or artistically inspired hand representations are also discussed later in this specification.

Figure 12:
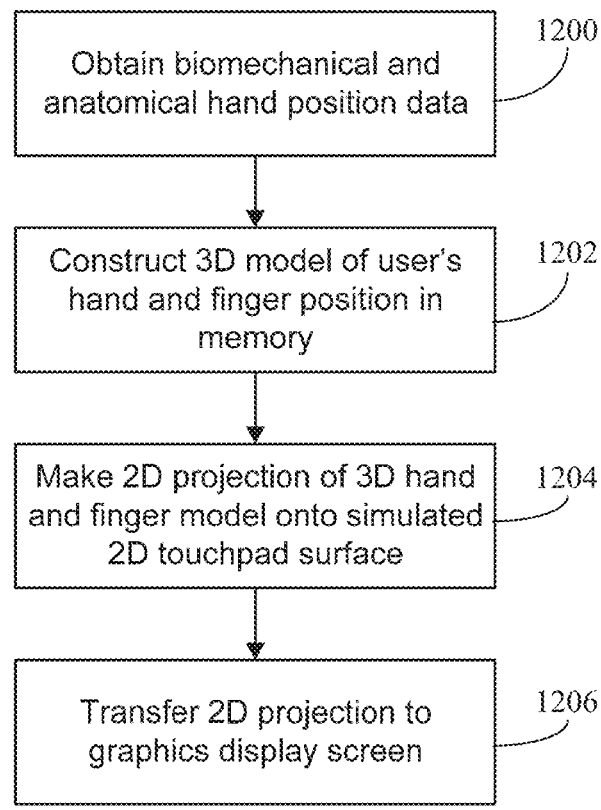
FIG. 12 depicts a simplified exemplary flowchart for generating images of the virtual hand and fingers on the device's graphics display screen, in accordance with one embodiment of the present invention.

FIG. 12 depicts a simplified exemplary flowchart for generating images of the virtual hand and fingers on the device's graphics display screen, in accordance with one embodiment of the present invention. Many ways to graphically represent the user's hands and fingers, or at least the user's fingers, are possible. In one embodiment, based upon the biomechanical and/or anatomical model of the human hand(s) (1200), and optionally specific data on the location and movement of the user's fingers and hand based on the touchpad data (as well as any additional data from predictive typing software, or hover detection) a three-dimensional virtual model may be constructed in the device's memory that depicts the user's hand(s) and fingers (1202).

Based upon the 3D model, a two-dimensional projection of the general outlines of the user's hand and fingers may be made upon a mathematical surface that corresponds to the surface of the touchpad (1204). This projection may be in the form of a hand and/or finger outline, or alternatively a virtual hand and finger shadow may be produced. This projection may then be combined with the any other data that is being sent do a memory buffer or graphics display buffer for the display screen of the device, and then displayed to the user (1206).

Thus, in one embodiment, the graphical representation of at least the user's fingers, and often both the user's hand and fingers, on the graphics display screen may be done by using the previous assignment of the data on the location and movement of the user's fingers and/or hand(s) to specific fingers on the biomechanical and/or anatomical model of the human hand(s) to create a three dimensional model of the user's hand(s) and fingers in the computerized device's memory. Next, a two-dimensional projection of this three dimensional model of the user's hand(s) and fingers in memory may be made. Here the two-dimensional projection may be on an imaginary plane that corresponds in both distance and orientation from the model of the user's fingers to the touchpad. Thus if, for example, the real user's finger is ¼" above the touchpad, then the distance between the three dimensional model of the user's finger and the imaginary plane that corresponds in distance and orientation to the touchpad will also be ¼". This two-dimensional projection on the imaginary "touchpad" plane (virtual touchpad) may be used to generate the graphical representation of at least the user's fingers on the graphics display screen, and often the user's fingers and hand(s) as well.

Alternatively, in a less computationally intensive scheme, a two dimensional model of the user's hands and fingers may be manipulated to best fit the previously discussed hand and finger position and motion data, and this two dimensional model then used for the graphical representation.

This two dimensional model may be further user selected according to the user's hand size, and indeed may be calibrated by asking the user to place his or her hand on the touchpad, thus allowing the system to sense the dimensions of the user's hand directly.

Figure 13:
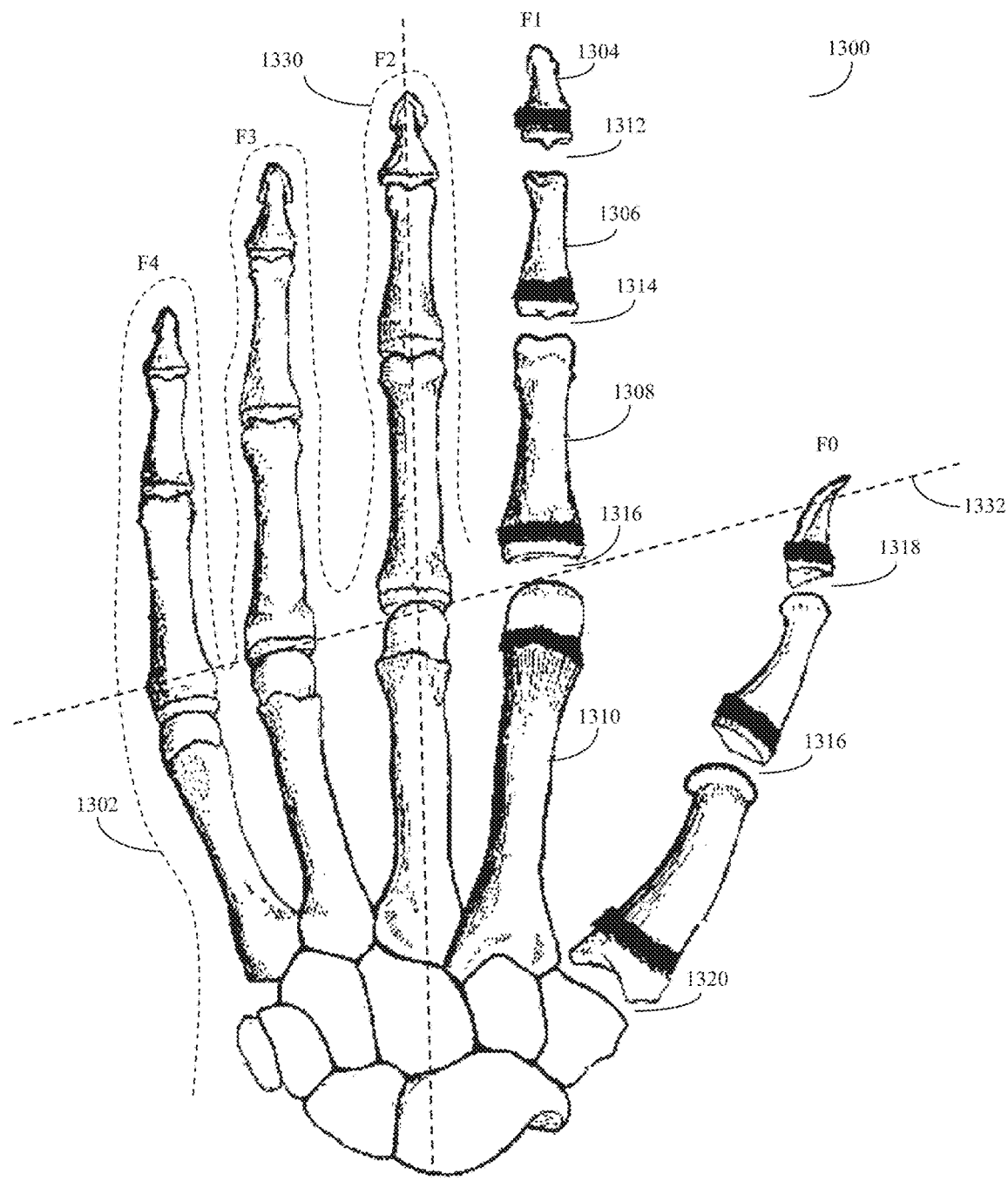
FIG. 13 depicts a simplified exemplary biomechanical and/or anatomical model of the human hand, showing the internal skeletal structure with a skin overlay, in accordance with one embodiment of the present invention.

FIG. 13 depicts a simplified exemplary biomechanical and/or anatomical model of the human hand, showing the internal skeletal structure with a skin overlay, in accordance with one embodiment of the present invention. This illustration shows the major bones of the hand, with the bones of the index finger and thumb separated in order to allow the joints to be better visualized. The internal skeletal structure of the hand (1300) is depicted, along with an outline of the skin on the left side of the hand (1302). The bones of the fingers include the distal phalanges (1304), the intermediate phalanges (1306), the proximal phalanges (1308) and the metacarpals (1310). The thumb lacks the intermediate phalange.

Here the various finger joints include the distal inter-phalangeal joint (dip) (1312), the proximal inter-phalangeal joint (pip) (1314), and the metacarpophalangeal joint (mcp) (1316). The thumb lacks the distal inter-phalangeal joint (dip), and instead includes the interphlangeal joint (ip) (1318) as well as the carpometacarpal (cmc) joint (1320). In one embodiment for higher accuracy, it may be useful to replace the default parameter values of at least the lengths of these various bones with actual user hand parameters. In general, the closer the various default parameters of the biomechanical and/or anatomical model of the human are to the actual user hand parameters, the better. In some embodiments, even the range of joint motion may also be experimentally determined, and used to replace one or more joint motion range default parameters.

Finger identifying algorithms.

In some embodiments, the biomechanical and/or anatomical model of the human hand used in the embodiments of the present invention for finger identifying algorithms may be based on the following observations. First, the average human hand has four fingers and one thumb. Second, in contrast to the fingers and thumb of the human hand (e.g. FIG. 13 bones (1308), (1306), (1304), which are relatively flexible above the metacarpophalangeal joint (mcp) (1316), the palm of the average human hand is relatively inflexible below the metacarpophalangeal joint (mcp) (1316). Indeed the positions of the various metacarpophalangeal joints (mcp) (1316) tend to be relatively invariant with respect to rotation of the hand. The various metacarpophalangeal joints (mcp) (1316) may hereinafter also be referred to as the "finger roots". Finger roots will be represented by the variable "r". Alternatively, finger roots may be referred to as the junction between the finger and the palm.

Third, due to the relatively invariant shape of the palm, the orientation of the user's palm and its angle with respect to other hand structures, such as the relative orientation of the fingers (e.g. middle finger (1330) is relatively constant. In particular, the orientation or position of the various "finger roots" (1316) may define a palm line direction (1332) that will in turn, when the angle of the palm line with respect to the coordinates of the touchpad are known, help to define the location of the various fingers and fingertips.

Fourth, users may generally desire to manipulate symbols using the area underneath the uppermost bone of the finger or thumb (1304). Here, the touch pad data will include various touchpad touch points, identified in (x, y) coordinates in later figures, which will often but not always correspond to the area underneath the uppermost bone of the user's finger and thumb (1304), hereinafter also referred to as the "finger tips". The touchpad observed location of any given finger or thumb tip will often be referred to as $(x_i, y_i)$, where x and y are the observed touchpad data, and "i" refers to or is associated with the finger that ultimately produced the touch pad touch data.

The raw touch pad data does not include such $(x_i, y_i)$ labels. Instead, the system embodiments may have to make sense of various incoming touch pad data, attempt to make sense of the data using the underlying biomechanical and/or anatomical model of the human hand, and then generate a virtual hand model that is consistent with both the touchpad data and the underlying biomechanical and/or anatomical hand model.

It may be simpler to first consider a model of the human hand as it rotates to various positions and touches the touchpad with various fingers, and determine what sort of mathematical transformations are at work in generating the raw touchpad data. Once the above is determined, the process may be worked in reverse to generate a virtual model of the user's hand.

In one embodiment, it is desired to be able to determine which touch point belongs to which finger when the system detects multiple touch points on the touch pad. Naming convention are described as follows. Thumb=finger 0=F0, index finger=finger 1=F1; middle finger=finger 2=F2; ring finger=finger 3=F3, and little finger (pinky)=finger 4=F4. As previously discussed, the finger number may be represented by the variable "i". Thus, when fingers F0 to F4 are present on the touch pad, the problem becomes one of determining the coordinates $(x_i, y_i)$ of the fingertips of F0 to F4, and then mapping the coordinates to the biomechanical and/or anatomical model of the human hand.

Neglecting, for the moment, hand location on the touchpad issues, one problem is that users will usually operate the touchpad with the palm line direction of their hands (1322) at an arbitrary angle θ with respect to the coordinate system of the touchpad. Thus, an early step to making sense of the touchpad data is to determine this angle θ, and to transform the raw touchpad data by a rotation of angle θ and see if the raw touchpad data matches up to a sensible biomechanical and/or anatomical model of the human hand. This transformation problem is depicted in FIG. 16A through FIG. 19.

In one embodiment, a simplified exemplary palm angle (θ) rotation transformation may help the system relate raw touchpad data to a standard biomechanical and/or anatomical model of the human hand, in accordance with one embodiment of the present invention. If the user touches both the tips of all fingers and thumb and the base or finger root of all fingers and thumb onto the touchpad, then the raw touchpad data would include a series of $(x_i, y_i)$ values for the finger tips, and a series of $(x_{ri}, y_{ri})$ values for the finger roots.

In one embodiment, the system may determine how much the user's hand is rotated relative to the coordinate system of the touch pad using palm angle θ, then the process of mapping the raw data into the biomechanical and/or anatomical model of the human hand may be simplified. Thus, a determination of palm angle θ is useful.

Figure 18:
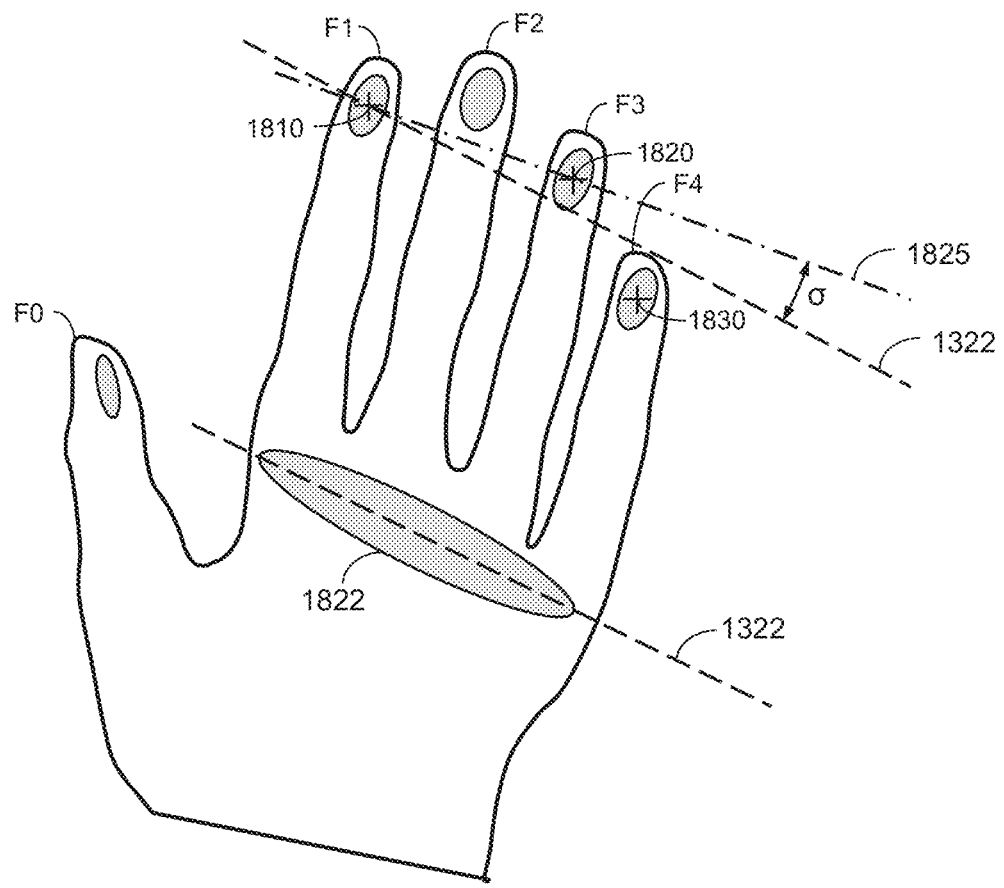
FIG. 18 depicts more exemplary details of the relationship between the hand's palm direction or palm angle and the tips of the user's fingers, in accordance with one embodiment of the present invention.

FIG. 18 depicts more exemplary details of the relationship between the hand's palm direction or palm angle and the tips of the user's fingers, in accordance with one embodiment of the present invention. When using touchpads, users will often touch the pad with the fleshy area of the palm underneath their finger roots (1822). If the finger root touch area information is detected by the touch pad, the system may detect the direction of the palm line of the hands (1322) from the finger root touch area. Alternatively, the system may use a relaxed finger position direction depicted as dashed—dotted line (1825) from touchpad touch point (1810) on F1 to touchpad touch point (1820) on F3, or a relaxed finger position direction from touchpad touch point (1810) on F1 to touchpad touch point (1830) on F4 to approximate the palm line direction (1322) and adjustment angle σ between the relaxed finger position direction and the palm line direction, e.g., between line (1825) and palm line (1322). The system may then determine the angle θ between the palm line, and the touch pad coordinates such as the touchpad x-axis.

Figure 16B:
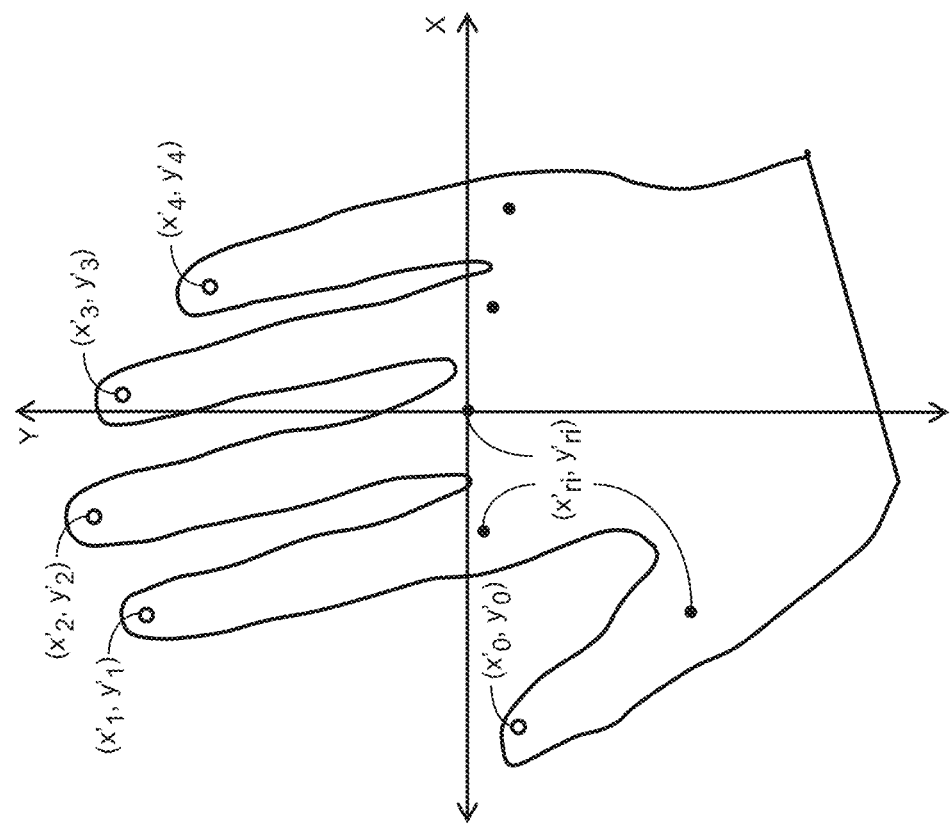
FIGS. 16A-16B depict how a simplified exemplary palm angle rotation transformation may help the system relate raw touchpad data to a standard biomechanical and/or anatomical model of the human hand, in accordance with one embodiment of the present invention.
Figure 16A:
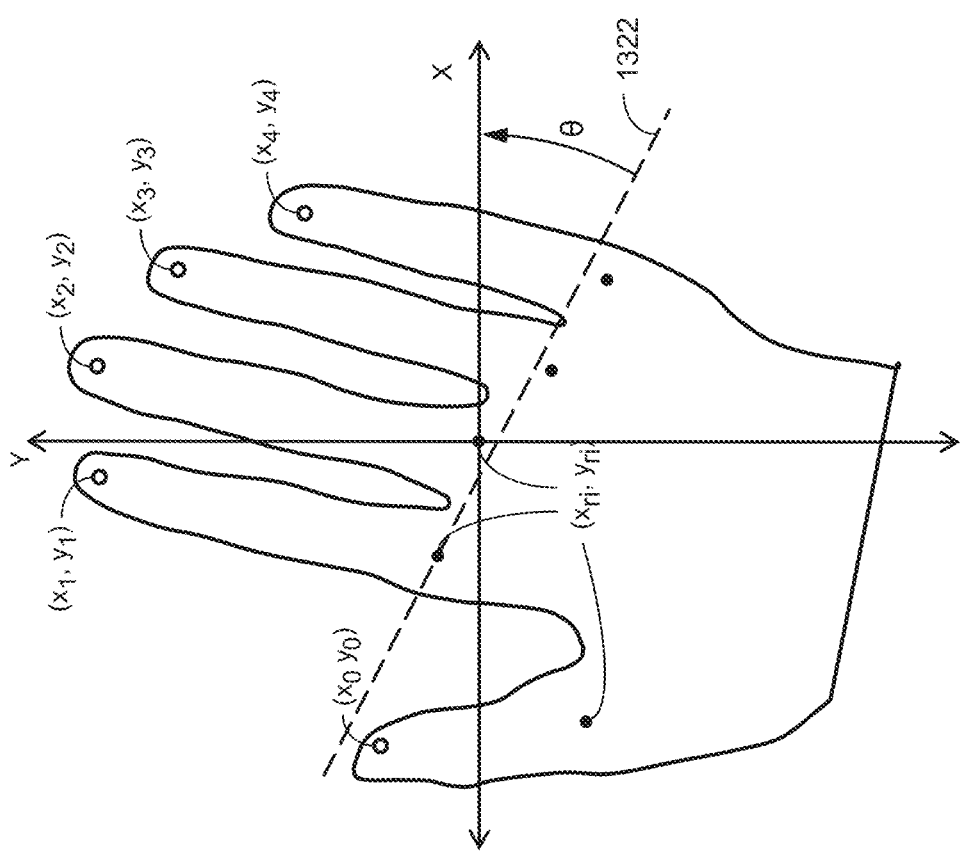

FIGS. 16A-16B depict how a simplified exemplary palm angle rotation transformation may help the system relate raw touchpad data to a standard biomechanical and/or anatomical model of the human hand, in accordance with one embodiment of the present invention. The process of rotation transforming the raw touchpad data $(x_i, y_i)$ into palm angle corrected touchpad data $(x'_i, y'_i)$ may be done using the following coordinate rotating formula;

$$\begin{bmatrix} x' \\ y' \end{bmatrix} = \begin{bmatrix} \cos\theta & -\sin\theta \\ \sin\theta & -\cos\theta \end{bmatrix} \begin{bmatrix} x \\ y \end{bmatrix} \quad (1)$$

where $x' = x\cos\theta - y\sin\theta$ and $y' = x\sin\theta - y\cos\theta$.

The system may find the palm angle using the finger root and/or finger touch points as shown in FIGS. 16A and 18.

The system may also calculate the finger touch coordinates $(x_i, y_i)$, where i=0, 1, 2, 3, 4 for each finger, as well as the palm line rotation angle θ, and the new coordinates $(x'_i, y'_i)$. These calculations may be done using the formula (1) coordinate rotating formula shown above. FIG. 16A depicts the before the rotation transformation (correction) and the before and after results of this rotation transformation or correction and FIG. 16B depicts the results after the rotation transformation or correction depicting the palm line direction being substantially parallel to the touchpad's x-axis. It is understood that the word substantially herein refers to an accuracy sufficient to achieve proper guidance of the virtual finger(s) displayed on the display screen to the extent that the user may be able to guide the hand to properly strike a virtual key or other control object displayed on the screen and not intending to imply any more accuracy than so required. Thus, more accuracy is required for smaller virtual keys or control objects than for larger virtual keys or control objects but exact anatomical matching to the hand is not required.

In one embodiment, the system may also determine the finger root $(x_{ri}, y_{ri})$ location coordinate for one or more of the fingers F1, F2, F3, F4. Then the system may perform the analysis often based on the assumption that the F1 root coordinate $(x_{ri}, y_{ri})$ is the most available (i.e. most frequently found in the raw touchpad data), which is often true because the finger 1 finger root commonly touches the touchpad surface. Alternatively, because the palm does not bend much, the finger F1 root coordinate may be calculated from the other palm touch points, i.e. other finger roots $(x_{ri}, y_{ri})$.

Figure 17:
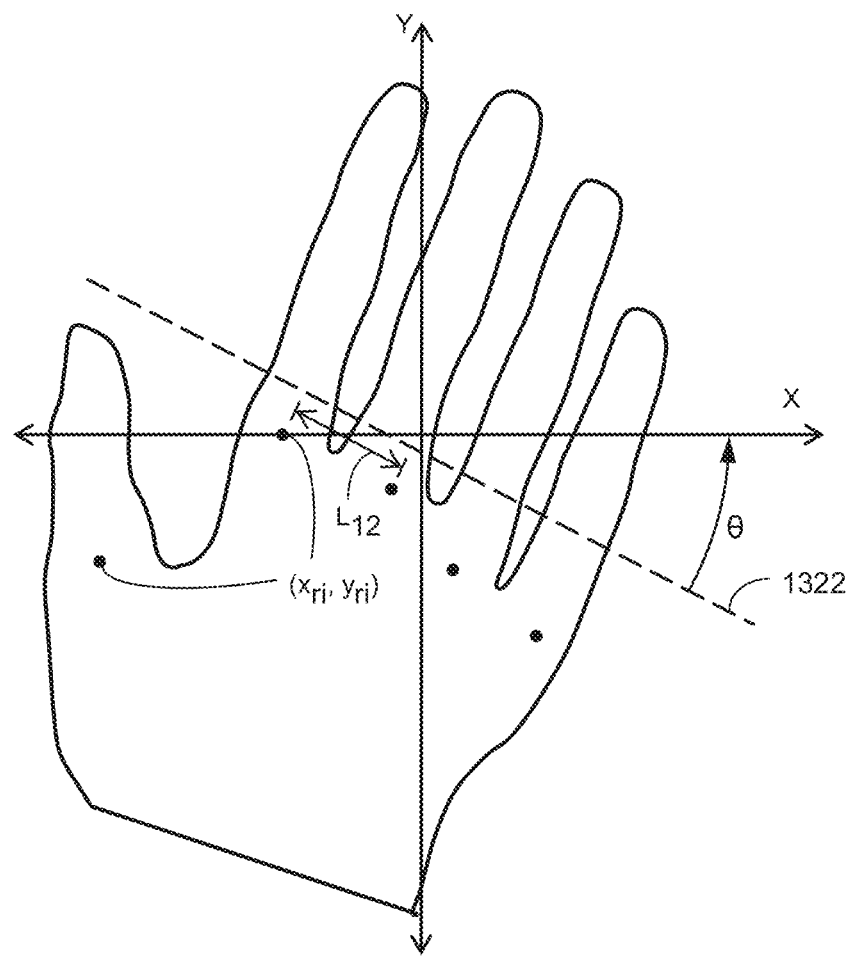
FIG. 17 depicts more exemplary details of the relationship between the finger roots and the hand's overall palm angle, in accordance with one embodiment of the present invention.

FIG. 17 depicts more exemplary details of the relationship between the finger roots $(x_{ri}, y_{ri})$, i.e., roughly finger joint region (1316), and the hand's overall palm angle, in accordance with one embodiment of the present invention. Often there will be missing finger root position data. Here various assumptions, based on the anatomical characteristics of the human hand, may be used to fill in the missing data.

For example, the root coordinates for finger 1 are available $(x_{ri}, y_{ri})$, then based on hand anatomy considerations, the position of the finger 2 root is likely to be, or may be calculated to be:

$$x_{r2} = x_{r1} + \frac{1}{2}(w_1 + w_2)\cos\theta \text{ and}$$

$$y_{r2} = y_{r1} - \frac{1}{2}(w_1 + w_2)\sin\theta,$$

where $w_i$ is the width of finger i and $$\frac{1}{2}(w_1 + w_2) = L_{12}$$

as depicted in FIG. 17.

Figure 19:
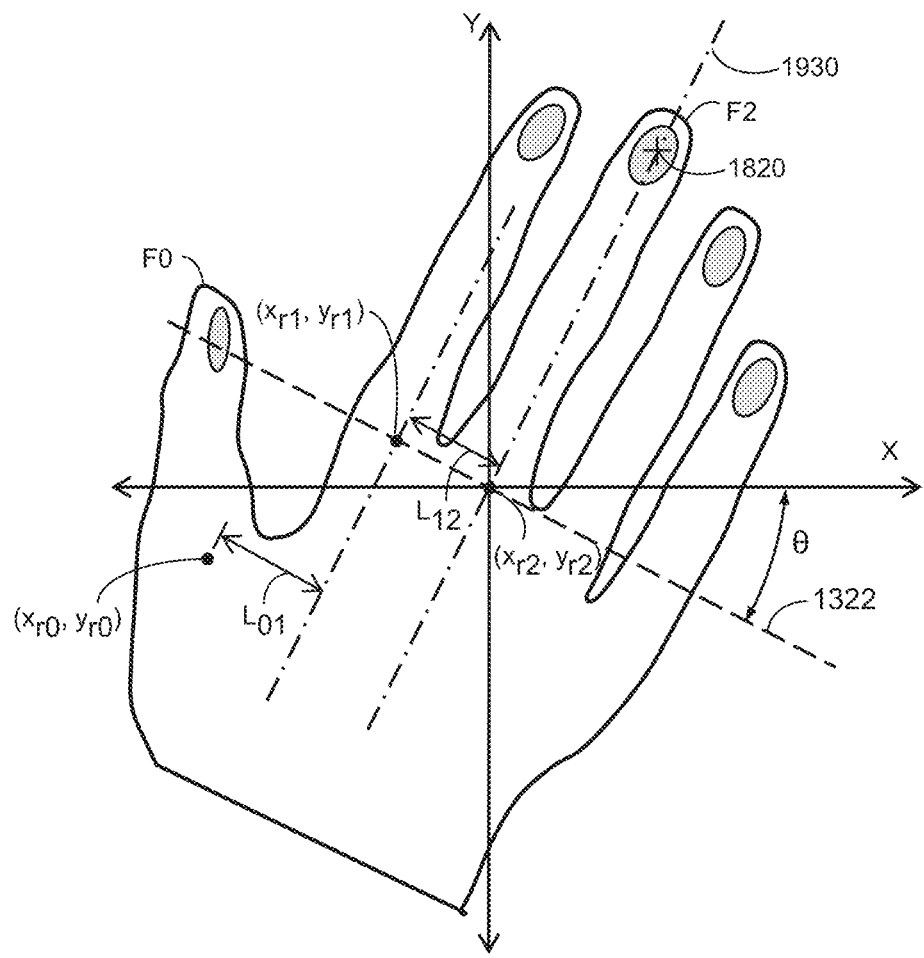
FIG. 19 depicts how simplified exemplary biomechanical and/or anatomical model data pertaining to the width of the fingers may be used to help interpret raw touchpad data, in accordance with one embodiment of the present invention.

FIG. 19 depicts how simplified exemplary biomechanical and/or anatomical model data pertaining to the width of the fingers, such as $L_{12}$, may be used to help interpret raw touchpad data, in accordance with one embodiment of the present invention. A palm line vertical direction (1930) may be defined running substantially through touchpad touch point (1820) on finger F2 and substantially perpendicular to palm lines (1322). The intersection of palm lines (1322) and palm line vertical direction (1930) passing through the longitudinal axis of F2 may pass through the finger root for F2 at $(x_{r2}, y_{r2})$, which may be used for the origin of the coordinate rotation axes X, Y. In the same manner, the system may also calculate the likely finger root coordinates for fingers F3 and F4 (in this simplified approximation, the model may assume that the finger roots are substantially on the same palm line (1322) as per FIG. 16A, 16B, 19, FIG. 13, and elsewhere). The system may also calculate the new coordinates for any given finger "i" root assuming that the hand is rotated at palm angle θ by also using rotation formula (1). Here, for example, for finger roots i=1, 2, 3, and 4, the rotation transformed finger root locations may be expressed as:

$$\begin{bmatrix} x_{ri} \\ y_{ri} \end{bmatrix} \xrightarrow{yields} \begin{bmatrix} x'_{ri} \\ y'_{ri} \end{bmatrix}$$

Figure 20:
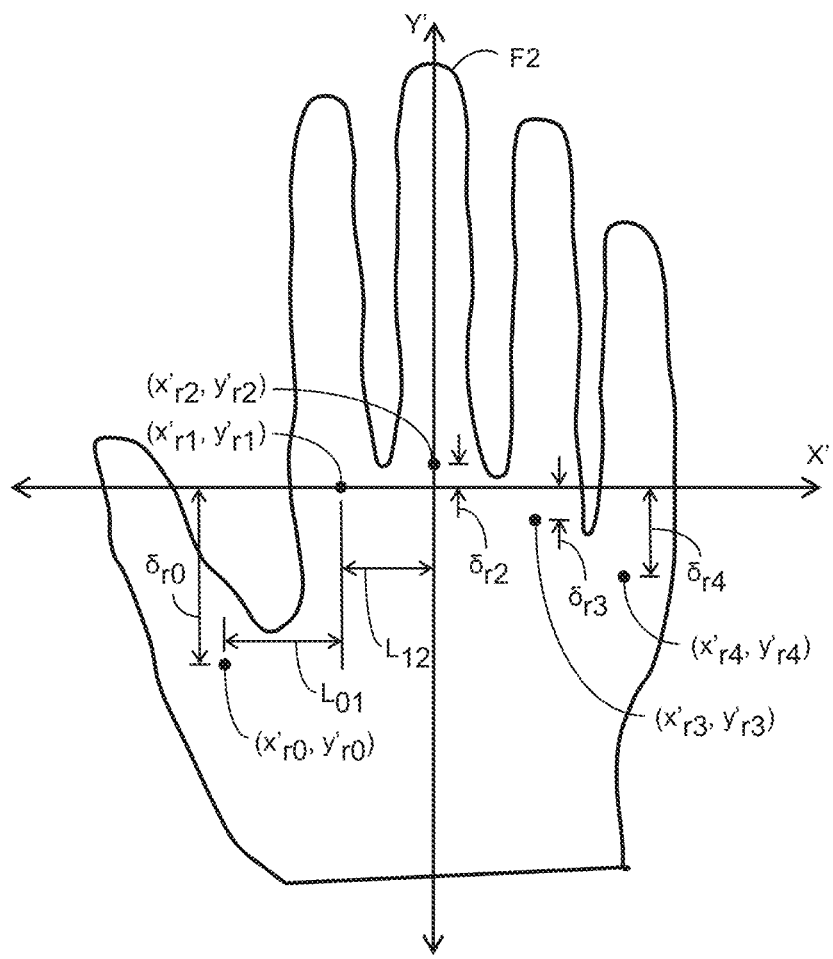
FIG. 20 depicts how in a more accurate exemplary model, the location of the various finger roots will be displaced to some extent from the palm line (which forms the palm angle) by various amounts $\delta r_i$, in accordance with one embodiment of the present invention.

FIG. 20 depicts how in a more accurate exemplary model, the location of the various finger roots will be displaced to some extent from the palm line (which forms the palm angle) by various amounts δri, in accordance with one embodiment of the present invention. Referring simultaneously to FIG. 17 and FIG. 20, the rotation transformed positions $(x'_{ri}, y'_{ri})$ of the various finger roots after rotation by palm angle θ may be calculated by the following process. First, calculate the rotation transformed finger 1 root position $(x'_{r1}, y'_{r1})$ from $(x_{r1}, y_{r1})$ using formula 1. Second, apply the formulas $$x'_{r2} = x'_{r1} + \frac{1}{2}(w_1 + w_2) \text{ and}$$

$$y'_{r2} = y'_{r1} + \delta_{r2}$$

Here often, for a still better approximation, the system may assume that any of finger roots F2, F3 and F4 might be displaced somewhat from the palm line (1322) by a small amount, represented by $\delta_{ri}$ as depicted in FIG. 20. Note that $\delta_{ri}$ may be either positive or negative.

Referring simultaneously to FIG. 17 and FIG. 20, similarly for fingers F3 and F4, the system may use the approximation that the finger roots are usually separated by the width of the fingers to make further approximations or educated guesses such as:

$$x'_{ri} = x'_{r(i-1)} + \frac{1}{2}(w_{(i-1)} + w_i) \text{ and}$$

$$y'_{ri} = y'_{r(i-1)} + \Delta \delta_{ri}$$

Similarly, for the thumb (finger F0):

$$x'_{r0} = x'_{r1} - \frac{1}{2}(w_0 + w_1) \text{ and}$$

$$y'_{r0} = y'_{r1} + \delta_{r1},$$

$$\text{where } \frac{1}{2}(w_0 + w_1) = L_{01}$$

as depicted in FIGS. 19 and 20.

Alternatively, using the various rotation transformed finger root coordinates $(x'_{ri}, y'_{ri})$, the system may also perform the inverse transformation using formula (1) to calculate the raw touchpad data root position coordinates $(x_{ri}, y_{ri})$ in the original touch pad coordinate system. This later technique is often especially useful for determining if any of the raw touchpad data might represent the thumb root location $(x_{r0}, y_{r0})$. The raw thumb root touchpad data is often difficult to obtain because sometimes the thumb root does not touch the surface of the touchpad.

Using the techniques described above, the system may make sense of the raw touchpad data by sorting the set of rotation transformed fingertip positions $\{(x'_i, y'_i)\}$ and finger root positions $\{(x'_{ri}, y'_{ri})\}$ according to ascending (or descending) x value, and then attempt to pair the rotation transformed possible fingertip data $(x'_i, y'_i)$ with the rotation transformed possible finger root data $(x'_{ri}, y'_{ri})$.

Missing finger detection algorithms.

Often the user will have real fingers elevated far enough above the touchpad to produce a "missing finger" problem—that is the touchpad raw data will lack the coordinates of one or more user fingers, and the system software may have to attempt to deduce the existence and location of these one or more "missing fingers".

In one embodiment, a unique touchID may be assigned for each continuous touch. Thus when a finger "i" was previously touched to the touchpad and was lifted later, one may use the touchpad history data obtained by the system at earlier time points (usually a fraction of a second earlier, i.e. time (t−i)) to determine the missing finger. Such time data may also be used in another alternative approach, to be discussed shortly. For example, at time (t−1) (i.e. the previous history of stored touchpad data in a time indexed stack of such touchpad data, with fingers F0-F4 identified, one has:

$$\{(x_{0,(t-1)}, y_{0,(t-1)}, \text{touchID}_{0,(t-1)}) \ldots (x_{4,(t-1)}, y_{4,(t-1)}, \text{touchID}_{4,(t-1)})\}$$

Assume, for example, that currently at time t, the system has a raw set of data for just three touch points from three fingers, such as fingers F0, F1, F2 (although this example is using and numbering fingers F0, F1, F2, other fingers and other finger Fi could be alternatively used). The raw data would be:

$$\{(x_{t0}, y_{t0}, \text{touchID}_{t0}) \ldots, (x_{t1}, y_{t1}, \text{touchID}_{t1}) \ldots, (x_{t2}, y_{t2}, \text{touchID}_{t2}) \ldots \}$$

If one finds, for example, that $\text{touchID}_{0,(t-1)} = \text{touchID}_{t0}$ and $\text{touchID}_{3,(t-1)} = \text{touchID}_{t1}$ and $\text{touchID}_{4,(t-1)} = \text{touchID}_{t2}$, then one may tell from the current data set at time "t" that; $(x_{t0}, y_{t0}, \text{touchID}_{t0})$ belongs to finger 0, and $(x_{t1}, y_{t1}, \text{touchID}_{t1})$ belongs to finger F3, and $(x_{t2}, y_{t2}, \text{touchID}_{t2})$ belongs to figure F4. Then one may further determine that fingers F1 and F2 are missing, i.e. likely elevated from the touchpad. The positions of various combinations of other fingers may also be analyzed by the same methods.

However at the initial starting time t=0, the history data may not be available. Thus, one should determine the missing (e.g. elevated) fingers by one or more various alternate methods, such as the methods described below.

Figure 21:
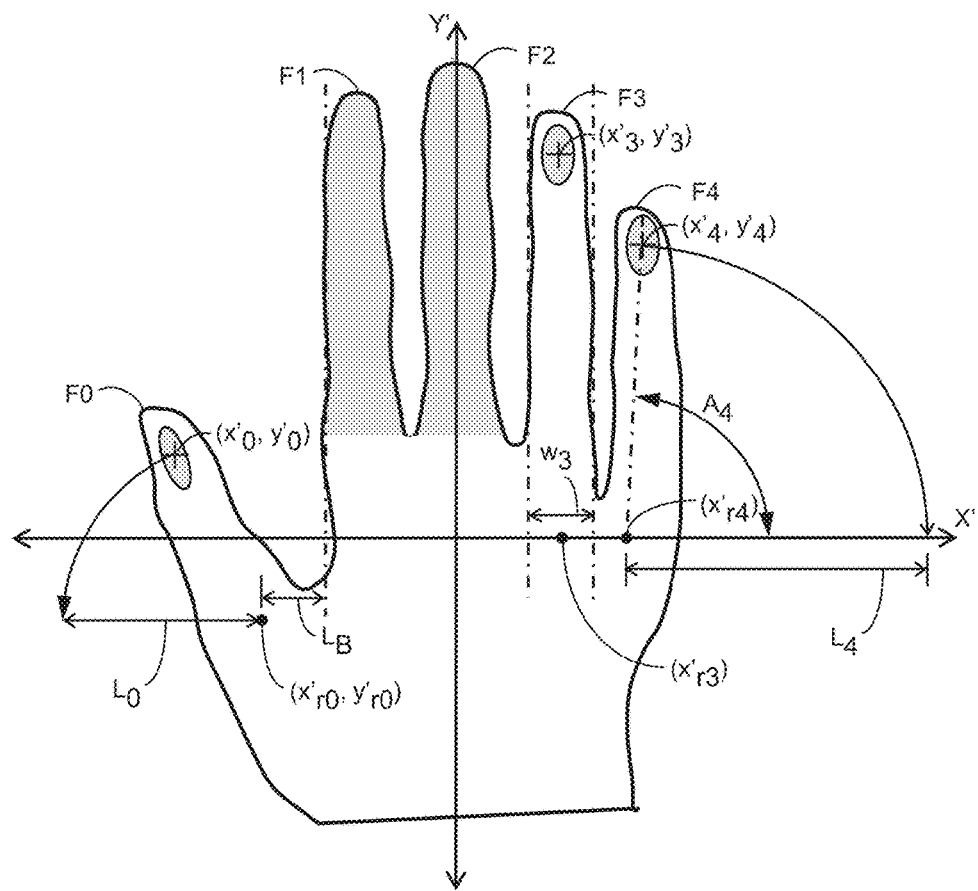
FIG. 21 depicts how the simplified exemplary system may attempt to correlate detected fingertip data from some fingers with finger root data from other fingers, determine that some fingertip data is missing, and thus deduce that these fingers are elevated above the touchpad, in accordance with one embodiment of the present invention.

FIG. 21 depicts how the simplified exemplary system may attempt to correlate detected fingertip data from some fingers with finger root data from other fingers, determine that some fingertip data is missing, and thus deduce that these fingers are elevated above the touchpad, in accordance with one embodiment of the present invention. The "missing fingers" include fingers F1 and F2, which are depicted with shading. Missing fingers include a finger that might have been elevated too far above the touchpad in order to register a touch point imprint on the touchpad. To cope with missing fingers the system may operate as follows. First, from the touchpad data set, the system may calculate the palm angle θ coordinates for the various fingertips and finger roots. Second, for each fingertip, the system may check if the position of the fingertip is inside of the range of likely finger root j positions using a formula such as:

$$x'_{rj} - \frac{w_j}{2} \leq x'_i \leq x'_{rj} + \frac{w_j}{2},$$

where $w_i$ is the width of finger i.

If the fingertip "i" is within this range j, then the system will attempt to match the fingertip "i" with root j. The system, may for example, even attempt to match potential fingertip locations from one finger with the potential finger root data from another finger. For example, the system may attempt to match the fingertip data $(x'_i, y'_i)$ with the finger root position $(x'_{r3}, y'_{r3})$.

For the thumb finger F0 root $(x'_{r0}, y'_{r0})$, and pinky finger (finger F4) root $(x'_{r4}, y'_{r4})$, the range may be calculated as follows:

$$x'_{r0} - length_0 \leq x'_0 \leq x'_0 + \frac{w_0}{2} \text{ and}$$

$$x'_{r4} - \frac{w_4}{2} \leq x'_4 \leq length_4,$$

where $length_0$ and $length_4$ correspond respectively to $L_0$ and $L_4$ and where $$\frac{w_0}{2}$$

corresponds to $L_B$ as depicted in FIG. 21. Note that in this example, the system is also incorporating finger length (i.e. the length between the fingertip $(x'_i, y'_i)$ and the finger root $(x'_{ri}, y'_{ri})$) into its biomechanical and/or anatomical model of the human hand.

In the frequent cases where finger tips may not be successfully matched with corresponding finger roots, for each un-matched finger root, the system may mark that finger as missing (i.e. likely raised above the surface of the touchpad, rather than touching the touchpad). See for example, fingers F1 and F2 in FIG. 21. Here in FIG. 21, the shading of fingers 1 and 2 shows that the system has recognized that the fingers tips are missing, probably because the finger tips are elevated a sufficient distance above the touchpad.

Missing finger move/display algorithms.

In order to show a virtual image of the moving finger, along with fingers that are touching the touchpad, in some embodiments it will also be useful for the system to maintain a stack of the latest n (where n≥1) sets of finger position history information—i.e. retain a history of the most recent finger positions.

In one embodiment, when, as will frequently be the case, the finger position data is insufficient, but the missing finger "i" may be identified by using the previous algorithm or other methods, one may approximate the missing finger's position by assuming that as per a normal biomechanical and/or anatomical hand, the change x and y position of the missing finger's neighboring fingers (e.g. neighboring change $\Delta x$ and $\Delta y$) will also pertain to any change in location of the missing finger as well, as described in the following examples.

Assume that the current time is time "t", and that the locations of the fingers at earlier times (i.e. within a second or a few fractions of a second) have been saved as frames data such as of t−1 in the stack. The system may compute a weighted mean value such as:

$$\Delta x_{it} = \frac{\sum_{j=1}^{n}(weight_j * (x_{jt} - x_{j(t-1)}))}{\sum_{j=1}^{n} weight_j}$$

$$\Delta y_{jt} = \frac{\sum_{j=1}^{n} weight_j * ((y_{jt} - y_{j(t-1)}))}{\sum_{j=1}^{n} Weight_j}$$

where j=[1, n] are the touching fingers.

Using the above scheme, then the current position for the missing finger "i" may be calculated as follows.

$$x_{it} = x_{i(t-1)} + \Delta x_{it} \text{ and } y_{it} = y_{i(t-1)} + \Delta y_{it}$$

Note that for $(\Delta x_{it}, \Delta y_{it})$ calculations, one may also use other mathematical methods such as arithmetic mean, median geometrical mean, harmonic mean, and so on.

Finger to hand matching algorithms.

Often, particularly for larger devices, the user may operate the device using two hands. When the user is operating the touch pad with two hands at the same time, the system additionally should be able to decide to which hand the touch points belong to in order to show the user's two hands properly in the display. The system may use various algorithms to help with this decision.

In one embodiment, the system may use the range information on the coordinates after rotating the data by palm angle θ, as is shown on FIG. 21. In this example, all touch points within the following range may be assumed (i.e. mapped into) one hand. The criteria here may be:
For x $[x'_{r0}-length_0, x'_{r4}+length_4]$ and for y: $[0, length_2]$ or $[0, \max\{length_0 \ldots length_4\}]$ The system may also use the touch angle information for touch points and palm line angles to help assign the raw touchpad data to one hand or the other. Here, for example, the system may assume that both hands belong to the same individual, and essentially extend the biomechanical and/or anatomical model of the human hand to also put in some simplified human anatomical constraints regarding the relationships between the angles of one hand and the angles of the other hand.

Figure 22:
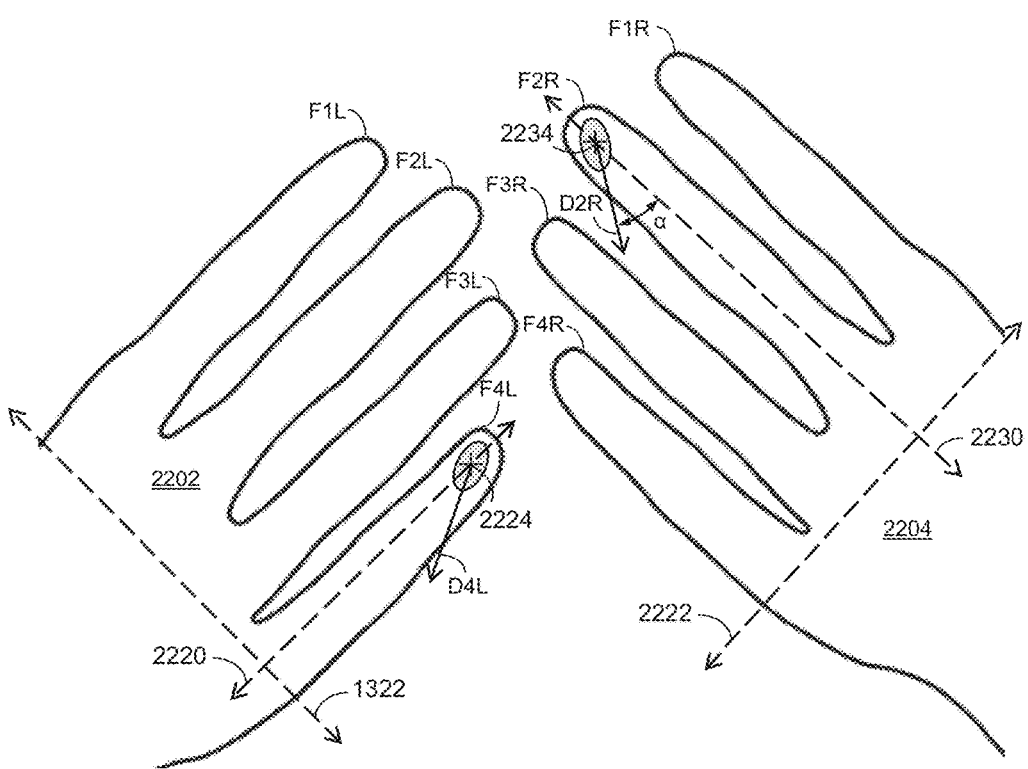
FIG. 22 depicts how the simplified exemplary system may further assign raw touchpad data to two different hands of the same user, based on the assumption that the range of possible hand angles for the same user is limited by the user's anatomy, in accordance with one embodiment of the present invention.

FIG. 22 depicts how the simplified exemplary system may further assign raw touchpad data to two different hands (left hand (2202) including F0L through F4L, and right hand (2204) including F0R through F4R) of the same user, based on the assumption that the range of possible hand angles for the same user is limited by the user's anatomy, in accordance with one embodiment of the present invention. According to the previously discussed multi-touch protocol, the touch angle of a touch point may also be determined along the long touch side defined as follows. That is, usually a finger will touch in a roughly oval pattern with the long axis of the oval, i.e. the long touch side, corresponding to the touch angle α of a touch point. For example, based on human anatomical considerations, the angle α between the touch point directions D4L, D2R and the associated respective palm line vertical direction (2220, 2230) will generally be in the range of [0, 90] degrees. The palm line vertical direction (2220, 2230) is substantially perpendicular to associated palm lines left and right (1322, 2222) respectively. In this example, palm line vertical direction (2220) may be associated with finger F4L through touch point (2224) and palm line vertical direction (2230) may be associated with finger F2R through touch point (2234)

Alternatively or additionally, in one embodiment, the system may also partition the touchpad area (for example, split the touchpad area into a left half and a right half) and assign some or all of the touch pad data from the left half to the user's left hand, and assign some of all of the touch pad data from the right side of the touchpad to the user's right hand.

Figure 23:
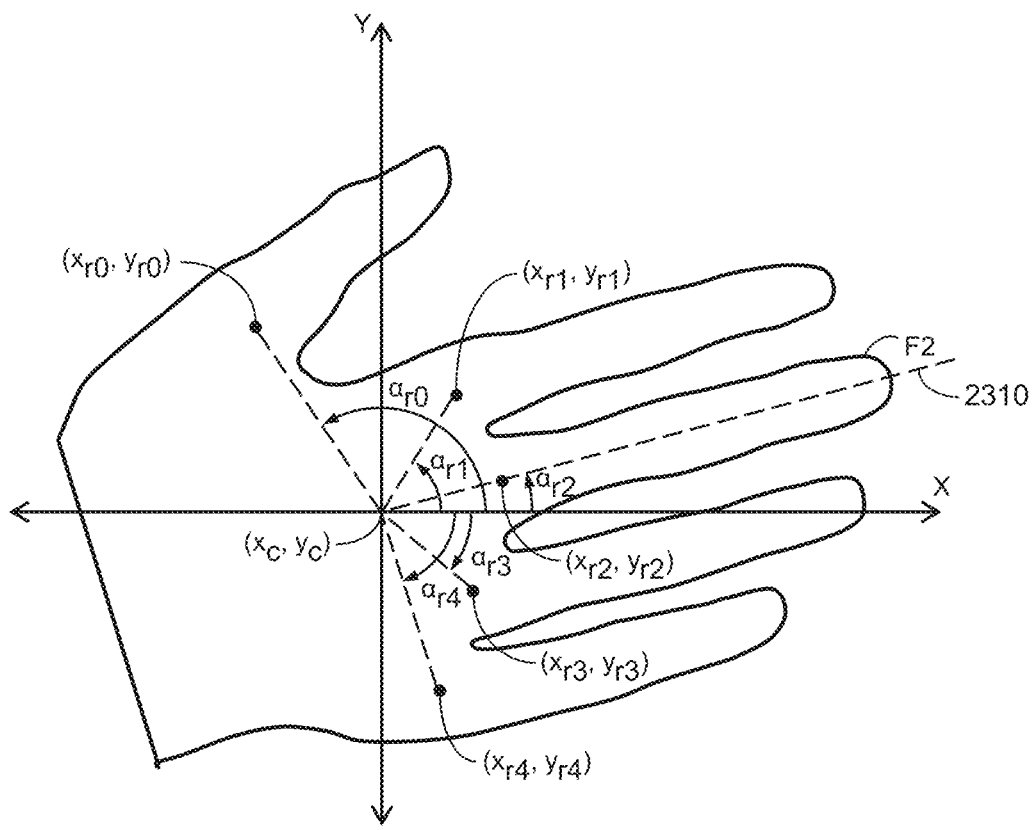
FIG. 23 depicts a first simplified exemplary example of angle based finger matching algorithms, in accordance with one embodiment of the present invention.

Angle based finger matching algorithms:

FIG. 23 depicts a first simplified exemplary example of angle based finger matching algorithms, in accordance with one embodiment of the present invention. Angle based methods may be used to match raw touchpad data with specific user fingers. These alternative, angle-based, finger matching algorithms may be implemented as follows. First, perform or do a best fit between the touchpad data and the biomechanical and/or anatomical model of the user's hand, and second, use this best fit biomechanical and/or anatomical model of the user's hand, to find a point substantially along a mid-line (2310) of middle finger F2. Here, for example, one may have mid-line of middle finger F2 pass through the center of the palm, e.g. palm center point, ($x_c$, $y_c$) or other point on the palm (any palm center point ($x_{center}$, $y_{center}$) may be used so long as it is inside a region bounded by the five metacarpophalangeal joints ($x_{ri}$, $y_{ri}$)). The coordinates of the palm center point may be calculated based on the finger model, and known finger positions.

Continuing the above algorithm with the second step, find (e.g. calculate) the finger root (metacarpophalangeal joint) coordinates ($x_{r0}$, $y_{r0}$) ... ($x_{r4}$, $y_{r4}$) and calculate the angle $\alpha_{ri}$ of finger root "i" to palm center:

$$\alpha_{ri} = a \tan 2(x_{ri} - x_{center}, y_i - y_{center}).$$

The angle calculated by a tan 2 has a range within about $-\pi$ to $+\pi$. Third, sort the $\alpha_{r0}, \alpha_{ri} \ldots \alpha_{r4}$ in ascending or descending order.

Figure 24:
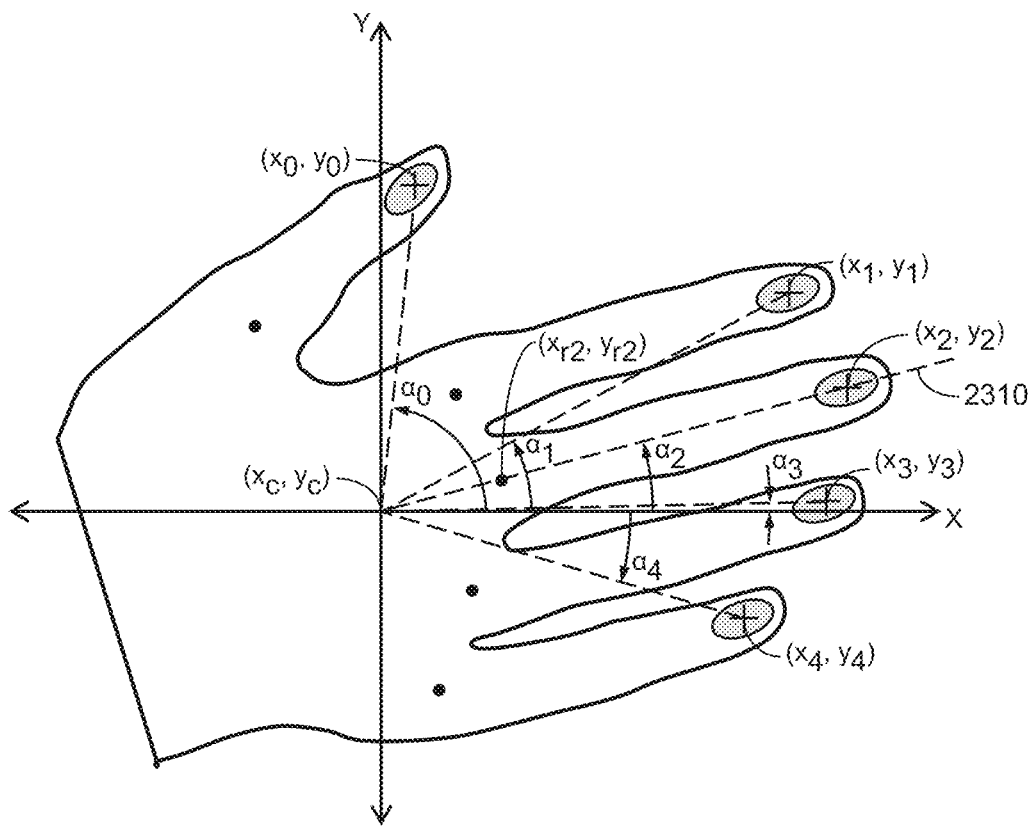
FIG. 24 depicts a second simplified exemplary example of angle based finger matching algorithms, in accordance with one embodiment of the present invention.

FIG. 24 depicts a second simplified exemplary example of angle based finger matching algorithms, in accordance with one embodiment of the present invention. Continuing the above algorithm with the fourth step, find all fingertip coordinates ($x_0$, $y_0$), ($x_1$, $y_1$) ... ($x_4$, $y_4$) and calculate the fingertip angle $\alpha_i$ to palm center ($x_C$, $y_C$)=($x_{center}$, $y_{center}$), where $\alpha_i = a \tan 2 (x_i - x_{center}, y_i - y_{center})$. Next, sort $\alpha_i$ in the same order as the $\alpha_{ri}$. Then, match the corresponding finger to the associated angle, as per FIG. 24. The advantage of this approach is that one does not need to perform coordinate rotation to match the fingers. Instead, the a tan 2 calculations may be done by computationally faster methods, even by table lookup methods, as needed.

Iterative or best fit embodiments.

In some embodiments, particularly when the raw touchpad data is cluttered or otherwise confusing, the hand and finger analysis software discussed above may operate by an iterative process. For example, the software may make tentative assignments between the raw touchpad data and one possible set of fingertip, finger root, or palm touch points on the previously discussed biomechanical and/or anatomical model of the human hand (here the user's hand), and score the results according to how close the raw touchpad data, either before or after various possible transformations, may fit with a known hand configuration. The software may then explore other possible hand configurations and transformations, and then select or choose the hand configuration and/or transformation (e.g. rotations, translocations, missing fingers, and the like) that produces the highest overall score. The software will then use the highest scoring hand configuration and orientation model for virtual hand display purposes.

Optional Imaging.

In some embodiments, to improve accuracy (that is to replace standard human hand biomechanical and/or anatomical model default parameters with actual user calibration parameters), it will be useful to acquire an image of the user's hands, and to employ various image processing and analysis techniques to analyze this image of the user's one or more hands to better estimate the relative length of the various bones of the user's hands. Indeed, in the event that the user has lost one or more fingers, the system may then use this information to make corresponding changes in its biomechanical and/or anatomical model of the human hand. In other words, the model may include calibration information associated with an image of at least a portion of the hand of the user.

Figure 14:
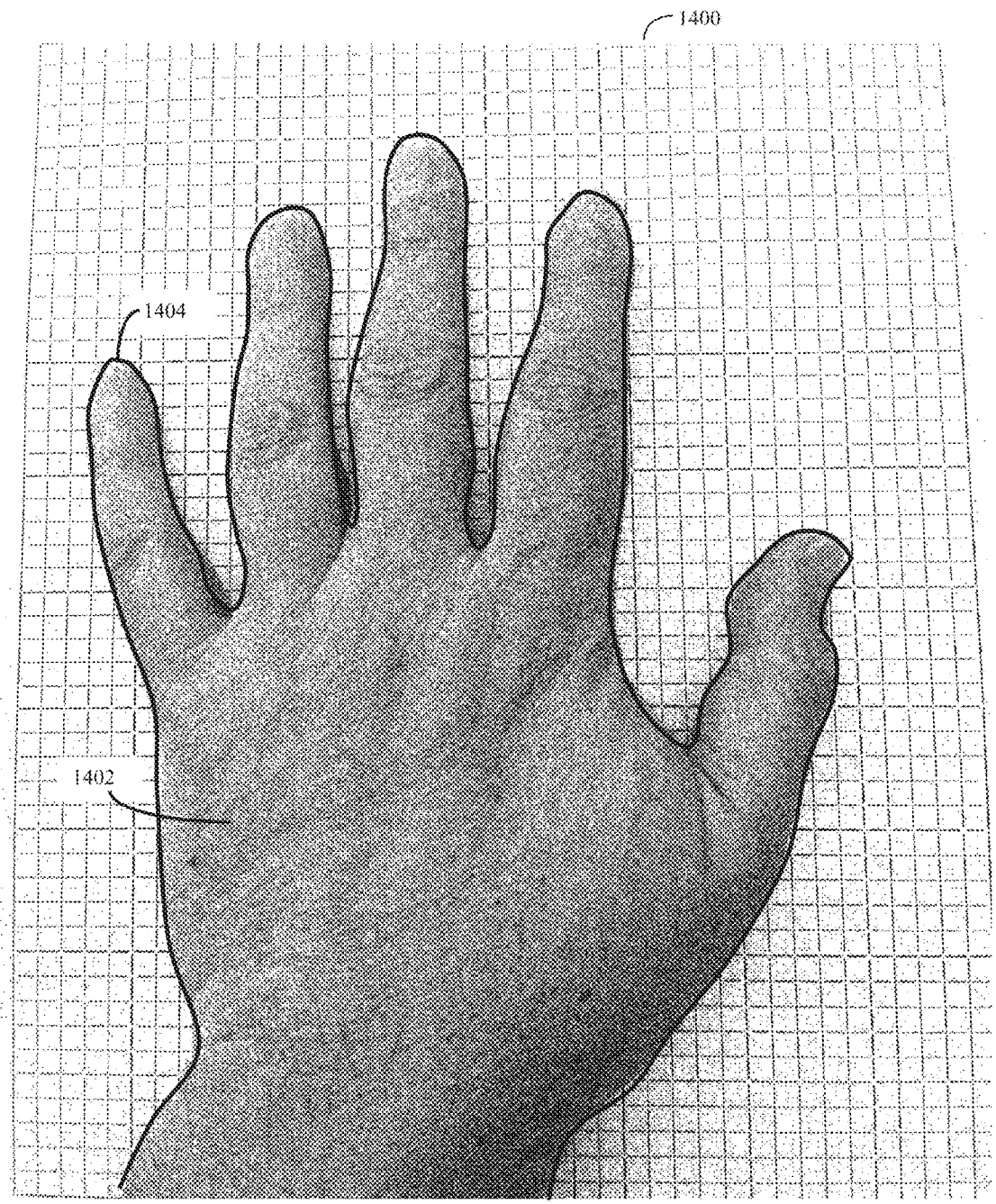
FIG. 14 depicts how the simplified exemplary user's hand or hands may be photographed by the device's camera or other camera, and this image information may be used to refine the default parameters of the biomechanical and/or anatomical model of the user's hand, in accordance with one embodiment of the present invention.

FIG. 14 depicts how the simplified exemplary user's hand or hands may be photographed by the device's camera or other camera, and this image information may be used to refine the default parameters of the biomechanical and/or anatomical model of the user's hand, in accordance with one embodiment of the present invention. In acquiring such images, often it is useful to have the system provide a standardized background, such as a series of distance markings, grid, graph paper, and the like (1400) in order to better calibrate the image of the hand and correct for image distortions. This standardized background may additionally include various color, shades of gray, and resolution test targets as well. The background may be conveniently provided by, for example, electronically providing one or more background image sheets (e.g. a jpeg, png, pdf or other image file) for printing on the user's printer.

In one embodiment, the user may put each hand on background (1400), and take a photo of the hand(s) (1402) with either the computerized device's camera or other camera. This image may then be analyzed, preferably by an image analysis program. The background image will help correct for any image distortions caused by different camera angles, and the like. The user hand image analysis may be done onboard the user's handheld computerized device, but it need not be. In an alternative embodiment, the user may upload one or more images of the hand taken by any imaging device to an external image analyzer, such as a remote internet server. In either event, the image analyzer will analyze the user's skin or hand outline appearance (1404), deduce the most probable lengths one or more bones of the user's hand, such as the user's various finger and thumb bones, and send this data or other data to correct the default biomechanical and/or anatomical model of the user's hand (s) back to the user's computerized device, such as for example during calibration step 906 referenced in FIG. 9 above.

Alternatively, at least with more sophisticated and possibly next-generation touchpads capable of providing position details for a large number of contact points, the user may calibration the touchpad by firmly pressing a portion or all of the user's hand on the touchpad, and allowing a highly capable touchpad to in turn precisely render the resulting handprint. A compute program may then analyze the touchpad-derived handprint, extract parameters such as finger joint positions, probable finger and hand bone lengths, and the like and derive the same information as previously discussed for the photographic calibration step above. In other words, the model includes calibration information in accordance with pressing a portion of the hand of the user on the touchpad.

Alternatives or supplements to the touchpad.

In an alternative embodiment, information on the user's finger placement may be obtained using optical methods. Thus in an alternative embodiment, the touchpad sensor may be an optical method such as one or more cameras. These camera(s) may keep track of the user's hand and finger positions, and this data may then be fed into the biomechanical and/or anatomical model of the human hand(s) to compute a graphical representation of at least the user's fingers as described previously.

Real Time Video Updating

In another embodiment, image information may also be used to refine the biomechanical and/or anatomical model of the user(s) hands in real time while the user is using the touchpad.

FIG. 15 depicts how an exemplary device camera (1500) may be used to obtain a partial image of the user's hand (1506) while using the device's touchpad (1508), and this information also used to update and refine the biomechanical and/or anatomical model of the user's hand, in accordance with one embodiment of the present invention. The rear mounted device camera (1500), which often will have a very limited field of view at close range (1502), may nonetheless be used to obtain a real time video image of a portion or part (1504) of the user's hand (1506) while the user is using a rear mounted touch pad (1508) using a touch pad mounted on the back of the computerized device (1510). At the same time, touch pad data gives the position of the user's index finger (1512) as a strong touch pad signal, and the position of the user's middle finger (1514) as a weaker touch pad signal (1514).

Note that although the portion of the hand (1504) that may be directly visualized by video camera (1500) does not include any image information at all pertaining to the position of the user's fingers, the image information (1504) does provide a useful series of further constraints upon the biomechanical and/or anatomical model of the user's hands. Thus, the partial hand image information, in conjunction with the touch pad data (1512), (1514), and optionally with a refined biomechanical and/or anatomical model of this user's hand (if available) obtained in FIG. 14, above, may improve the accuracy of the depiction of the user's hand and fingers.

In some embodiments, for amusement or artistic purposes, the user may not wish to have a fully accurate anatomical model of the user's virtual hand displayed on the screen, but may instead prefer a variant, such as a realistic depiction of a "monster hand" with fingers being replaced by claws, fur, or pads, and the like, or of a skeleton hand that shows the underlying biomechanical and/or anatomical estimation of the user's hand bones as per FIG. 13.

In one embodiment, the system software may also be configured to render the user's fingers and hands as various hand variants when displayed. Generally, these hand variants will still provide realistic information pertaining to the user's hand and finger placement, but will also provide this information as various user artistic options that often may be customized according to user preference.

Three dimensional multi-touch gesture controls.

Commonly, touchpad controls to a computerized system have focused on two dimensional finger gesture controls requiring finger contact on the locally two-dimensional touchpad surface, even if that surface as a whole may be curved or otherwise project into the third dimension to some extent. In contrast, the embodiments of the present invention, which may operate using a biomechanical and anatomical model of the human hand, may include a three dimensional gesture component that enables various types of three dimensional multi-touch gesture controls described below. Three dimensional multi-touch gesture controls may be advantageous in applications where the user needs to touch a portion of the touchpad continually, such as for example, when the user holds a handheld computerized device including a touchpad on the backside of the device. The three dimensional multi-touch gesture controls may help the computerized system differentiate touches on touchpad control regions intended as control inputs from touchpad touches used to merely hold the device.

In some embodiments, the three dimensional sensing aspects of the present invention may be used to control virtual keyboard data entry to a computerized system by various "lift and tap", or "lift and drag", or "lift and other gesture" type modes for data input. More complex variants can also implement other commands, such as "lift and tap and rotate, e.g. with two fingers", "lift and tap, and enlarge, e.g. with two fingers", and so on.

In one embodiment, the biomechanical and anatomical model of the user's hand may inform the system when one or more user fingers are positioned on the touchpad so as to be above a corresponding control region of the touchpad, such as above a key of a virtual keypad, virtual keyboard, or above a hyperlink, and/or the like, but not yet touching the corresponding control region. Because the model of the hand accurately determines the location of the one or more user fingers even when the user's finger is not touching the surface of the touchpad, the "off-touchpad" finger location may be used for three-dimensional gesture control.

In one embodiment, the control region of the computerized system may be on a touchpad including an integrated display screen located in substantially the same location. For example, integrated touchpads may include both display screen and touchpad built in layers and accessible from the same surface or side of the computerized device and thus located substantially in the same location even though the layers may be separated by small dimensions relative to the touchpad surface length or width. In an alternative embodiment, the control region of the computerized system may be on a separate and/or additional touchpad being located in a location that is different from the location of the display screen as previously described in reference to FIG. 8. For example, integrated touchpads may include both display screen and touchpad built in layers and accessible from the same surface or side of the computerized device and thus located substantially in the same location even though the layers may be separated by small dimensions relative to the touchpad surface length or width.

In one embodiment, the user moves a finger onto a control region of the touchpad, and this finger is in contact with the touchpad. The computerized system may determine if the user wants to activate that control region, e.g. press the virtual key or control region to generate an input to the computerized system using, for example, a "lift and tap" type control scheme described as follows. When the system does not receive inputs according to the "lift and tap" or "lift and related type" control schemes described below, the initial finger touch, even if touching a control region of the touchpad, may not generate unwanted control inputs enabling the user to continue just safely holding the touchpad.

Figure 26:
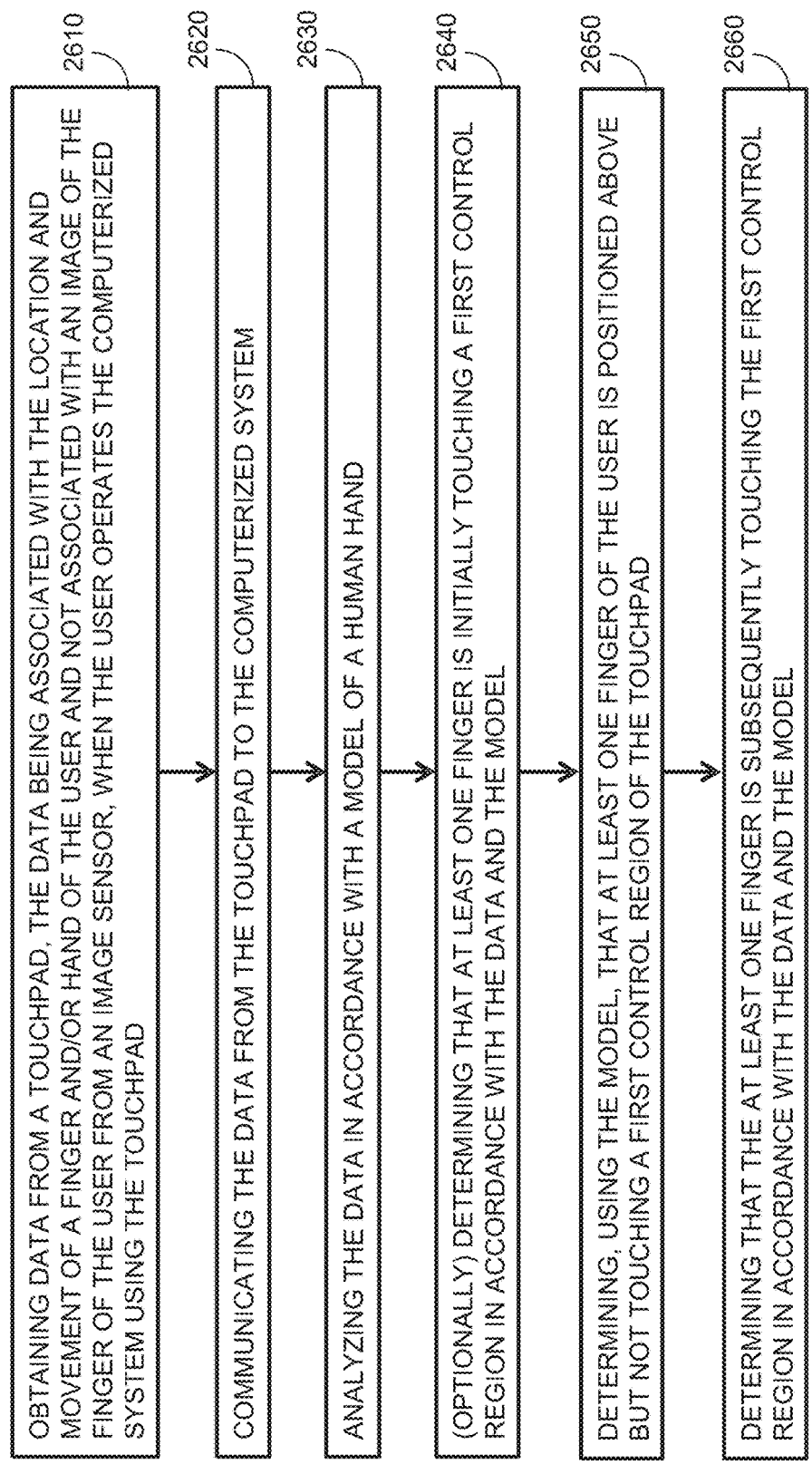
FIG. 26 depicts a simplified exemplary flowchart of a "lift and tap" technique of key entry for controlling an input from a user to the computerized system, in accordance with one embodiment of the present invention.

FIG. 26 depicts a simplified exemplary flowchart of a "lift and tap" technique of key entry for controlling an input from a user to the computerized system, in accordance with one embodiment of the present invention. FIG. 26 depicts the "lift and tap" technique includes obtaining (2510) data from a touchpad, the data being associated with the location and movement of a finger and/or hand of the user and not associated with an image of the finger of the user from an image sensor, when the user operates the computerized system using the touchpad. The "lift and tap" technique further includes communicating (2620) the data from the touchpad to the computerized device and analyzing (2630) the data in accordance with a model of a human hand, such as referenced in FIG. 9-FIG. 25.

FIGS. 27A-27F depict a series of simplified exemplary display screen shots of the "lift and tap" technique of key entry depicted in FIG. 26 being used to type the first two letters of a "Hello World" message on the computerized system, in accordance with embodiments of the present invention. FIGS. 27A-27F were obtained as screen shots or grabs in that respective order from a few seconds of video showing the display screen of a prototype handheld computerized device while the user proceeded to type at touch-typing speed using the "lift and tap" technique referenced in FIG. 26. The system has already assigned the touch data from the touchpad to at least one of the multitude of fingers of the model, computed a graphical representation of the at least one finger of the user, in accordance with the model, and now displays the graphical representation of the fingers (F1, F2, F3) and hand (2701) of the user on a display screen (2700) of the computerized system. Note that hand (2701) including fingers (F1, F2, F3) is displayed clearly as a virtual, i.e. computer-generated, hand because the palm includes square edges, the fingers include straight sides, and the joints between the fingers and the palm are not continuous.

Figure 27A:
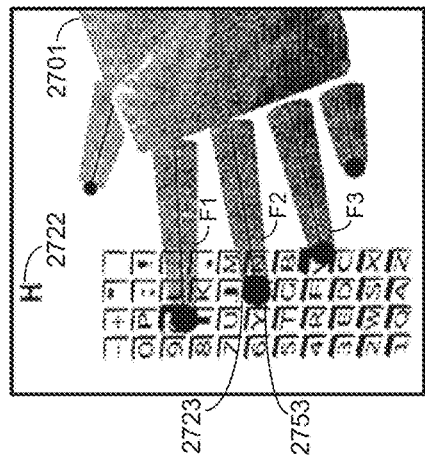
FIGS. 27A-27F depict a series of simplified exemplary display screen shots of the "lift and tap" technique of key entry depicted in FIG. 26 being used to type the first two letters of a "Hello World" message on the computerized system, in accordance with embodiments of the present invention.
Figure 27B:
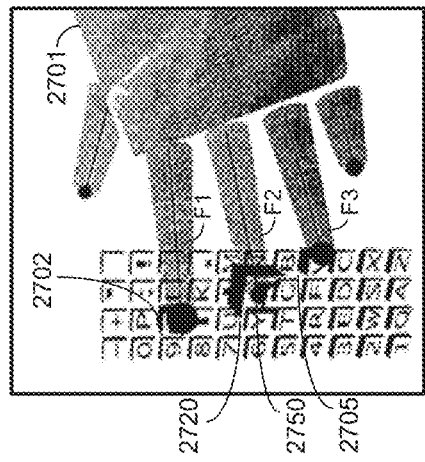
Figure 27C:
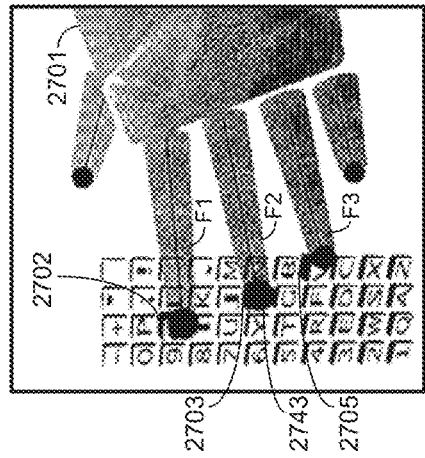
Figure 27D:
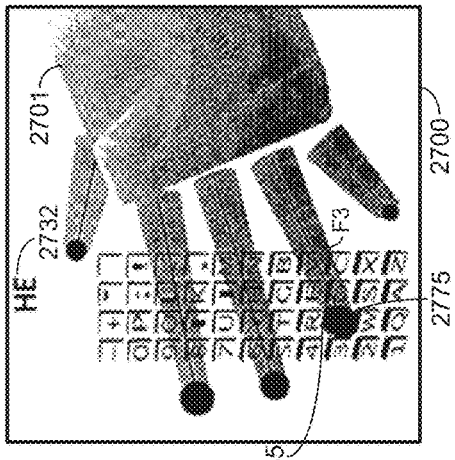

Referring simultaneously to FIG. 26, FIG. 27A, and FIG. 27D, in one embodiment, the system (optionally) determines (2640), in accordance with the touchpad data and the model of the human hand, that at least one user finger (F1, F2, F3) is initially touching, or is in contact with, the region of the touchpad corresponding to a virtual key (2702, 2703, 2705, 2725) or other control region.

In one embodiment, when the system first detects that a particular user finger initially touches or is in contact with a virtual key or other control region, the system may optionally generate a graphical representation associated with the control region being touched on display screen (2700) of the computerized system. For example, FIGS. 27A-27F further depict the system is generating and displaying on display screen (2700) a graphical representation of a virtual keyboard including a multitude of virtual keys, including virtual keys (2702, 2703, 2705, 2725), corresponding to control regions on the touchpad.

In one embodiment, the system may then change the appearance of the graphical representation of the touched virtual key or other control region to show or indicate the control region is being initial touched thus providing confirmative feedback to the user. For example, the change of the display image of the touched virtual key may be shown as a change of size, color, shape, slight displacement of the position of the control region image, slight change in display type such as distortion of the control region image, flashing, and/or the like. For example, FIG. 27A depicts virtual keys (2702, 2703, 2705), which are being initially touched by respective user fingers (F1, F2, F3) are temporarily displayed including a slightly larger size and a slightly bolder upper border than the remaining untouched keys.

Figure 27E:
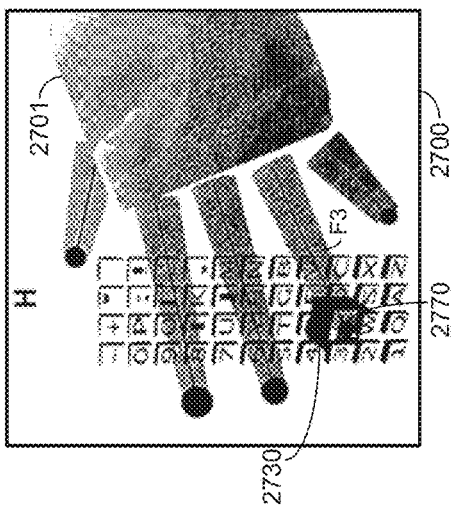

Referring simultaneously to FIG. 26, FIG. 27B, and FIG. 27E, in one embodiment, the user may next lift the at least one user finger, e.g. graphically represented by finger F2 in FIG. 27B, and finger F3 in FIG. 27E, and the system determines if the now missing in touch contact or lifted finger is most likely positioned above the same previously touched virtual key or other control region on the touchpad. In some embodiments, the system will use the biomechanical and anatomical model of the user's hand to make the above determination. In other words, the system determines (2650), using the model that at least one finger of the user, e.g. graphically represented by finger F2 in FIG. 27B, and finger F3 in FIG. 27E, is positioned above but not touching the control region of the touchpad, e.g. graphically represented by virtual key "H" in FIG. 27B, and virtual key "E" in FIG. 27E. The model may be used to determine, for example, that although the touchpad may no longer directly sense that the user's finger is in contact with that particular virtual key or other control region, nonetheless the finger is positioned directly above the control region, in accordance with touch data from other regions of the user's hand and/or fingers and the constraints of the model of the human hand.

It is understood that even if the user initially positions his or her hand and associated fingers in contact with the touchpad such that the at least one finger, e.g. graphically represented by finger F2 in FIG. 27B, and finger F3 in FIG. 27E, does not initially contact the control region, then the system may still properly determine what control region is positioned directly below the at least one finger not in contact with the control region. In other words, step 2640 described earlier may be an optional step in some embodiments because the model may determine the fingertip locations even with the at least one finger not initially in contact with the touchpad but hovering over the control region using the constraints of model of the human hand.

Still referring simultaneously to FIG. 26, FIG. 27B, and FIG. 27E, in one embodiment, the system may temporarily—for example, a first time interval between 0.05 and 5 or even 10 seconds, change the appearance of the graphical representation of the virtual key or other control region the at least one finger is hovering over. In other words, when the at least one finger is positioned above but not touching the first control region, the system may display the graphical representation of the control region with a different appearance than the prior appearance of the control region. The difference in the graphical representation may be an enlargement of the represented virtual key or other control region, as shown at (2720) and (2730), or the difference may be another visual change such as a change of size, color, shape, slight displacement of the position of the control region image, slight change in display type such as distortion of the control region image, flashing, and/or the like.

In another embodiment that might be useful for handicapped individuals, the system may instead produce or generate a sound signal audible to the user instead of, or in addition to, the changed appearance of the graphical representation of the control region when the at least one finger of the user is positioned above but not touching the control region. Note that in FIG. 27B the graphical representation of virtual keys (2702, 2705) remains displayed as in FIG. 27A because user fingers (F1, F3) continue to touch the touchpad in FIG. 27B.

Figure 27F:
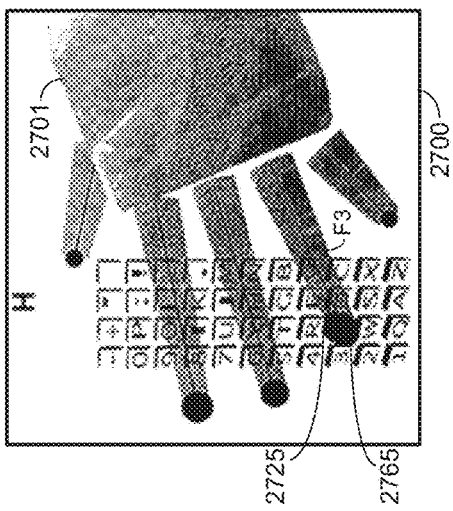

Referring simultaneously to FIG. 26, FIG. 27C, and FIG. 27F, in one embodiment, when the user lowers the at least one finger (e.g. graphically represented by F2 in FIG. 27C, and F3 in FIG. 27F) back onto or touching the touchpad in that region of the touchpad that corresponds to the control region (e.g. graphically represented by virtual key "H" in FIG. 27C, and virtual key "E" in FIG. 27F). In one embodiment, to prevent false inputs and/or to enable finger repositioning without command input, the user's finger lowering may optionally be required to happen within a certain time interval or "first period of time" (usually on the order of between 0.01 seconds and 5 or even 10 seconds after the system optionally changes the appearance of that particular key or other control region at the start of step 2650.

In one embodiment, the system may then verify, using the biomechanical and anatomical model of the user's hand, that the user's at least one finger has now "struck" or "tapped" the particular virtual key or other control region. In other words, the system determines (2660) that the at least one finger is subsequently touching the control region in accordance with the data and the model. In one embodiment, the system may record, or register that the appropriate virtual key has been pressed by storing a record of that action in memory. In FIGS. 27A-27C the user is inputting a command to the computerized system to type the letter "H". The system recognizes by the lift and tap action of user finger F2 that the user is commanding the system to type the letter "H", and the system generates and displays a corresponding letter "H" (2722) on display screen (2700) to confirm the execution of the command. In FIGS. 27D-27F the user is inputting a command to the computerized system to type the letter "E". The system recognizes by the lift and tap action of user finger F3 that the user intends to command the system to type the letter "E", and the system generates and displays a corresponding letter "E" (2732) to confirm the execution of the command.

In one embodiment, the system may optionally change the displayed appearance of the graphical representation of the struck or tapped virtual key or other control region, often back to either its original appearance (as depicted in FIG. 27C and FIG. 27F) or an optional different altered appearance (e.g. a "key struck" appearance) to visually confirm the control region is touched or struck. In one embodiment, the altered appearance may include visual change such as a change of size, color, shape, slight displacement of the position of the control region image, slight change in display type such as distortion of the control region image, flashing, and/or the like. In one embodiment, the optional different altered appearance may be displayed for a short second period of time or time interval, often in the 0.05 to 1 second range, but may extend longer, such as up to 10 seconds. In one embodiment, alternatively or additionally, the system may also generate an auditory signal that the user's actions have resulted in the pressing of a particular virtual key or other control region.

Figure 28:
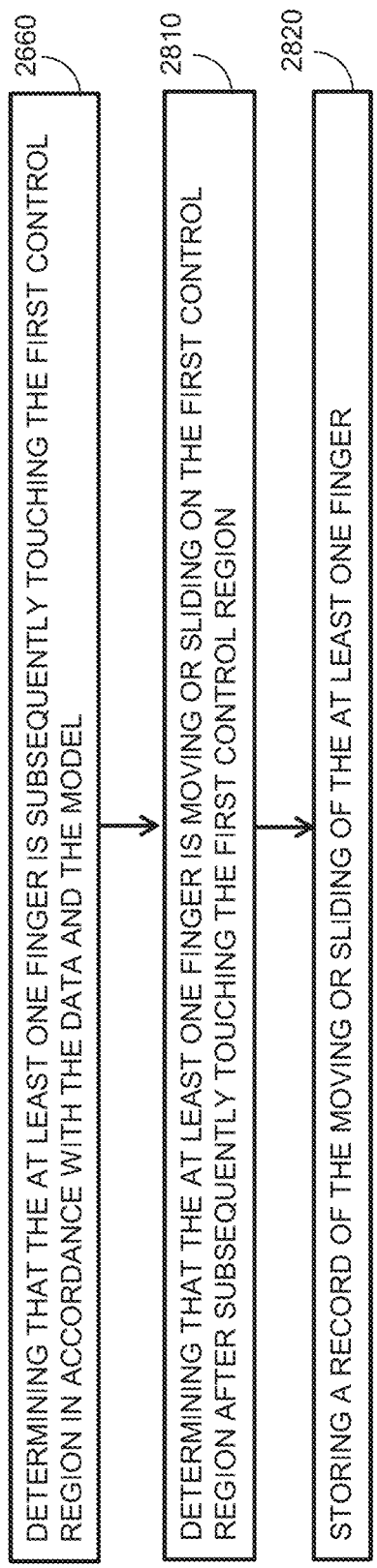
FIG. 28 depicts a simplified exemplary flowchart of a "lift and drag" technique of key entry for controlling an input from a user to the computerized system, in accordance with one embodiment of the present invention.

FIG. 28 depicts a simplified exemplary flowchart of a "lift and drag" technique of key entry for controlling an input from a user to the computerized system, in accordance with one embodiment of the present invention. The above embodiments may be extended to other input techniques, such as "lift and drag". In a "lift and drag" technique, in one embodiment, the control region may include an elongated control region with a length substantially greater than the longitudinal length of the surface region of the user's at least one finger when contacting the touchpad. Such an elongated control region may include a virtual slider (e.g. a virtual linear control region), virtual rectangular or circular rotation (e.g. a virtual control knob) or virtual expansion-contraction control region, and the like. In another embodiment, the control region may include a multitude of file names, images, icons, and the like, so that the user may drag these file names, images, icons and the like via the drag technique to, for example, execute a move and/or copy command on the corresponding files or virtual objects.

In one embodiment, after determining that the at least one finger is subsequently touching (2660) the first control region in accordance with the data and the model and optionally within a certain third time interval (usually on the order of between 0.0 seconds and 5 or even 10 seconds after the user's finger initially contacts the touchpad), the user may move or slide the at least one finger on the elongated control region of the touchpad. The system may then verify, using the biomechanical and anatomical model of the user's hand, that the user is moving or sliding the at least one finger over the elongated virtual key or other control region. In other words, the system determines (2810) that the at least one finger is subsequently touching the first control region in accordance with the data and the model. The system may then store (2820) in memory a record of the moving or sliding of the at least one finger (e.g. register that for example, a slider has been moved, and the like), and then optionally change the appearance of the elongated virtual key or other control region, such as file names, images, icons and the like, to visually confirm the command action was executed (e.g. move a knob on a slider control). In one embodiment, alternatively or additionally, the system may also give an auditory signal that the user's actions have resulted in the actuating of the drag command and associated result.

In one embodiment, the user may lift two or more fingers. In other words, the system may determine using the model, that a multitude of fingers of the user are positioned above but not touching the control region of the touchpad. The user may then lower the two or more fingers to the touchpad. In other words, the system may determine that the multitude of fingers are subsequently touching the control region in accordance with the data and the model.

Then in one embodiment, the system may determine a motion of a first finger in relation to a motion of a second finger different than the first finger and assign a command to control the computerized system in accordance with the determined motion. For example the user may either move the two fingers further apart on the touchpad to change the displayed image, e.g. magnify or zoom-in on a displayed image, move the two fingers closer together to zoom-out, or rotate the fingers around a rotation point intermediate between the two fingers to rotate an image. The system may be configured to do corresponding display screen operations under touchpad control where the image on the display screen expands or contracts, or rotates according to the rotation direction of the fingers when the relative motions of the two fingers are assigned to the respective commands. In one embodiment, the system may not require the use of a virtual key or other control regions. Instead, the system may operate as if the entire screen is a virtual control region that may be subject to zoom-in, zoom-out, and/or rotation controlled as described above.

Most existing two dimensional multi-touch gestures may be similarly extended or modified into corresponding three-dimensional counterparts that incorporate the finger lift gesture component described above. Examples of existing multi-touch gestures that may be modified for additional finger lift functionality include various Apple OXS gestures, such as, but not limited to: swipe behind full-screen apps, two-finger scroll, tap to zoom, pinch to zoom, swipe to navigate, open launch pad, show desktop, look up, app expose, rotate, three-finger drag, tap to click, secondary click, notification center, and show web browser tabs.

The embodiments of the present invention may be extended or modified for use with touchpads that are capable of sensing the force exerted by a finger in contact with or touching the touchpad. One example of a force sensing touchpad embodying the present invention may use a touch sensing device commercially available from Synaptics Inc., San Jose, Calif. and commonly known as the ForcePad™ family of products. With a force-sensing touchpad, the touchpad not only may determine a finger touch location on the surface of the touchpad, but also may sense and determine how much force per finger is being applied to the surface of the touchpad. In one embodiment, the dimension of force per finger in the touchpad data may be used by the system instead of or in addition to sensing when a finger of the user is lifted off the surface of the touchpad.

Figure 29:
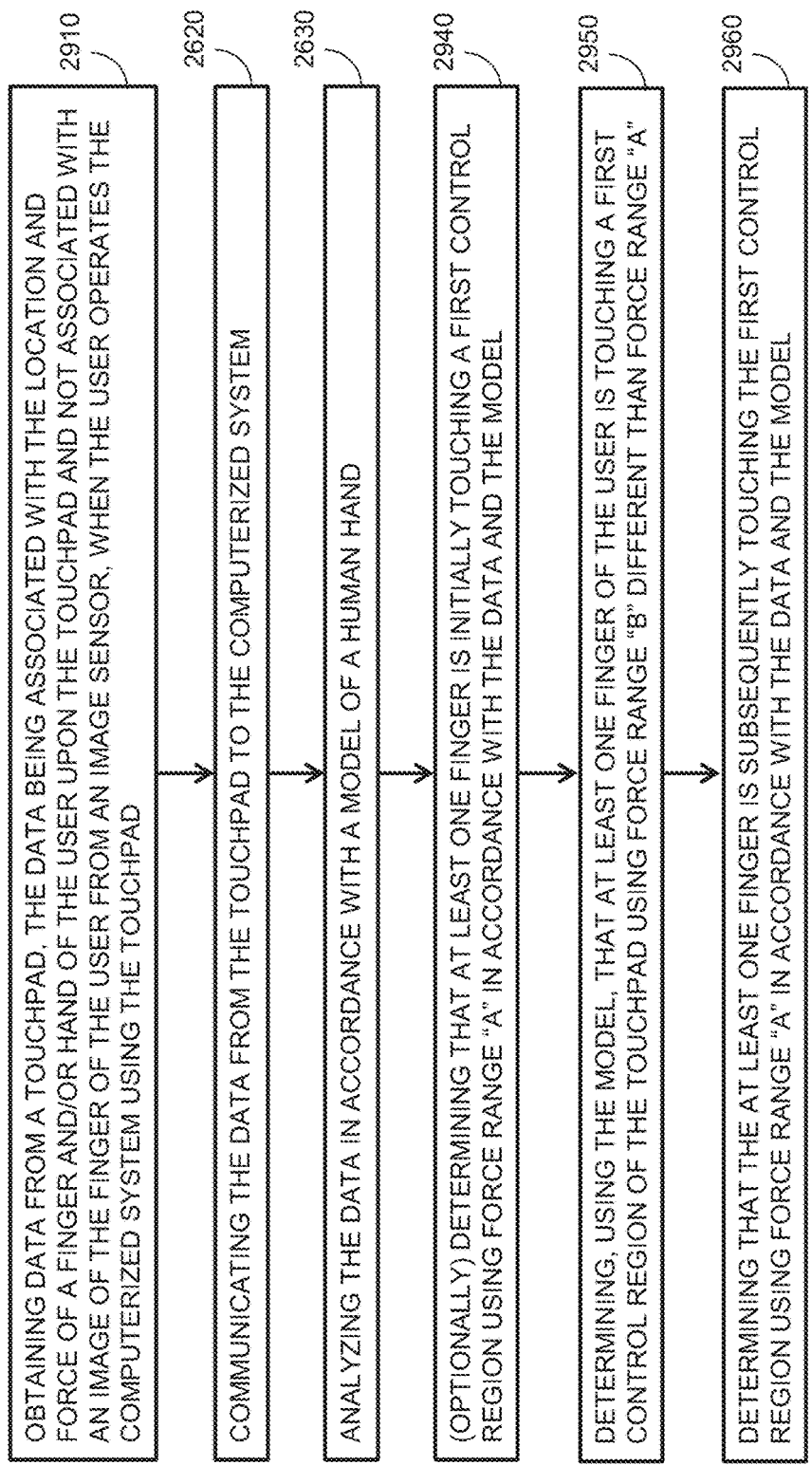
FIG. 29 depicts a simplified exemplary flowchart of a "lift and tap" technique of key entry modified to use force applied per finger for controlling an input from a user to the computerized system, in accordance with one embodiment of the present invention.

FIG. 29 depicts a simplified exemplary flowchart of a "lift and tap" technique of key entry modified to use force applied per finger for controlling an input from a user to the computerized system, in accordance with one embodiment of the present invention. FIG. 29 includes the same features as FIG. 26 with the following exceptions. When the system obtains (2910) data from the touchpad, the data may be additionally associated with the force of a finger and/or hand of the user upon the touchpad.

Referring to FIGS. 27A-27F in one embodiment, the system may display a graphical representation of at least one touch point associated with the force per finger (2743, 2750, 2753, 2765, 2770, 2775) applied upon the surface of the touchpad by the user at the corresponding location on the touchpad where the fingers touch the surface of the touchpad. In one embodiment, the graphical representation of the touch point may be depicted as a solid circle including a diameter associated with the amount of force per finger applied upon the surface of the touchpad. In alternative embodiments, shapes other than a solid circle may be used and/or other display attributes than size may be associated with the force per finger. In one embodiment, the force per finger may be associated with at least one of a size, a color, a position, a shape, or a display type depicted on the display screen. For example, the amount of force per finger may be associated with a flashing type display where the rate of flashing may be associated with the amount of force.

Referring simultaneously to FIG. 27A, FIG. 27D, and FIG. 29, after analyzing (2630) the data in accordance with a model of a human hand, the system may optionally determine (2940) that at least one finger is initially touching the control region using force within a range "A" in accordance with the data and the model. In one embodiment, force range A may include a range of force per finger above about 0.5 newton or about 50 gram weight equivalent units (on the surface of the Earth), corresponding to when the user touches the surface of the touchpad by pressing firmly. In one embodiment, the system may optionally display the graphical representation of the at least one touch point associated with the force per finger (2705, 2765) corresponding to force range A depicted as a solid circle having a relatively large diameter close to the pitch between adjacent virtual control surfaces, i.e. virtual keyboard keys, and/or close to the width of user fingers (F2, F3), respectively.

In one embodiment, an audible signal may be generated in addition to or instead of the graphical representation of the touch point when the user's finger is initially touching the first control region using force range A. In one embodiment, an mechanical response may be generated by the system in addition to or instead of the graphical representation of the touch point when the user's finger is initially touching the first control region using force range A. In other words, the computerized system may generate a haptic feedback response from the computerized system to the user when the at least one finger of the user is touching the first control region using the first force.

For example, the mechanical response may include a haptic response such as mechanically shaking or vibrating a portion of the computerized system using a mechanical actuator such that the touchpad is shaken by being mechanically coupled to the shaken portion of the computerized system. In one embodiment, the shaken touchpad may provide haptic feedback to the user's fingers in any combination of the visual, i.e. graphical representation, and/or audible feedback to the user indicating the user's action has been registered by the computerized system. In another embodiment, a different portion of the computerized system than the touchpad may be mechanically shaken or vibrated such a portion of the computerized system in mechanical contact with the user, e.g. a wearable device, or a device supporting the user such as a chair, seat, backrest, elbow rest and/or the like. Haptic feedback may be useful when audible feedback is undesirable or ineffective, such as in an audibly noisy environment.

Referring simultaneously to FIG. 27B, FIG. 27E, and FIG. 29, in one embodiment, the system may determine (2950), using the model, that at least one finger of the user is touching a control region of the touchpad using a force range "B" different than force range A. In one embodiment, a force per finger from force range A may be greater than a force per finger from force range B. In one embodiment, force range B may include a range of force per finger between zero newton and about 0.5 newton. In one embodiment, the system may change the display of the graphical representation of the at least one touch point associated with the force per finger (2750, 2770) to a different size, color, position, shape, or display type. For example, the touch point associated with the force per finger (2750, 2770) may be depicted on the display screen as a smaller solid circle corresponding to a lighter touch of the user's finger than when the finger was initially touching the control region in FIG. 27A and FIG. 27D.

In one embodiment, an audible signal may be generated in addition to or instead of the graphical representation of the touch point when the user's finger is touching the control region using force range B. In one embodiment, an mechanical response may be generated by the system in addition to or instead of the graphical representation of the touch point when the user's finger is touching the control region using force range B. In other words, the computerized system may generate a haptic feedback response from the computerized system to the user when the user's finger is touching the control region using force range B.

In the example depicted in FIG. 27B and FIG. 27E, the finger is still in contact with the surface of the touchpad but with a lighter touch than the initial touch. However, the users lighter touch action may be interpreted by the system in similar fashion as to the earlier embodiments which described the user's finger being lifted completely off the touchpad surface, i.e. force equal to zero newton, the lift in the present embodiment include lifting the finger merely to reduce the force exerted by the finger but not completely lifting the finger off the surface of the touchpad. The lighter force lift technique may take less computational resources, provide faster system speed, and/or better reliability than when the finger is lifted completely off the touchpad surface because the lighter force touch point location of the user's finger is directly available without having to estimate the position of a finger lifted completely off the touchpad surface.

Referring simultaneously to FIG. 27C, FIG. 27F, and FIG. 29, in one embodiment, the system may determine that the at least one finger is subsequently touching the control region using force range A in accordance with the data and the model. In one embodiment, the system may change the display of the graphical representation of the at least one touch point associated with the force per finger (2753, 2775) to a different size, color, position, shape, or display type. For example, the at least one touch point associated with the force per finger (2753, 2775) may be depicted on the display screen as a larger solid circle corresponding once again to a more forceful touch of the user's finger in force range A similar to that when the finger was initially touching the control region in FIG. 27A and FIG. 27D.

Figure 30:
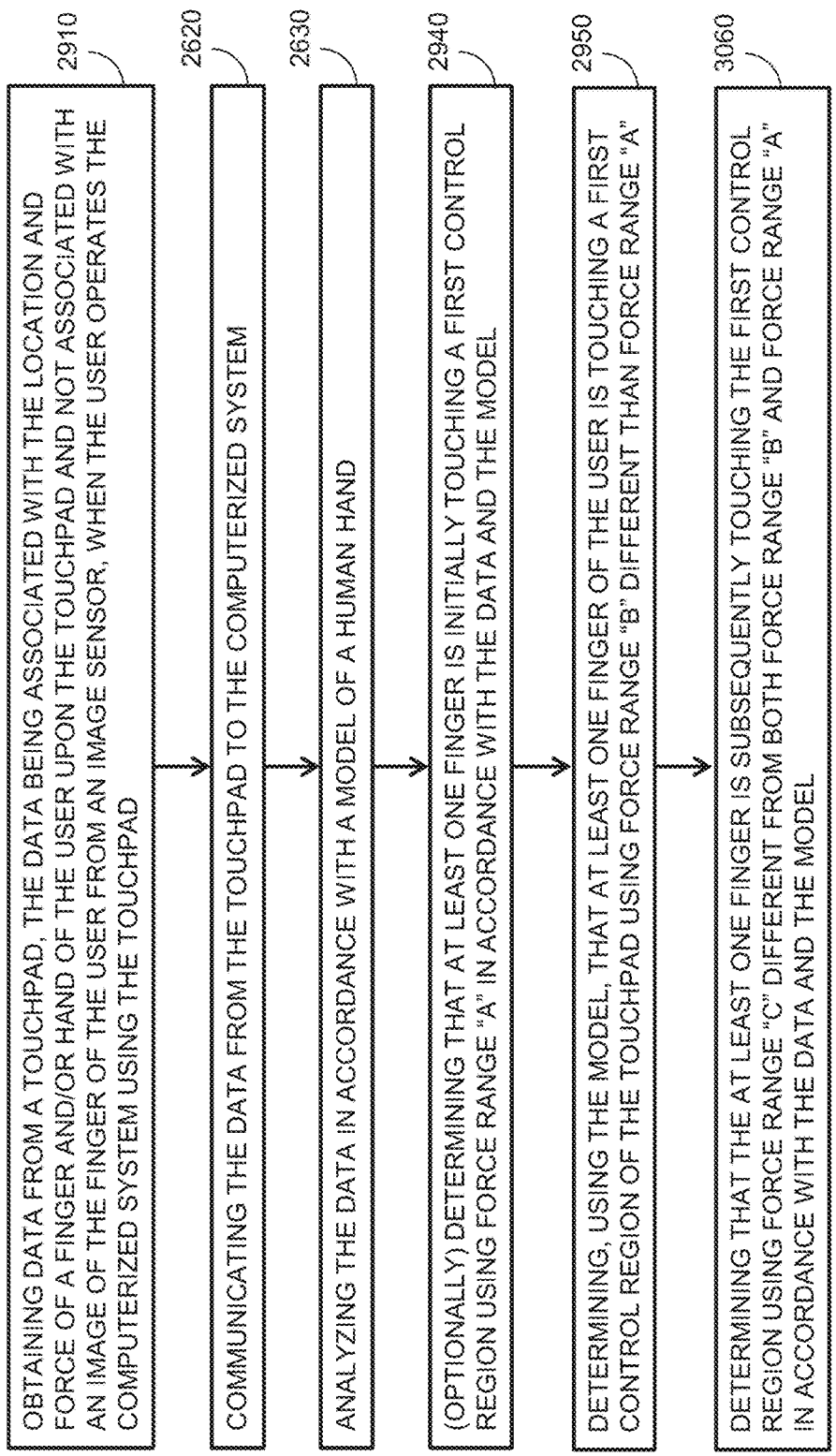
FIG. 30 depicts a simplified exemplary flowchart of a modified "lift and tap" technique of key entry modified to use a third force applied per finger for controlling an input from a user to the computerized system, in accordance with one embodiment of the present invention.

FIG. 30 depicts a simplified exemplary flowchart of a modified "lift and tap" technique of key entry modified to use a third force applied per finger for controlling an input from a user to the computerized system, in accordance with one embodiment of the present invention. FIG. 30 depicts the same features as FIG. 29, except FIG. 30 depicts the system may determine that the at least one finger is subsequently touching (3060) the control region using a force range "C" in accordance with the data and the model. The third force applied per finger may be within a range of force per finger from force range C. Force range C may include a range of force per finger that is different than both force range A and force range B. Use of three force ranges A, B, and C may further reduce unintended inputs compared to using just two force ranges. In one embodiment, force range C may include a range of force per finger that is greater than force range A, which in turn may be greater than the range of force per finger from force range B. For example, the computerized system may respond to a touchpad input sequence from a finger of a user that includes a medium force A, followed by a small force B, followed by a large force range C similar to what the user may use when typing on mechanically actuated keys. It is understood that other combinations of the three force ranges may be used in sequence to provide an input to the computerized system.

In one embodiment, an audible signal may be generated in addition to or instead of the graphical representation of the touch point when the user's finger is subsequently touching the first control region using the force range A. In one embodiment, an mechanical response may be generated by the system in addition to or instead of the graphical representation of the touch point when the user's finger is subsequently touching the first control region using the force range A. In other words, the computerized system may generate a haptic feedback response from the computerized system to the user when the user's finger is subsequently touching the first control region using the force range A.

The sequence of steps for a user's finger actuating a command area on the touchpad in the embodiments above included the system responding to an optionally stronger force range, followed by a weaker force range, followed by a stronger force range, in that order. It is understood that, in an alternative embodiment, the inverse sequence of force by the user's finger may be used where the system responds to a weak force range (optionally) applied by the user's finger, followed by a stronger force range, followed by a weaker force range, in that order. In either alternative embodiment, the system may recognize and respond to any sequence of a first force range followed by a second force range that is different from the first force range applied by the user's finger to actuate a command area on the touchpad.

The embodiments of the present invention may be extended or modified for use with not only force-sensing touchpads that may directly determine the force exerted by a finger in contact with or touching the touchpad, but also with capacitive sensing touchpads. In one embodiment of the present invention, a capacitive sensing touchpad may indirectly determine the force using a contact area included in the data from the touchpad. In contrast, force-sensing touchpads directly determine the force without using a contact area included in the data from the touchpad.

Figure 31A:
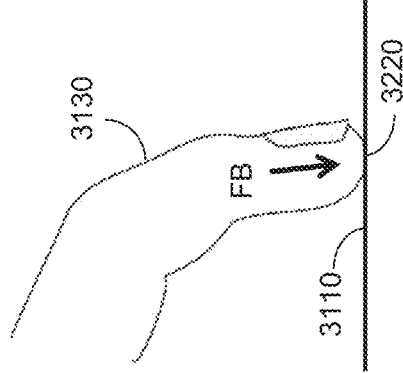
FIGS. 31A-31B respectively depict simplified exemplary side and top views of a portion of the touchpad using the contact area resulting from a first force, in accordance with one embodiment of the present invention.
Figure 31B:
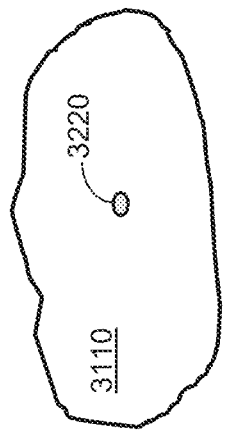

FIGS. 31A-31B respectively depict simplified exemplary side and top views of a portion of the touchpad (3110) using the contact area (3120) resulting from a first force FA, in accordance with one embodiment of the present invention. FIG. 31A depicts a user's finger (3130) pressing on the touchpad with a force FA using force range A, in accordance with one embodiment of the present invention as described above. Force range A deforms the soft tissue of user's finger (3130) between the user's bone and the touchpad surface, which is more rigid than the soft tissue, forming a contact area (3120) at the touch point on the touchpad.

Figure 32A:
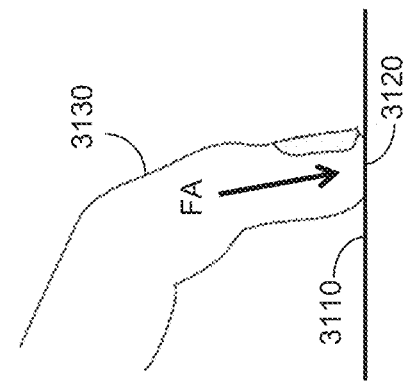
FIGS. 32A-32B respectively depict simplified exemplary side and top views of a portion of the touchpad using the contact area resulting from a second force, in accordance with one embodiment of the present invention.
Figure 32B:
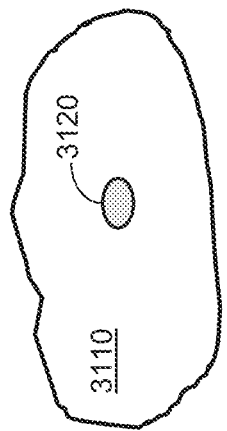

FIGS. 32A-32B respectively depict simplified exemplary side and top views of a portion of the touchpad (3110) using the contact area (3220) resulting from a second force FB, in accordance with one embodiment of the present invention. FIG. 32A depicts user's finger (3130) pressing on the touchpad with a force FB using force range B, which is different than force FA, in accordance with one embodiment of the present invention as described above. In one embodiment, force range B may be less than force range A. Therefore, force FB deforms the soft tissue of user's finger (3130) between the user's bone and the touchpad surface to a lesser extent than when force FA is applied, forming a contact area (3220) at the touch point on the touchpad that has smaller area than contact area (3120) as depicted respectively in FIGS. 32B and 31B.

The system may use the contact area data from the touchpad to then indirectly calculate or determine the force range applied by the finger and/or hand against the touchpad. The contact area information requires the soft and/or resilient tissue of the hand to be in contact with the touchpad without the touchpad supplying the force data directly, which for example, precludes the use of a rigid stylus to enter the touchpad data instead of a user's hand. Once the system calculates or determines the finger force range applied to the touchpad, the system may then use the calculated force information in the same embodiments described in reference to FIGS. 27A-30.

Distinguishing between control regions and "holding regions."

Although users may, for example, use back mounted touchpads to control their various handheld computerized devices, in some situations, users may simply wish to hold their handheld computerized devices in the same region as the back mounted touchpad, which may create false command inputs when the user inadvertently touches a control region but really intends to merely hold the device by touching the touchpad. In these and related situations, according to one embodiment, the user may designate a portion of the touchpad surface area as being reserved for non-control purposes, e.g. "holding" purposes, hereinafter also referred to as a "non-control" region of the touchpad. In other words, the system enables the user to designate or lock out a portion of the touchpad temporarily as a non-control region for holding the handheld computerized device without controlling an input when the user touches the non-control region.

In one embodiment, the system enables the user to designate some or all of a touchpad as being at least temporarily a non-control region or off limits from a device control perspective by including an actuating button—either real or virtual. Alternatively, in another embodiment, certain user hand gestures, such as a swipe border gesture followed by a swipe "x" gesture within the border, may be assigned and recognized by the system as temporarily turning off touch control within the portion of the touchpad covered by the border and the swiped "x". The user may then safely hold the handheld computerized device or other device by the non-control region of the touchpad. When the user wishes to return to controlling the computerized device using the non-control regions of the touchpad, the user may then, in one embodiment, actuate a corresponding "restore" (real or virtual) button, or implement an appropriate "restore control" gesture or set of gestures designated to execute the restore control command.

"Push and lift" or "Enter and lift" key actuation.

Figure 33:
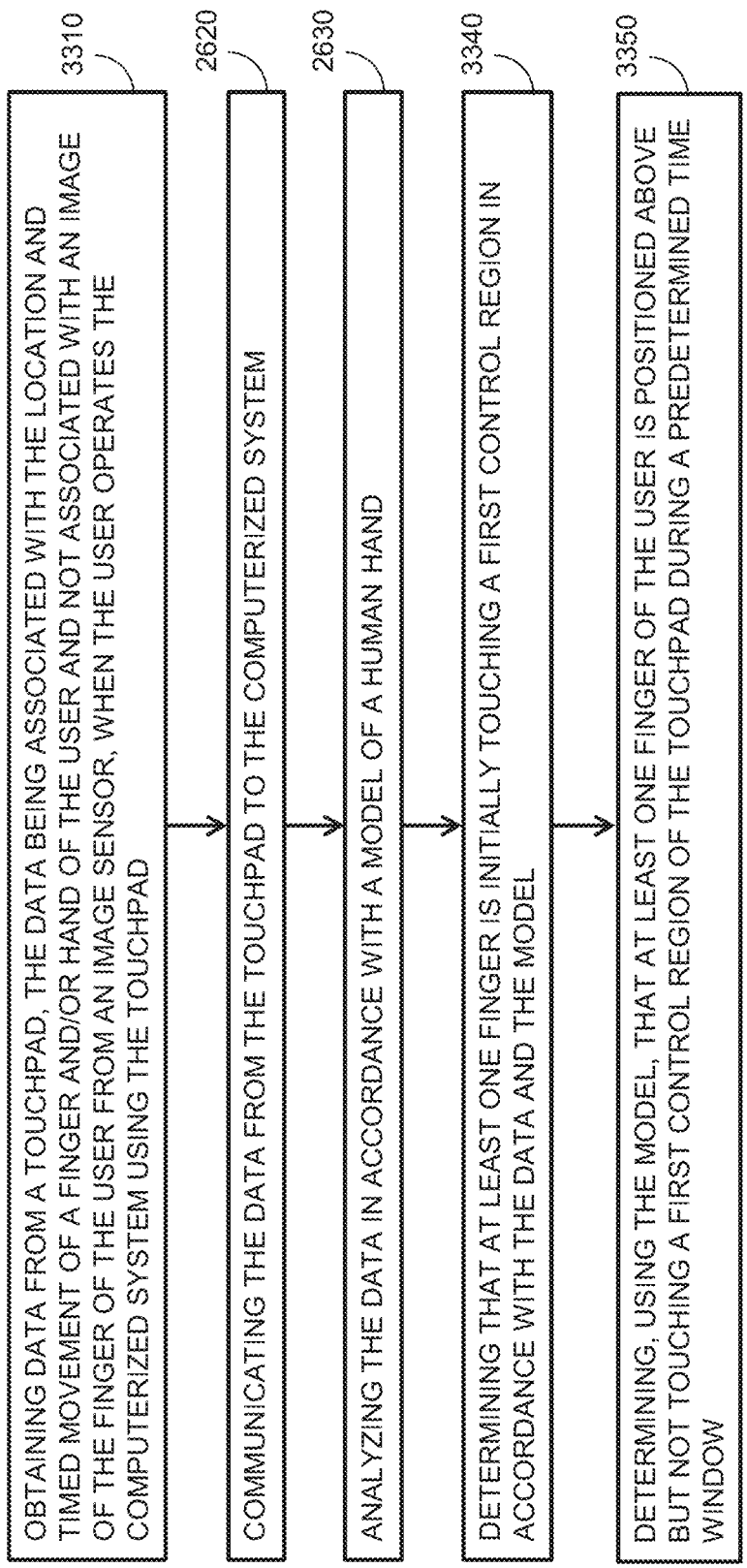
FIG. 33 depicts a simplified exemplary flowchart of a "push and lift" technique of key entry for controlling an input from a user to the computerized system, in accordance with one embodiment of the present invention.
Figure 35:
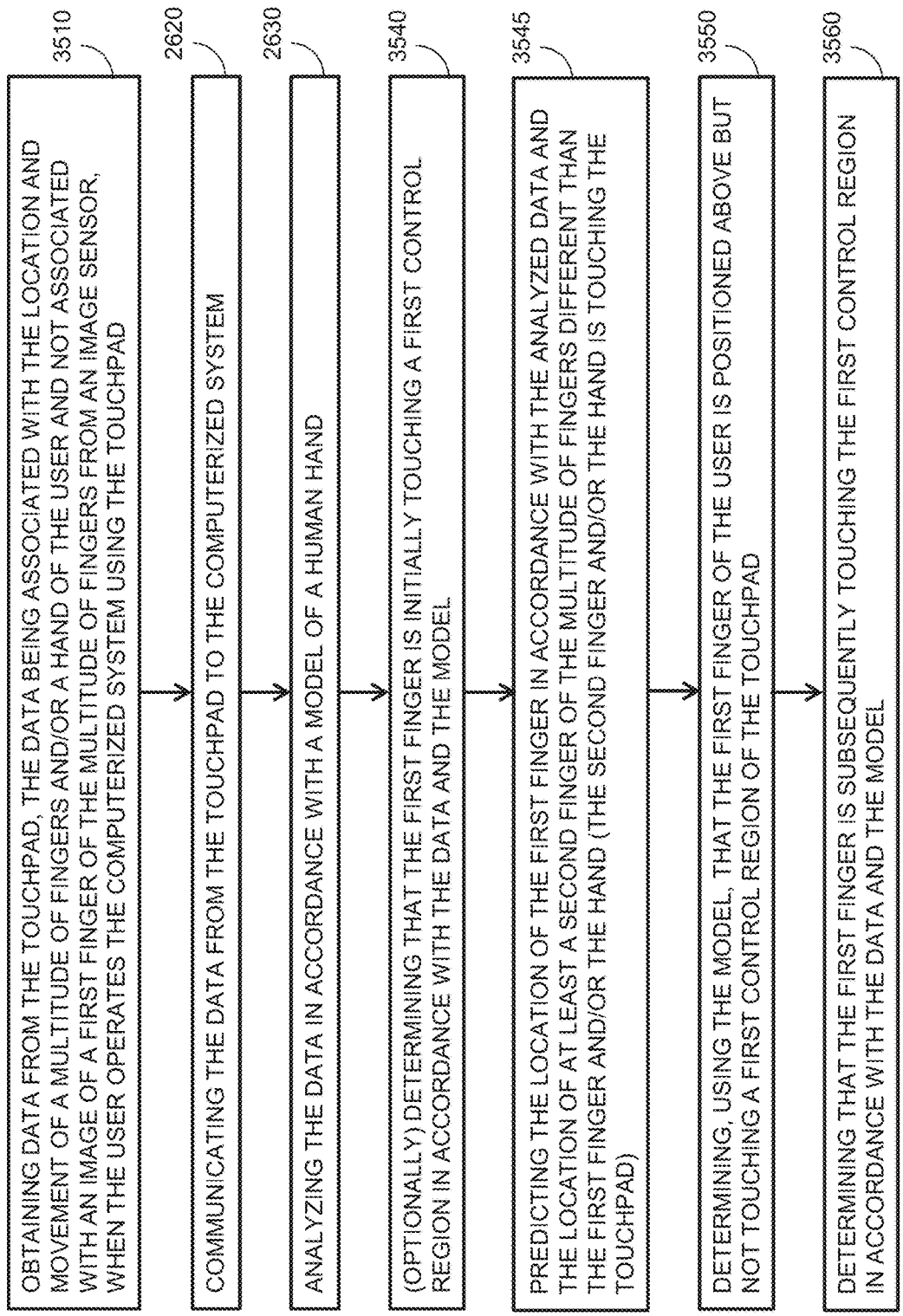
FIG. 35 depicts a simplified exemplary flowchart of a "hover and tap" technique of key entry for controlling an input from a user to the computerized system, in accordance with one embodiment of the present invention.

FIG. 35 depicts a simplified exemplary flowchart of a "push and lift" technique of key entry for controlling an input from a user to the computerized system, in accordance with one embodiment of the present invention. FIG. 33 has the same features as FIG. 26 with the following exceptions. FIG. 33 depicts that the computerized system first obtains (3310) data from the touchpad. The data may be associated with the location and timed movement of a finger and/or hand of the user and not associated with an image of the finger of the user from an image sensor, when the user operates the computerized system using the touchpad. After analyzing (2630) the data in accordance with a model of a human hand, the computerized system determines that at least one finger is initially touching a first control region on the touchpad in accordance with the data and the model. In other words, the user may initially slide, touch, or tap one or more fingers over a key area or control region on the touchpad. The system may use the biomechanical and anatomical model of the human hand to recognize this sliding, touching, or tapping action by the user's finger on the touchpad.

In one embodiment, the computerized system may respond by, in turn, changing the visual appearance of the key or control area on the display as described above. Then, the computerized system determines (3350), using the model, that at least one finger of the user is positioned above but not touching a first control region of the touchpad during a predetermined time window. In other words, the key or control region on the touchpad becomes activated or actuated when the system determines, again using the biomechanical and anatomical model of the human hand, that the user has then subsequently lifted their fingers or other portion of their hand from the key or control region of the touchpad.

Figure 34:
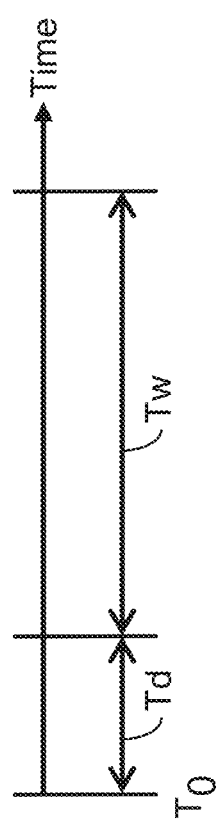
FIG. 34 depicts a simplified exemplary time-line of the "push and lift" technique depicted in FIG. 33, in accordance with one embodiment of the present invention.

FIG. 34 depicts a simplified exemplary time-line of the "push and lift" technique depicted in FIG. 33, in accordance with one embodiment of the present invention. The computerized system may use a predefined delay time Td and a predefined time window Tw to provide the system a technique to distinguish between deliberate user control actions, and random signals that might be caused by the user simply holding the device by the input surface area of the touchpad without intending to send control signals. Referring simultaneously to FIGS. 33-34, the computerized system may be configured so that when the system determines (3340) the user initially slides, touches, or taps their fingers or other portions of the hand on a key or control region at time $T_0$, there is then only a limited predefined time window, Tw, during or in which the system may determine (3350) that a subsequent lifting of the user's fingers or other portion of their hand is considered to be a deliberate control signal so as to store a record of the lifting of the user's fingers in memory as described in the embodiments previously described.

In one embodiment, time window Tw may initially commence or open at a first delay time Td after the system determines (3340) the initial sliding, touching, or tapping motion of the user's finger or hand over the key or control region on the touchpad at time $T_0$. Once open, time window Tw may then remain open until a time equal to $T_0+Td+Tw$ when the time window then closes. In other words, the predetermined time window closes at the sum of the first delay time and window duration time Tw. Once time window Tw closes or after time $T_0+Td+Tw$, then if the system determines a finger of the user positioned above but not touching the first control region of the touchpad, then the computerized system may not consider such "finger lift" as a deliberate control signal and may not store a record of such a finger lift.

In one embodiment, the time duration for delay time Td may be between about 0 and 1 seconds after sliding was first detected at $T_0$, or in other words, predetermined time window Tw commences after determining that the at least one finger is initially touching the first control region, which is at $T_0$. In one embodiment, predetermined time window Tw commences at delay time Td after determining that the at least one finger is initially touching the first control region. In one embodiment, delay time Td includes a range of time equal to or less than 1 second. In one embodiment, the time duration for window duration time Tw may include a range of time between about 0.25 second to 30 seconds.

In alternative embodiments, other values for delay time Td and window duration time Tw may also be possible so long as Td and Tw are chosen so as to enable the computerized system to differentiate between finger lifts intended as inputs versus finger lifts resulting in unintended inputs, such as for example, during finger repositioning merely to better grip or support the touchpad. In other words, determining (3350), using the model, using predetermined time window Tw enables the computerized system to differentiate between an intended input versus an unintended input by the at least one finger when the at least one finger is positioned above but not touching the first control region of the touchpad and when predetermined time window Tw is not open, such as before time $T_0+Td$ and/or after time $T_0+Td+Tw$. The embodiments described in reference to FIGS. 33-34 may be combined in any combination with the embodiments referenced in FIGS. 1-32B described previously.

"Hover and tap" type key activation.

FIG. 35 depicts a simplified exemplary flowchart of a "hover and tap" technique of key entry for controlling an input from a user to the computerized system, in accordance with one embodiment of the present invention. FIG. 35 depicts features similar to FIG. 26 with the following exceptions. The computerized system obtains (3510) data from the touchpad. The data may be associated with the location and movement of a multitude of fingers and/or a hand of the user. But the data is not associated with an image of a first finger of the multitude of fingers from an image sensor, when the user operates the computerized system using the touchpad.

Figure 36A:
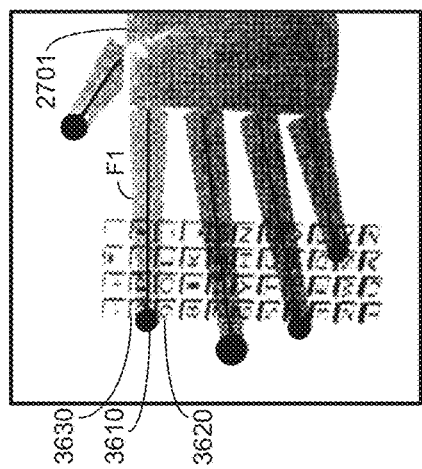
FIGS. 36A-36F depict a series of simplified exemplary display screen shots of the "hover and tap" technique of key entry depicted in FIG. 35 being used to type and enter the numeral "0" on the computerized system, in accordance with embodiments of the present invention.

FIGS. 36A-36F depict a series of simplified exemplary display screen shots of the "hover and tap" technique of key entry depicted in FIG. 35 being used to type and enter the numeral "0" on a prototype computerized system, in accordance with embodiments of the present invention. Referring simultaneously to FIGS. 35 and 36A, after analyzing (2630) the data in accordance with the biomechanical and anatomical model of the human hand, in one embodiment the computerized system may optionally determine (3540) that first finger F1 is initially touching a control region on the touchpad, in accordance with the data and the model. For example, the system displays a graphical representation of virtual touch-point (3610) of finger F1, touching between virtual keys "9" and/or "0" (3620, 3630) respectively. In one embodiment, the computerized system may generate a special graphical representation of the control region when first finger F1 is initially touching a control region on the touchpad. However, in the embodiments depicted in FIG. 36A because touch-point (3610) of finger F1 is in an intermediate position between keys, the keys are still displayed normally. The graphical representation of finger 1 is near both the number keys "9" and "0" on the virtual keyboard, but is not yet hovering over either number key, so neither number key is highlighted.

Figure 36B:
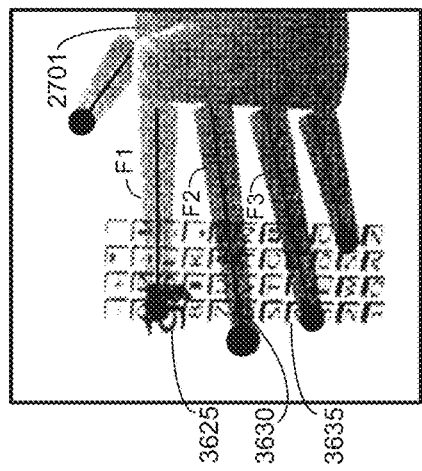

Referring simultaneously to FIGS. 35 and 36B, in one embodiment, the computerized system may determine (3550), using the model and the data from the touchpad, that finger F1 of the user is positioned above but not touching, hereinafter also referred to as "hovering", a control region such as virtual key "9" of the touchpad, which in one embodiment may in turn cause the system to display the control region or virtual key "9" in a highlighted fashion as described previously. The biomechanical and anatomical model of the human hand may be used to determine when a user's finger is likely hovering above a key or other control area, which when detected may cause the computerized system to highlight the graphical representation of the displayed control area for virtual key "9" (3625).

The computerized system may predict (3545) the location of finger F1 in accordance with the analyzed data and the location of at least another finger of the multitude of fingers, such as for example finger F2 different than finger F1 and/or hand (2701). The touch-point data from finger F2 and/or hand (2701), which is touching the touchpad, is used with the biomechanical and anatomical model of the human hand by the computerized system to predict the location of finger F1 even when direct real-time finger F1 touch-point location data is absent because finger F1 is hovering above the touchpad without making touch contact with the touchpad. For example, it is noted that the position of finger F2 fully obscures the display of the numeral "6" on virtual key "6" (3630), while the position of finger F3 only partially obscures the display of the numeral "4" on virtual key "4" (3635). In some embodiments, the prediction (3545) step may precede determining when a finger hovers step (3550), while in alternative embodiments the prediction (3545) step may come after determining when a finger hovers step (3550)

Figure 36C:
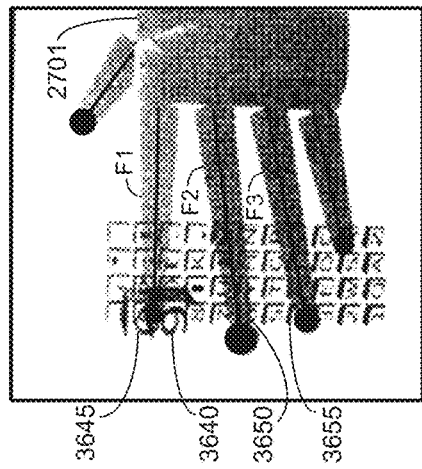

Referring to FIG. 36C, because the user does not wish to type the number "9", the user continues to move his Finger 1 hover location still above but not touching the touchpad towards the location of control region key "0". It is noted that finger F2 and F3 are still touching the touchpad but at slightly different positions than in FIG. 36B. Now in FIG. 36C the position of finger F2 only partially obscures the display of the numeral "6" on virtual key "6" (3650) because finger F2 has moved slightly upwards with respect to the figure. Similarly, the position of finger F3 has moved slightly upwards to fully obscures the display of the numeral "4" on virtual key "4" (3655). The changed positions of the touch-points of fingers F2 and F3 are used to predict the new real time position of still hovering finger F1. Thus the computerized system in transition briefly enlarges or highlights the displayed graphical representation of both the previous key "9" (3640) and key "0" (3645).

Figure 36D:
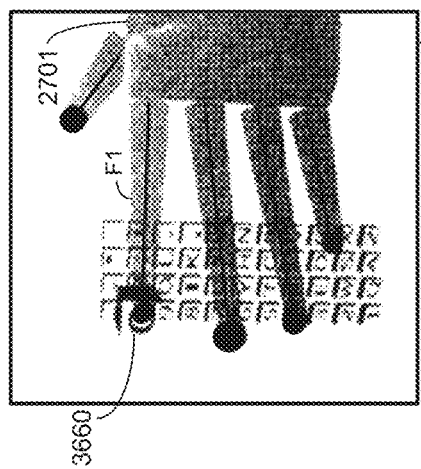

Referring to FIG. 36D, the user continues to move his Finger 1 so that it is now hovering over the desired control area of key "0" on the touchpad, and the computerized system continues to predict the real time location of still hovering finger F1 using for example the new real time locations of fingers F2 and F3, which are still touching the touchpad at locations slightly different than those depicted in FIG. 36C. Then in one embodiment, the graphical representation of key "0" (3660) is enlarged or otherwise highlighted by the system.

Figure 36E:
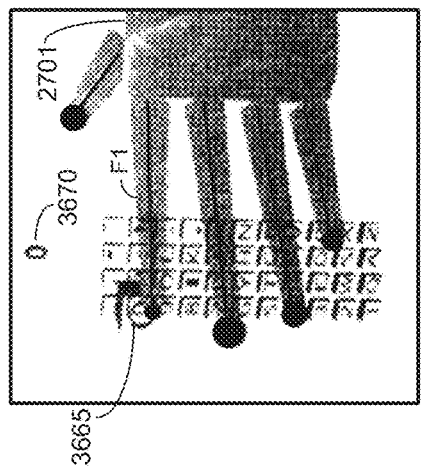
Figure 36F:
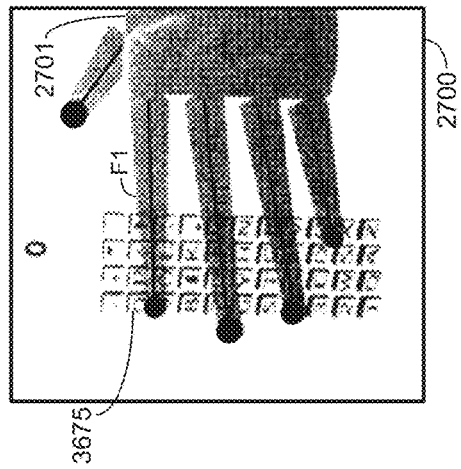

Referring simultaneously to FIGS. 35 and 36E, in one embodiment, the computerized system determines (3560) that finger F1 is subsequently touching the control region key "0" on the touchpad in accordance with the data and the model. The user is now actuating the desired key "0" by touching the corresponding "key 0" region of the touch pad. Note that the system is indicating a virtual key "strike" by altering the appearance of the graphical representation as a enlarged or highlighted region of virtual key "0" 3665, and that additionally the system now registers or stores in memory and displays the number "0" (3670) on the top of the screen. Referring to FIG. 36E, the action of tapping or pressing the control region of key "0" action is now fully complete and the graphical representation of virtual key "0" (3675) is displayed as at the start in FIG. 36A in original state.

The user actuating a key or other control area by hovering and then pressing or tapping a key or control area is, from a human factors standpoint, easy for the user to learn and use because the user need merely tap his finger on a hover-highlighted key or control area in order to then actuate the corresponding virtual key or control area. One advantage of this approach is that that the user does not have to do a separate tap and lift motion to inform the system about his interest in actuating a particular key. Rather, when the user's finger hovers above a given virtual key, but does not actually touch it, the system will enlarge or otherwise highlight the key by predicting the location of the user's hovering finger without having to first touch the touchpad at the desired control region location. As a result, the hovering finger can more easily "hover-slide" onto a particular virtual key of interest, as depicted by the user both hovering and sliding between the key "9" and the key "0" locations in FIGS. 36B-36D. Thus the user may experience a more natural keyboard typing experience, although the motions and positions of the fingers are otherwise different since the touchpad may be obscured from direct user view. The embodiments described in reference to FIGS. 35-36F may be combined in any combination with the embodiments referenced in FIGS. 1-34 described previously.

Trademarks: iPAD™ and iPhone™ are trademarks of Apple Inc., Cupertino Calif. Surface™ is a copyright of Microsoft Corporation.

The above embodiments of the present invention are illustrative and not limiting. Various alternatives and equivalents are possible. Although, the invention has been described with reference to a handheld computerized device by way of an example, it is understood that the invention is not limited by the type of computerized device or system wherever the device or system may benefit by differentiating between a user's touch on a touchpad for command input and a user's touch on a touchpad for merely holding the device by the touchpad. Although, the invention has been described with reference to certain user fingers touching the touchpad by way of an example, it is understood that the invention is not limited by which user fingers are touching the touchpad. Although, the invention has been described with reference to a touchpad located on the back of a handheld device including a display at the front of the device by way of an example, it is understood that the invention is not limited by where the touchpad is located. Although, the invention has been described with reference to a capacitive touchpad used for data entry by way of an example, it is understood that the invention is not limited by the type of input device. Although, the invention has been described with reference to a sequence of strong, weak, strong or medium, small, large force applied by a user's finger used for data entry by way of examples, it is understood that the invention is not limited by those two sequences of forces applied. Other additions, subtractions, or modifications are obvious in view of the present disclosure and are intended to fall within the scope of the appended claims.

What is claimed is:

1. A method for controlling a virtual keyboard on a display screen of a computerized device comprising a touchpad, processor and display screen, said method comprising:
   obtaining data from a touchpad, the data being associated with the location and movement of at least one of a finger and hand of a user, when the user operates said computerized device using the touchpad with said at least one of a finger and hand positioned at an arbitrary location and angle with respect to said touchpad, the data not being associated with an image of the finger of the user from an image sensor;
   communicating the data from the touchpad to said computerized device, the touchpad being located in a location that is different from the location of the display screen;
   analyzing the data in accordance with a software model of a human hand; said model of a human hand being configured to use mathematical angle rotation and coordinate transformations to model the positions of said user's finger and hands that are positioned at arbitrary locations and angles with respect to said touchpad, and assigning the data to at least one of a plurality of fingers of the model;
   generating a virtual keyboard on the display screen; and repositioning the virtual keyboard according to said model of a human hand and said user input from the touchpad.

2. The method of claim 1, further comprising:
   computing a graphical representation of at least one finger of the user in accordance with said model of the human hand; and
   displaying the graphical representation on the display screen.

3. The method of claim 1, wherein generating a virtual keyboard on the display screen comprises:
   tracking position and orientation of the user's hand;
   taking a time average of the position and orientation of the user's hand over a first time period; and
   generating a virtual keyboard on the display screen at a position and orientation based on the time average of the position and orientation of the user's hand.

4. The method of claim 3, wherein the first time period is between 0.1 seconds to two minutes.

5. The method of claim 1, further comprising:
   prior to repositioning the virtual keyboard, receiving a command from the user to enable said computerized device for repositioning the virtual keyboard.

6. The method of claim 1, wherein repositioning the virtual keyboard comprises receiving a multi-touch command comprising multiple touch pad inputs at the same time from the touchpad.

7. The method of claim 1, wherein said touchpad is located on a side of the computerized device that is behind the side of the computerized device that holds the display screen.

8. The method of claim 1, wherein said touchpad is located on a same side of the computerized device as the display screen, but at a different location from that of the display screen.

9. The method of claim 1, wherein said touchpad is configured to detect the proximity of the user's fingers above the surface of the touch pad.

10. The method of claim 1, wherein the virtual keyboard is a graphical display of a keyboard including one or more data entry location, or a hyperlink.

11. The method of claim 1, wherein the virtual keyboard is a graphical display of at least part of a QWERTY keyboard.

12. The method of claim 1, wherein the virtual keyboard is a graphical display of number entry keyboard.

13. The method of claim 1, wherein repositioning the virtual keyboard comprises a verbal command including at least one of an angle of rotation and a distance of movement.

14. The method of claim 1, further comprising:
   before repositioning the virtual keyboard, receiving a command from the user to enable said computerized device for keyboard repositioning.

15. The method of claim 14, wherein said command from the user comprises one or more of key press, voice command, virtual key selection, or touch pad input.

16. The method of claim 1, wherein repositioning the virtual keyboard comprises one or more of rotating the virtual keyboard, stretching and shrinking the virtual keyboard, and changing key spacing.

17. The method of claim 1, further repositioning the virtual keyboard according to a verbal command from the user.

18. A method for controlling a virtual keyboard on a display screen of a computerized device comprising a touchpad, processor and display screen, the method comprising:
   obtaining data from a touchpad that is located on an opposite side of said computerized device as the display screen, the data being associated with the location and movement of at least one of a finger and hand of a user, when the user operates the computerized device using the touchpad with said at least one of a finger and hand positioned at an arbitrary location and angle with respect to said touchpad, the data not being associated with an image of the finger of the user from an image sensor;
   communicating the data from the touchpad to said computerized device;
   analyzing the data in accordance with a software model of a human hand; said model of a human hand being configured to use mathematical angle rotation and coordinate transformations to model the positions of said user's finger and hands that are positioned at arbitrary locations and angles with respect to said touchpad, and assigning the data to at least one of a plurality of fingers of the model;

computing a graphical representation of at least one finger of the user in accordance with the model of the human hand;

displaying the graphical representation of at least one finger of the user on the display screen;

using said model of a human hand to track the position and orientation of the user's hand;

taking a time average of the position and orientation of the user's hand over a first time period;

generating a virtual keyboard on the display screen at a position and orientation according to the time average of the position and orientation of the user's hand;

receiving a command from the user to enable said computerized device for repositioning the virtual keyboard; and repositioning the virtual keyboard according to either a verbal command from the user or a user input from the touchpad.

19. The method of claim 18, wherein the first time period is between 0.1 seconds to two minutes.

20. The method of claim 18, wherein repositioning the virtual keyboard comprises receiving a multi-touch command comprising multiple touch pad inputs at the same time from the touchpad.

21. The method of claim 18, wherein said command from the user comprises one or more of key press, voice command, virtual key selection, or touch pad input.

* * * * *